(12) United States Patent
Lu et al.

(10) Patent No.: US 11,281,520 B2
(45) Date of Patent: Mar. 22, 2022

(54) METHODS AND SYSTEMS FOR DETERMINING POTENTIAL ROOT CAUSES OF PROBLEMS IN A DATA CENTER USING LOG STREAMS

(71) Applicant: VMware, Inc., Palo Alto, CA (US)

(72) Inventors: Jinyi Lu, Palo Alto, CA (US); Xing Wang, Palo Alto, CA (US); Shafi Khan, Palo Alto, CA (US); Apolak Borthakur, Palo Alto, CA (US); Paul Pedersen, Palo Alto, CA (US); Darren Brown, Seattle, WA (US); Gopal Harikumar, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/893,778

(22) Filed: Jun. 5, 2020

(65) Prior Publication Data

US 2021/0382770 A1 Dec. 9, 2021

(51) Int. Cl.
| | |
|---|---|
| *G06F 11/00* | (2006.01) |
| *G06F 11/07* | (2006.01) |
| *G06F 11/30* | (2006.01) |
| *G06K 9/62* | (2022.01) |
| *G06K 9/68* | (2006.01) |

(52) U.S. Cl.
CPC ........ *G06F 11/079* (2013.01); *G06F 11/0787* (2013.01); *G06F 11/3006* (2013.01); *G06F 11/3075* (2013.01); *G06K 9/623* (2013.01); *G06K 9/6215* (2013.01); *G06K 9/6223* (2013.01); *G06K 9/6892* (2013.01)

(58) Field of Classification Search
CPC ............... G06F 11/3476; G06F 11/079; G06F 11/0781; G06F 11/0787; G06F 11/0778; G06F 11/0766; G06F 11/0784; G06F 11/3072; G06F 11/327
See application file for complete search history.

(56) References Cited

U.S. PATENT DOCUMENTS

| | | | |
|---|---|---|---|
| 2014/0189435 A1* | 7/2014 | Manuel-Devadoss | G06F 11/3495 714/43 |
| 2016/0080305 A1* | 3/2016 | Samuni | H04L 51/26 709/207 |
| 2016/0261541 A1* | 9/2016 | Samuni | G06F 11/079 |
| 2018/0203757 A1* | 7/2018 | Akune | G06F 11/3476 |

* cited by examiner

*Primary Examiner* — Charles Ehne

(57) ABSTRACT

Automated methods and systems described herein are directed to identifying potential root causes of a problem in a data center. Methods and systems receipt an alert or other notification of a problem occurring in a data center and a time when the problem was noticed. A search window is created based on the time and a stream of log messages generated in the search window is converted into a time dependent metric. An anomaly detection technique is applied to the metric to determine a start time of a problem. Logging events and key phrases in the log messages are identified in the search window and presented as potential root causes of the problem. The potential root cause may then be used by system administrators and/or tenants to diagnose the problem and execute remedial measures to correct the problem.

21 Claims, 47 Drawing Sheets

1802

1808  1810  1812

2019-12-02T10:44:24.095Z li-qe-esx5.vmware.com Rhttpproxy: [28959B90 verbose 'Proxy Req 46691'] Connected to localhost:8307
1806

2019-12-02T10:44:24.094Z li-qe-esx5.vmware.com Rhttpproxy: [FFFC2B90 verbose 'Proxy Req 46691'] new proxy client TCP (local=127.0.0.1:80, peer=127.0.0.1:50155)

2019-12-02T10:44:24.093Z li-qe-esx5.vmware.com Rhttpproxy: [2889B90 verbose 'Proxy Req 46685'] The client closed the stream, not unexpectedly.

Dec  2 18:48:29 strata-vc 2019-12-02T18:48:30.273Z [7FA39448B700 info 'commonvpxLro' opID=1947d6f9] [VpxLRO] -- FINISH task-internal-2163522 -- -- vim.SessionManager.logout -

2019-12-02T18:48:51.396Z strata-esxl.eng.vmware.com Vpxa: [65B5AB90 verbose 'VpxaHalCnxHostagent' opID=WFU-ed393333] [WaitForUpdatesDone] Completed callback 2019-12-02T18:48:51.395Z strata-esxl.eng.vmware.com Vpxa:[65B5AB90 verbose 'VpxaHalCnxHostagent' opID=WFU-ed393333] [WaitForUpdatesDone] Starting next WaitForUpdates() call to hostd 2019-12-02T18:48:51.395Z strata-esxl.eng.vmware.com Vpxa: [65B5AB90 verbose 'vpxavpxaInvtVm' opID=WFU-ed393333] [VpxaInvtVmChangeListener] Guest DiskInfo Changed 2019-12-02T18:48:51.395Z strata-esxl.eng.vmware.com Vpxa: [65B5AB90 verbose 'vpxavpxaInvtVm' opID=WFU-ed393333] [VpxaInvtVmChangeListener] Guest DiskInfo Changed

2019-07-18 06:34:02+00:00 GET /login 200 915.403 ms - 13

2019-07-18 06:35:17+00:00 GET /login 200 870.289 ms - 13

3102 —— 2019-07-18 06:36:24+00:00 GET /login 200 1026.471 ms - 13

⋮ —— 3104

2019-07-18 06:40:03+00:00 GET /login 200 5721.731 ms - 13

2019-07-18 06:41:29+00:00 GET /login 200 5901.143 ms - 13

3106 —— 2019-07-18 06:42:08+00:00 GET /login 200 6231.474 ms - 13

⋮ —— 3108

2019-07-18 06:44:01+00:00 GET /login 200 1226.821 ms - 13

2019-07-18 06:45:07+00:00 GET /login 200 1035.432 ms - 13

2019-07-18 06:46:11+00:00 GET /login 200 1321.414 ms - 13

Event type: $e_i$ = cpu utilization

Log messages:

$lm_i^1$ = 2019-08-16 13:42:19 cpu utilization 23%; infor $lm_i^2$ = 2019-08-16 13:42:19 cpu utilization 38%; infor $lm_i^3$ = 2019-08-16 13:42:19 cpu utilization 47%; warning $lm_i^4$ = 2019-08-16 13:42:19 cpu utilization 54%; critical Word vectors: 3501  3502  3503  3504  3505

$$cpu = \begin{bmatrix} 1 \\ 2 \\ 3 \end{bmatrix} \quad utilization = \begin{bmatrix} 2 \\ 1 \\ 2 \end{bmatrix} \quad warning = \begin{bmatrix} 0 \\ 1 \\ 0 \end{bmatrix} \quad info = \begin{bmatrix} 1 \\ 0 \\ 0 \end{bmatrix} \quad error = \begin{bmatrix} 0 \\ 0 \\ 1 \end{bmatrix}$$

Log message vectors:

$$L_i^1 = \begin{bmatrix} 1.3 \\ 1 \\ 1.7 \end{bmatrix} \quad L_i^2 = \begin{bmatrix} 1.3 \\ 1 \\ 1.7 \end{bmatrix} \quad L_i^3 = \begin{bmatrix} 1 \\ 1.3 \\ 1.7 \end{bmatrix} \quad L_i^4 = \begin{bmatrix} 1 \\ 1 \\ 2 \end{bmatrix}$$

Event type vectors:

$$E_i = \begin{bmatrix} 1.15 \\ 1.08 \\ 1.78 \end{bmatrix}$$

FIG. 35

3601 warning error forwarding to http front end err read tcp read connection reset by peer

3602 warning error forwarding to http front end err dial tcp getsocketopt connection refused

3603 warning error forwarding to http front end err dial tcp lookup front end on no such host

| N-grams | $p(w \mid z)$ |
|---|---|
| error forwarding to | 0.0394 |
| forwarding to http | 0.0392 |
| no such host | 0.0226 |
| sending payment request | 0.0223 |
| received payment response | 0.0220 |
| no reachable servers | 0.0213 |
| invalid id hex | 0.0211 |
| connection accepted from | 0.0182 |
| connections now accepted | 0.0182 |
| reset by peer | 0.0181 |

FIG. 40 level = warning msg="Error forwarding to http://front-end:8079, err:dial tcp 172.18.0.9:8079: get-sockopt: connection refused"

level = warning msg="Error forwarding to http://front-end:8079, err: EOF"

level = warning msg="Error forwarding to http://front-end:8079, err: read tcp"

level = warning msg="Error copying upstream response Body: unexpected EOF" 21:59:22 server.go:2317: http: multiple response.WriteHeader calls caller = main.go:147 exit = terminated level = warning msg="Error forwarding to http://front-end:8079, err:dial tcp: lookup front-end on 172.0.0.11:53: no such host"

caller = server.go:94 err="Invalid Id Hex"

FIG. 41

METHODS AND SYSTEMS FOR DETERMINING POTENTIAL ROOT CAUSES OF PROBLEMS IN A DATA CENTER USING LOG STREAMS

TECHNICAL FIELD

This disclosure is directed to automated methods and systems that determine a root cause of a problem in a data center from streams of log messages.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed data centers. Data centers receive, store, process, distribute, and allow access to large amounts of data. Data centers are made possible by advances in computer networking, virtualization, distributed operating systems and applications, data-storage appliances, computer hardware, and software technologies. Data centers now make up most of the computational and data storage resources used in cloud computing and cloud-based services.

Data centers execute thousands of applications that enable businesses, governments, and other organizations to offer services over the Internet. However, these organizations cannot afford problems that result in downtime or slow performance of their applications. Performance issues can frustrate users, damage a brand name, result in lost revenue, and deny people access to vital services. In order to aid system administrators and application owners with detection of problems, various management tools have been developed to collect performance information about applications, services, and hardware. A typical log management tool, for example, records log messages generated by various operating systems and applications executing in a data center. Each log message is an unstructured or semi-structured time-stamped message that records information about the state of an operating system, an application, a service, or computer hardware at a point in time. Most log messages record benign events, such as I/O operations, client requests, logins, logouts, and statistical information about the execution of applications, operating systems, computer systems, and other devices of a data center. For example, a web server executing on a computer system generates a stream of log messages, where a typical log message describes a date and time of a client request, web address requested by the client, and IP address of the client. Other log messages, on the other hand, record diagnostic information, such as alarms, warnings, errors, or emergencies, that may be used to determine a root cause of a problem in the execution of applications, operating systems, computer systems, and other devices of the data center.

System administrators and application owners examine log messages collected by log management tools to monitor performance of applications and hardware and determine root causes of problems. However, because the number of online services offered to customers is increasing and increasing numbers of organizations are offering services over the Internet, the rate at which log messages are generated is increasing. For example, a typical application executing in a data center may generate millions of log messages per minute. However, only a small fraction of the large volume of log messages may be used by a system administrator or the application owner to determine a root cause of a problem. As a result, typical log management systems often fail to keep pace with the demand to sift through large volumes of log messages and distinguish the relatively small number of log messages that describe problems from the much larger number of log messages that describe benign events. As a result, it is becoming increasingly more challenging for system administrators and application owners to timely and accurately examine log messages that describe problems, resulting in long delays and errors in detection of a root cause of abnormal behavior.

SUMMARY

Automated methods and systems described herein are directed to identifying potential root causes of a problem in a data center on demand and in real-time thereby reducing the cost and time typically devoted to root cause detection. A problem in a data center operation is an exceptional condition occurring in the operation of the data center environment. A root cause is a problem that causes other problems in the data center but may not itself have been caused by another problem. Automated methods and systems described herein perform problem discover and identification of potential root causes of a problem based on receipt of an alert or other notification of a problem occurring in a data center and a time when the problem was noticed. Methods and systems create a search window based on the time and convert a stream of log messages generated in the search window into a time dependent stream of metric data called a metric. An anomaly detection technique is applied to the metric to determine a start time of a problem. Methods and systems analyze patterns of logging events and key phrases in log messages in the search window in order to identify potential root causes of the problem that triggered the alert or was observed by a user. The potential root cause may then be used by system administrators and/or tenants to diagnose the problem and execute remedial measures to correct the problem.

DESCRIPTION OF THE DRAWINGS

FIG. 18 shows a small, eight-entry portion of a log file.

FIG. 35 shows a numerical example of computing an event type vector for a simple example event type.

FIG. 40 shows an example list of latent tokens and associated word distribution values.

FIG. 41 shows an example of representative log messages displayed in a graphical user interface with a number of the latent topics listed in FIG. 40 highlighted with bolding.

DETAILED DESCRIPTION

This disclosure presents automated methods and systems for using log files to identify potential root causes of a problem in a data center. In a first subsection, computer hardware, complex computational systems, and virtualization are described. Automated methods and systems that use log files to identify potential root causes of a problem in a data center are described below in a second subsection.

Computer Hardware, Complex Computational Systems, and Virtualization

The term "abstraction" as used to describe virtualization below is not intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces.

Figure 1:
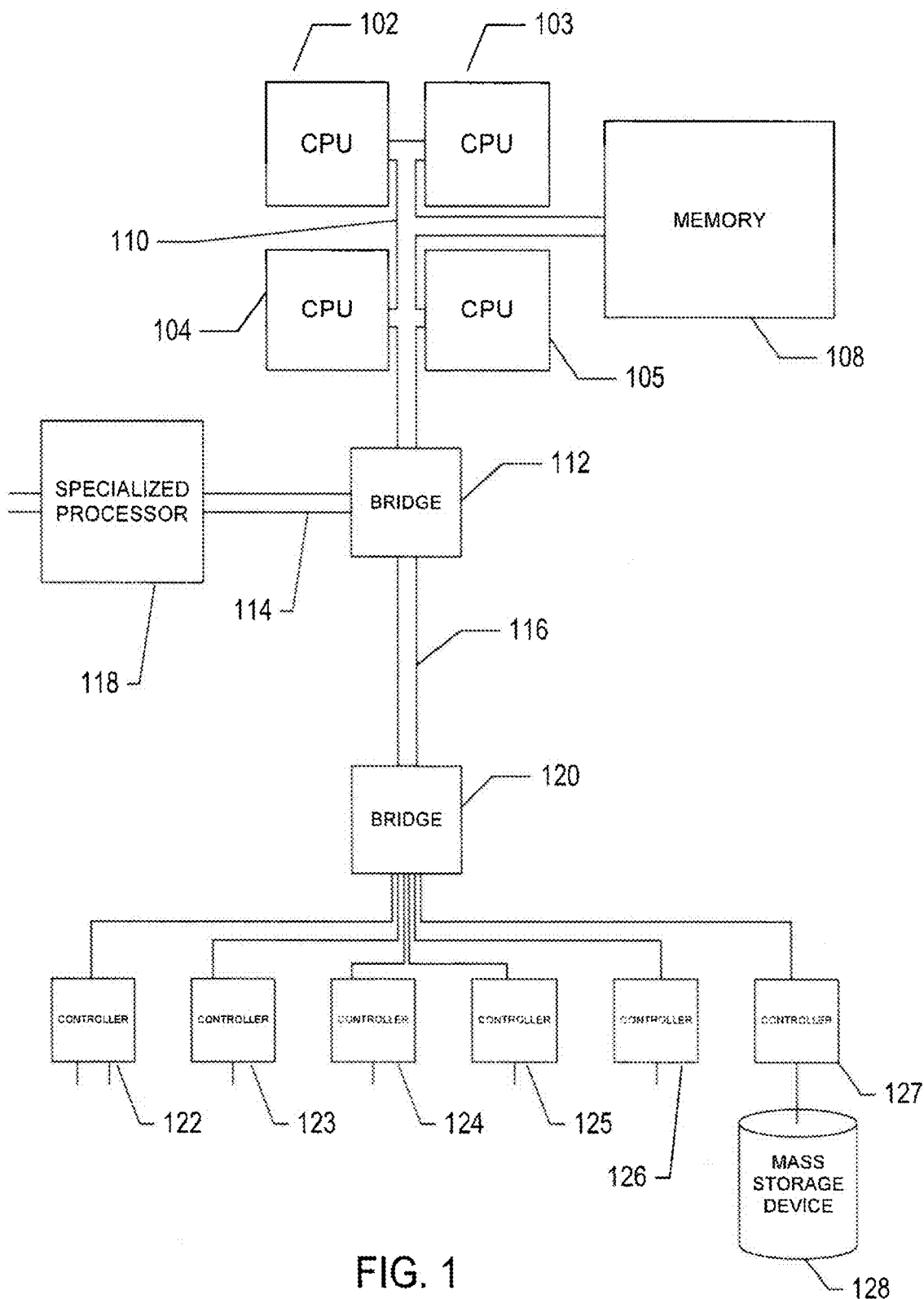
FIG. 1 shows an architectural diagram for various types of computers.

FIG. 1 shows a general architectural diagram for various types of computers. Computers that receive, process, and store log messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
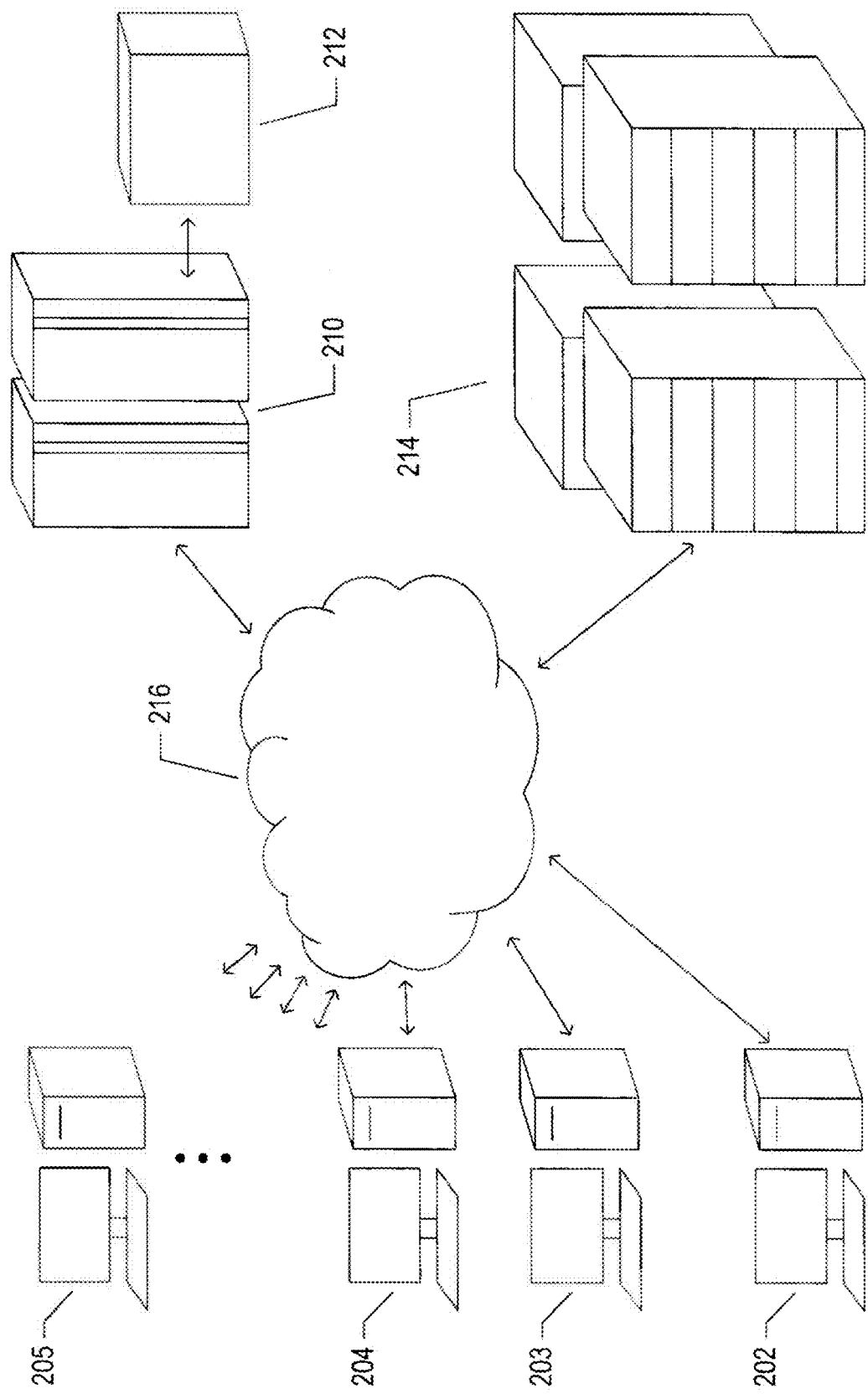
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
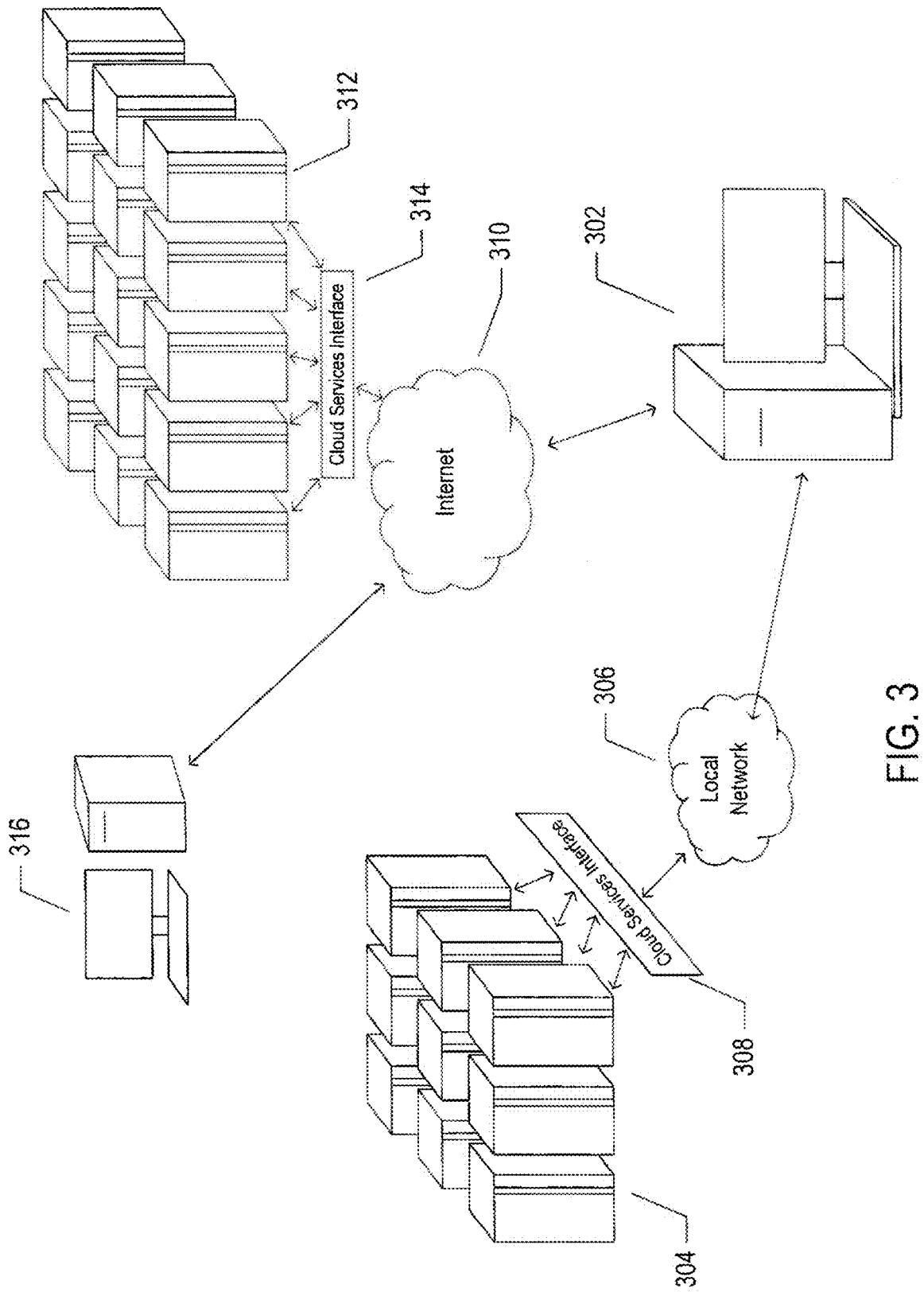
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
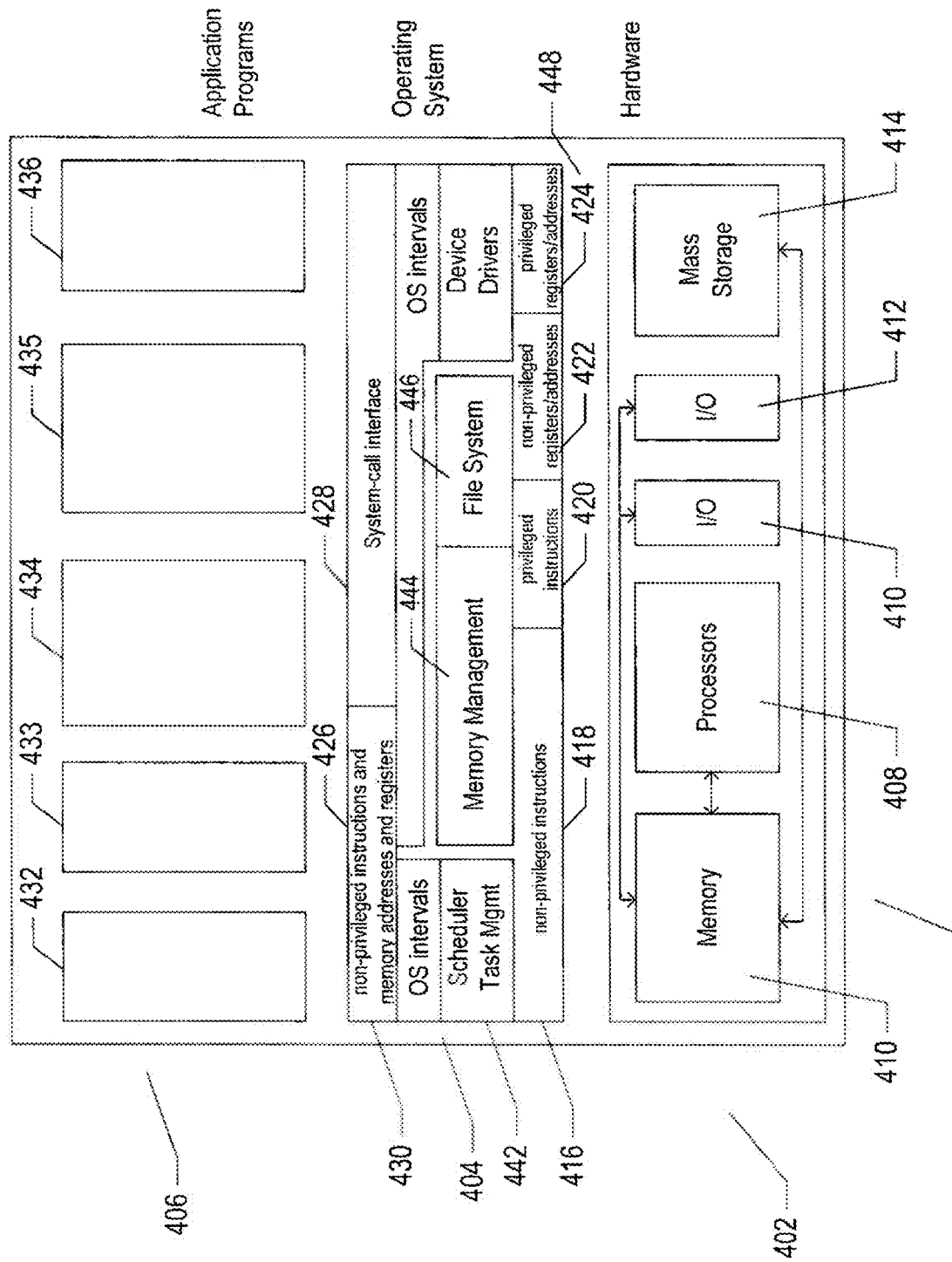
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404, and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
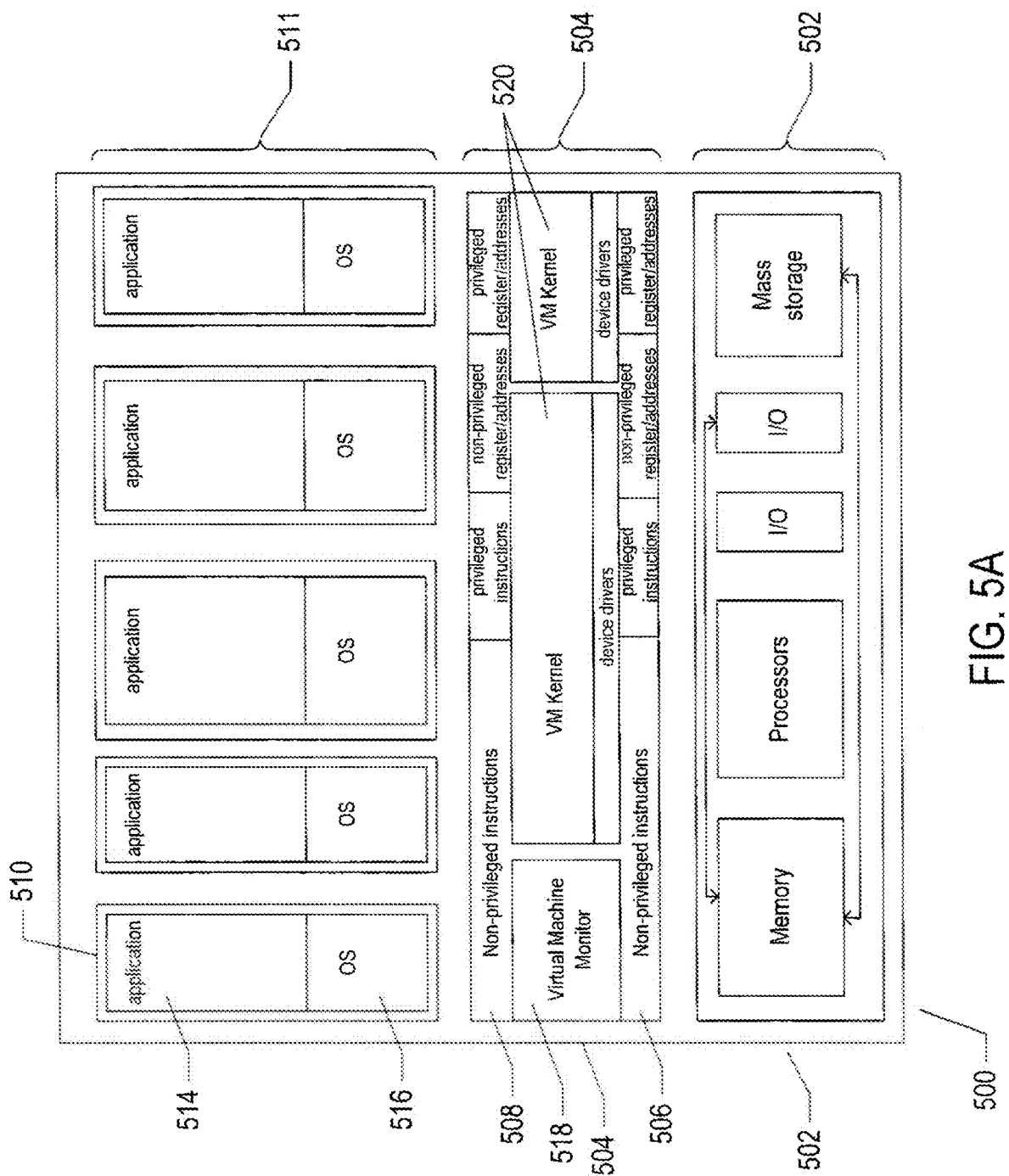
FIGS. 5A-5B show two types of virtual machine ("VM") and VM execution environments.
Figure 5B:
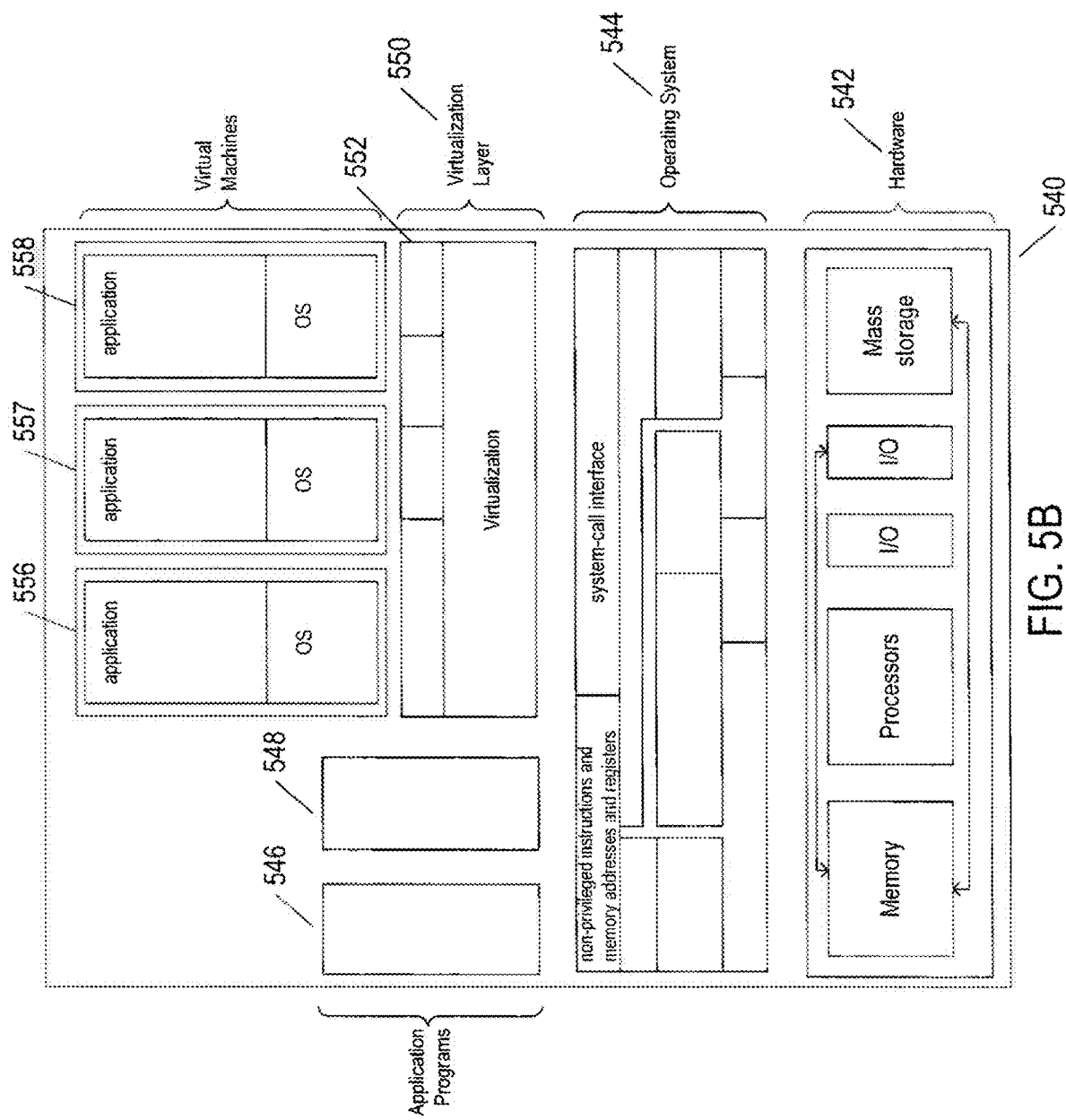

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
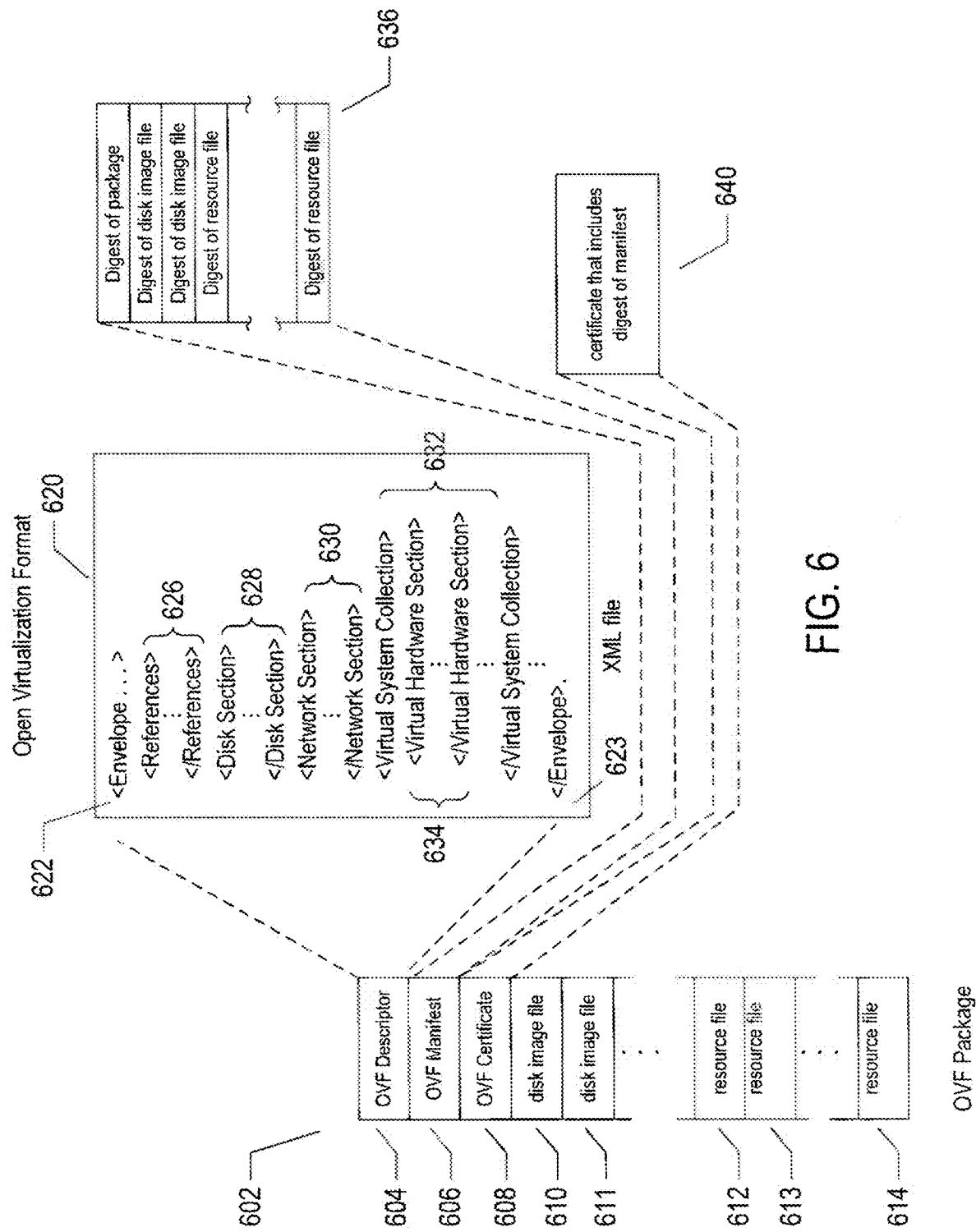
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing. XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
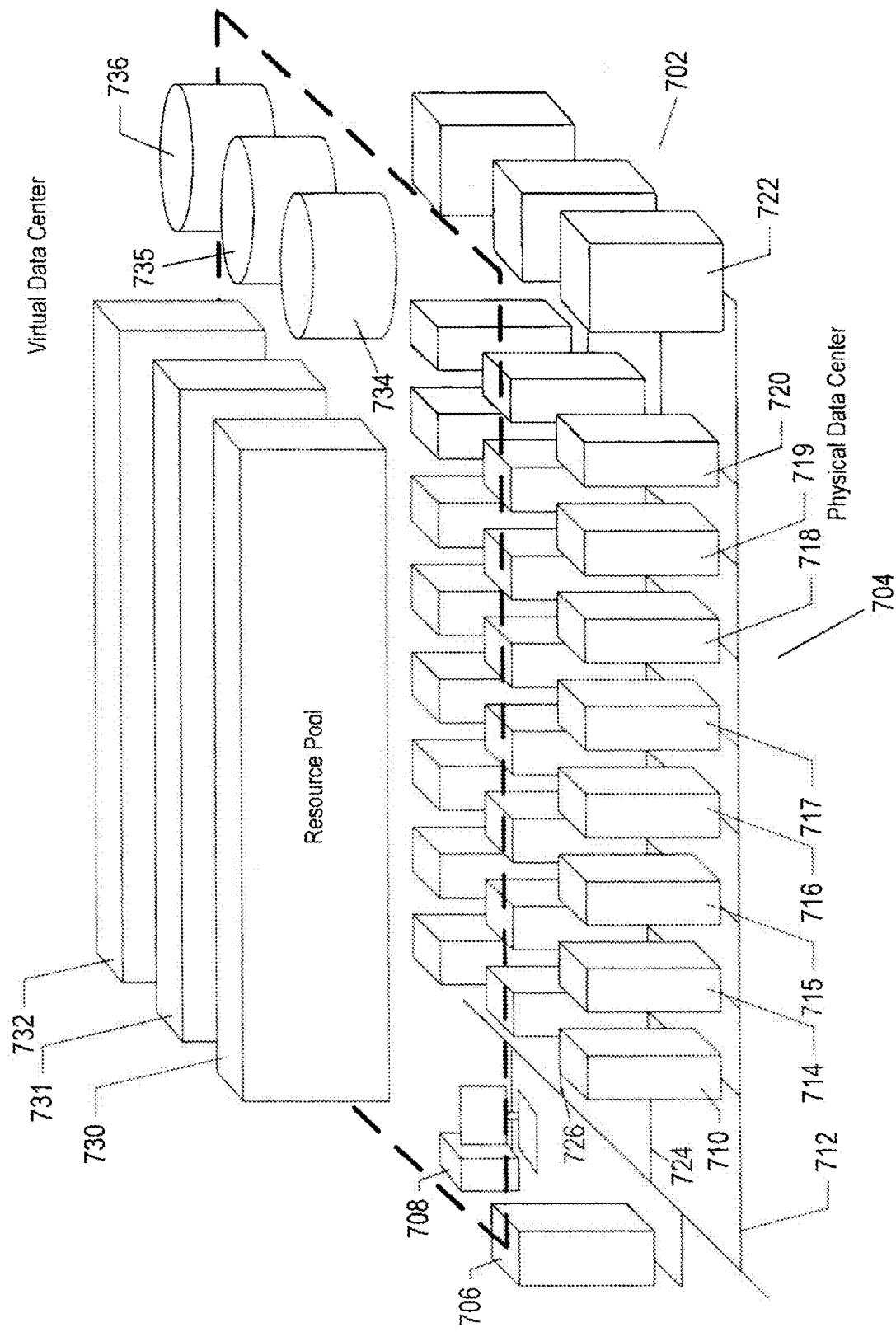
FIG. 7 shows example virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of various different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
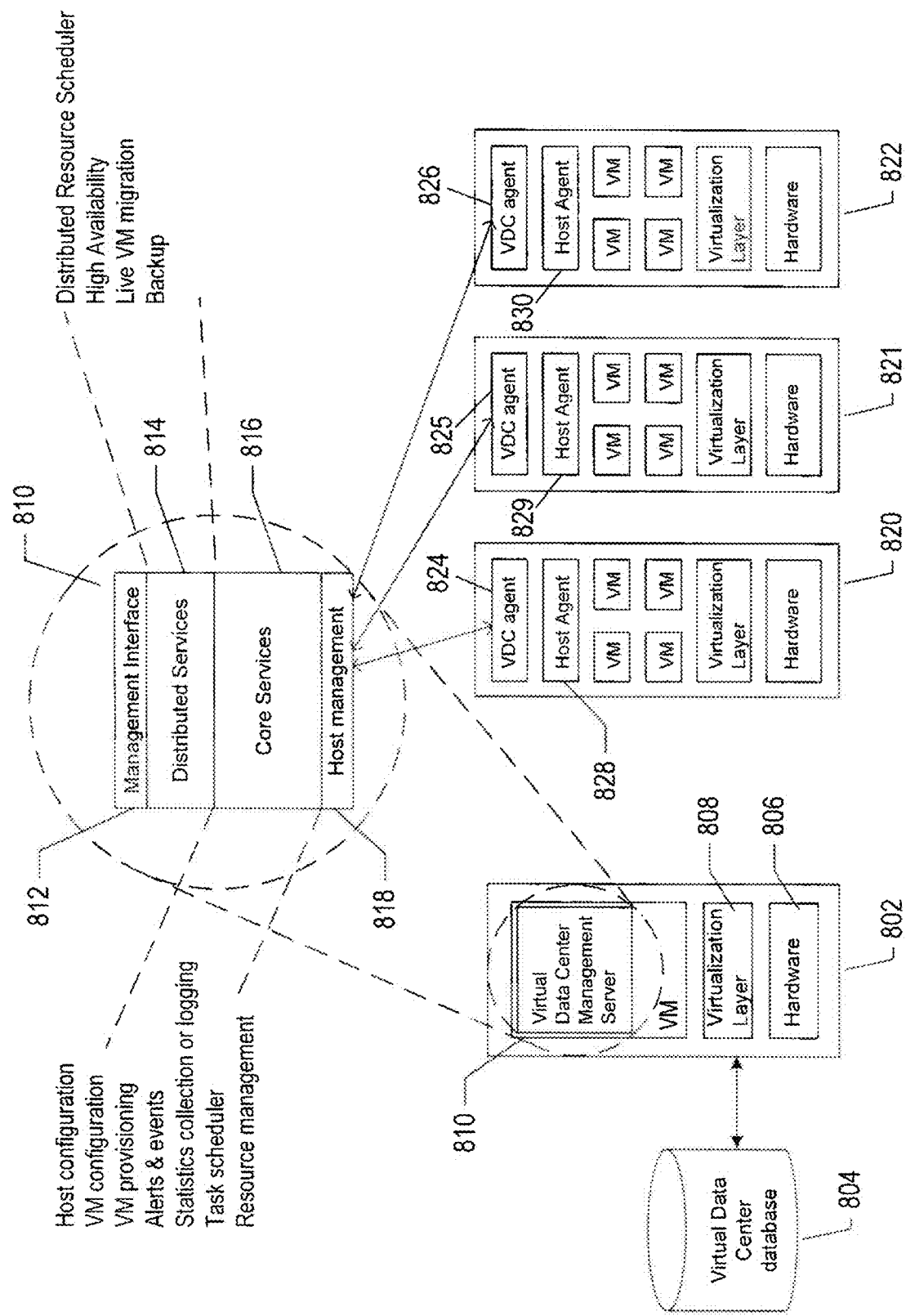
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808 and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for off-loading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
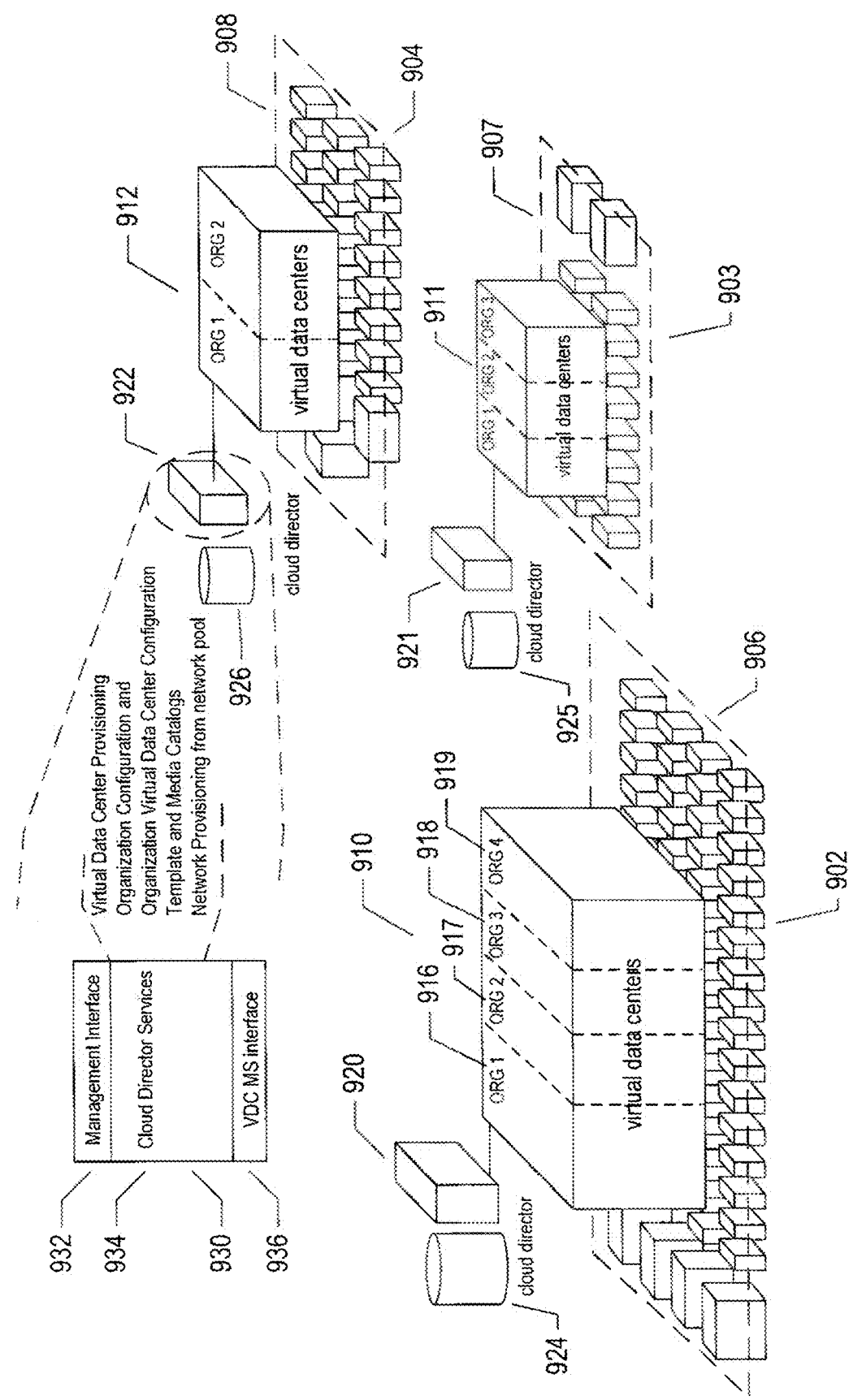
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
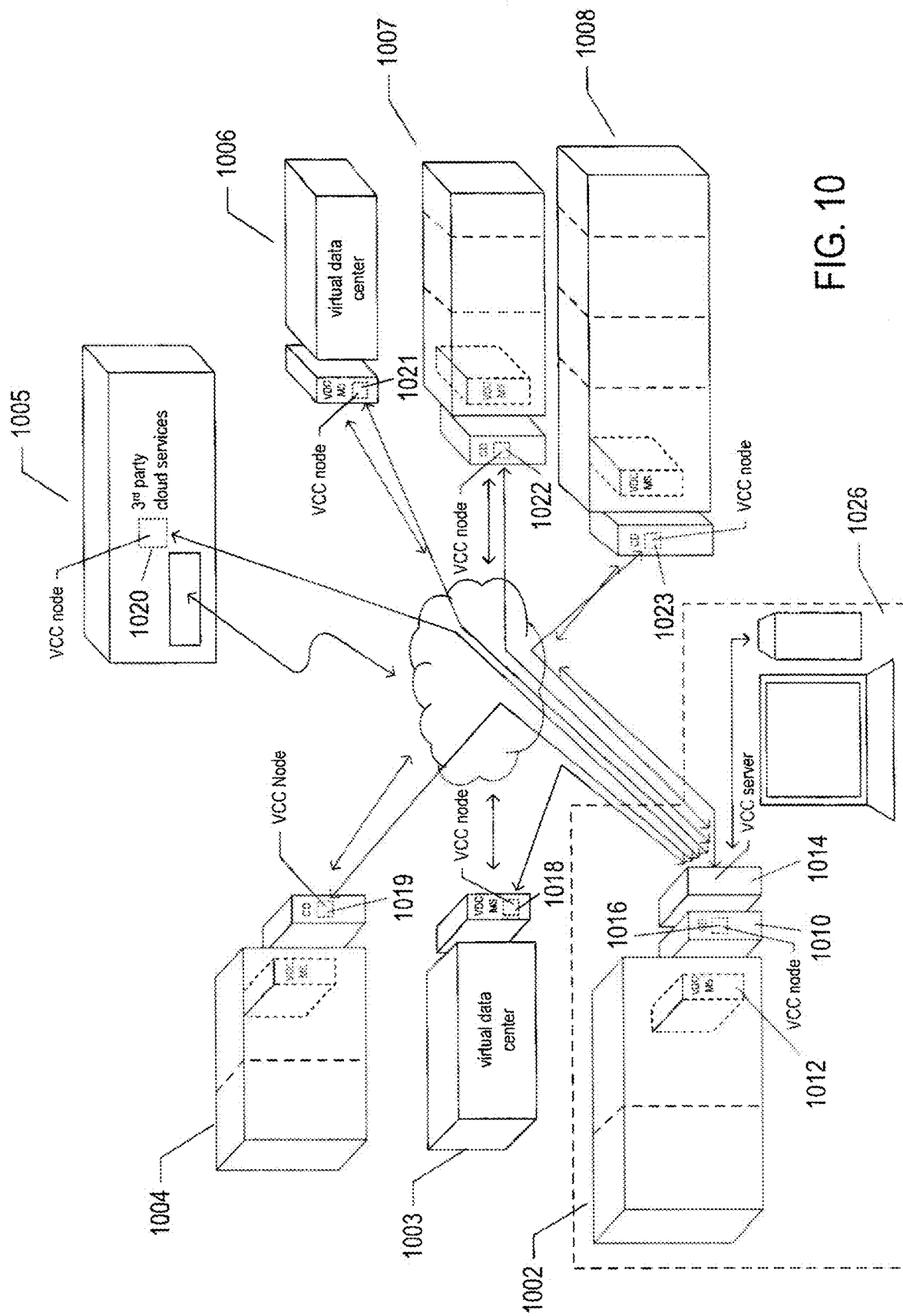
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files that are not included in the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
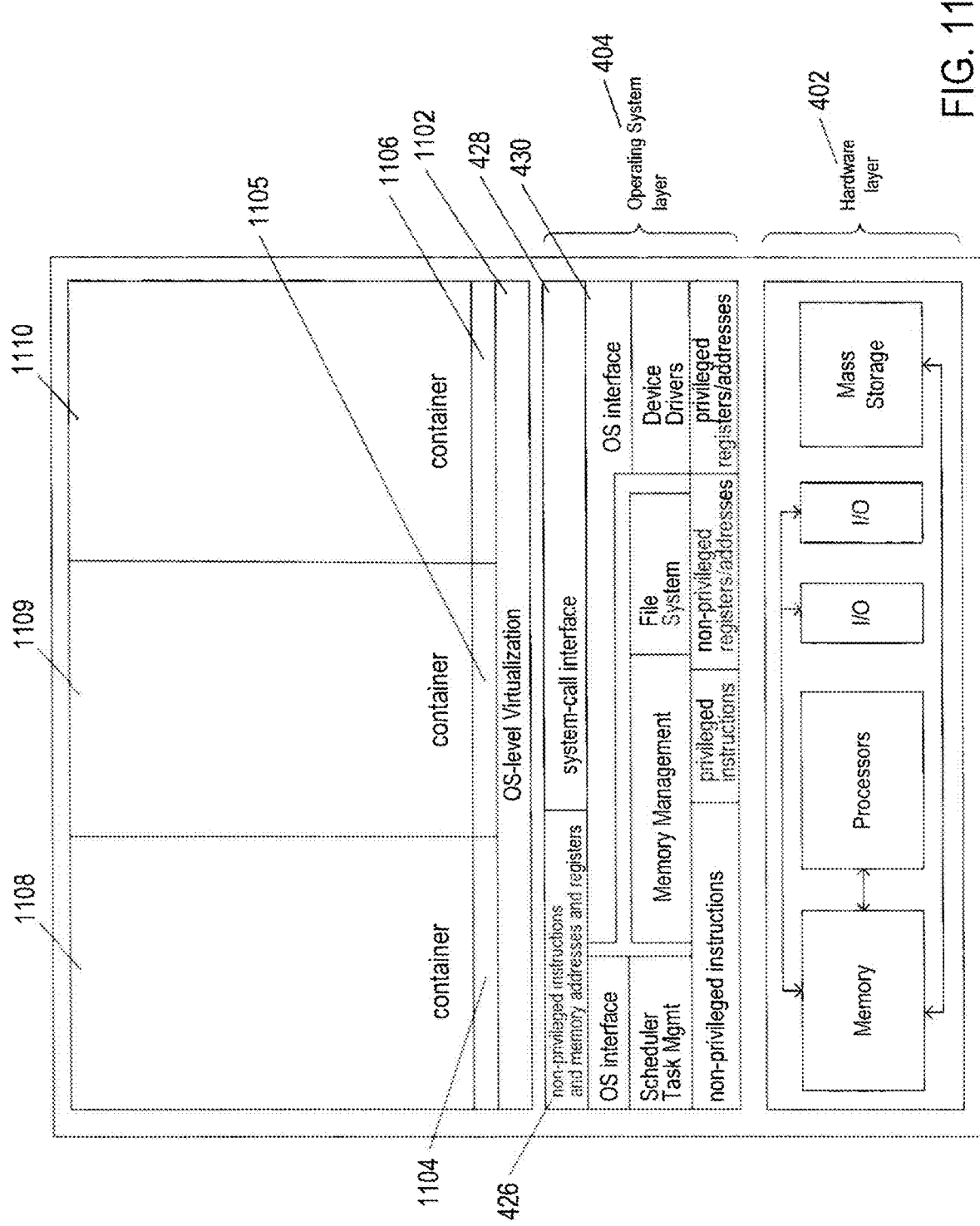
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
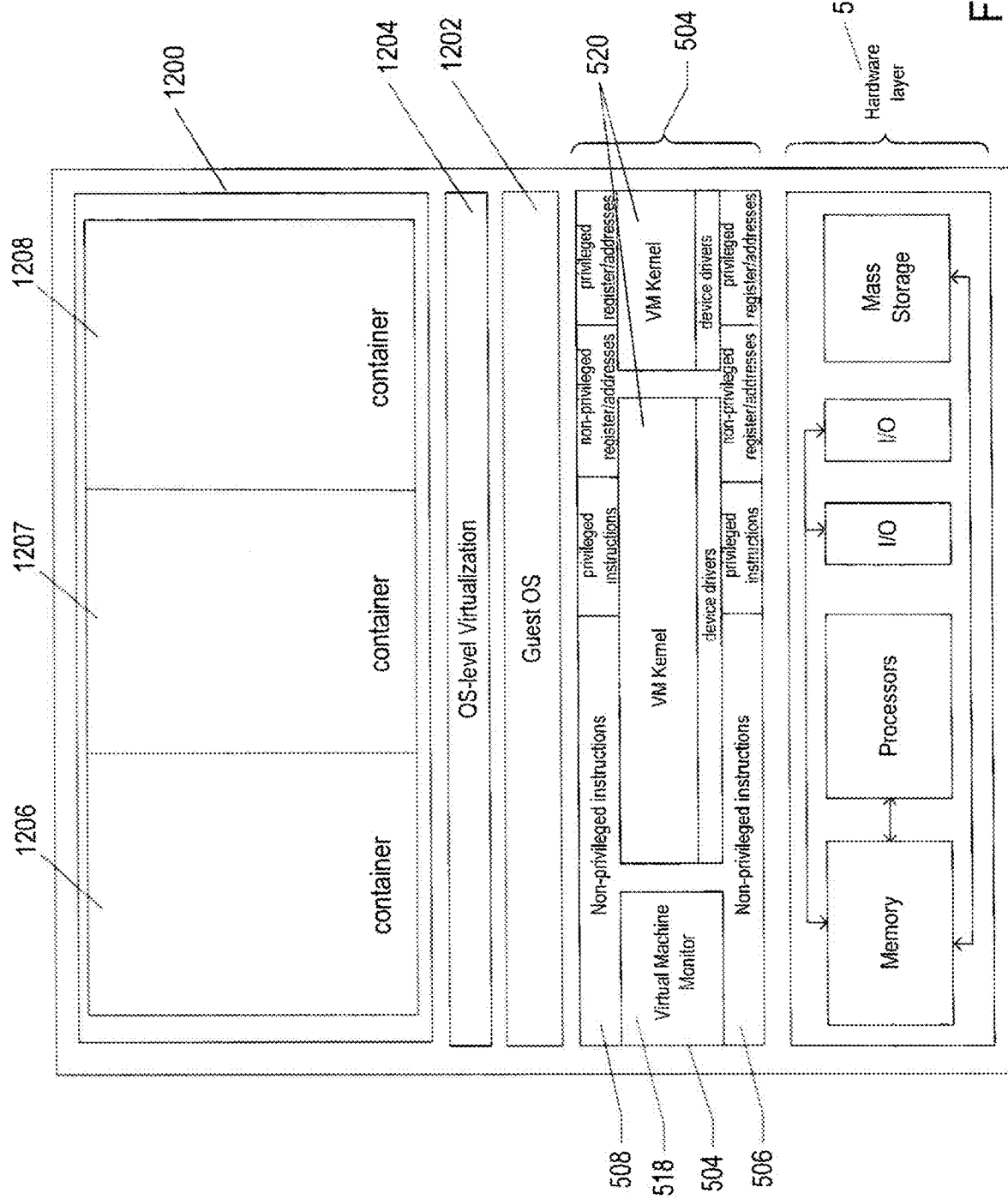
FIG. 12 shows an approach to implementing containers on a VM.

FIG. 12 shows an approach to implementing the containers on a VM. FIG. 12 shows a host computer similar to that shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Note that, although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Figure 13:
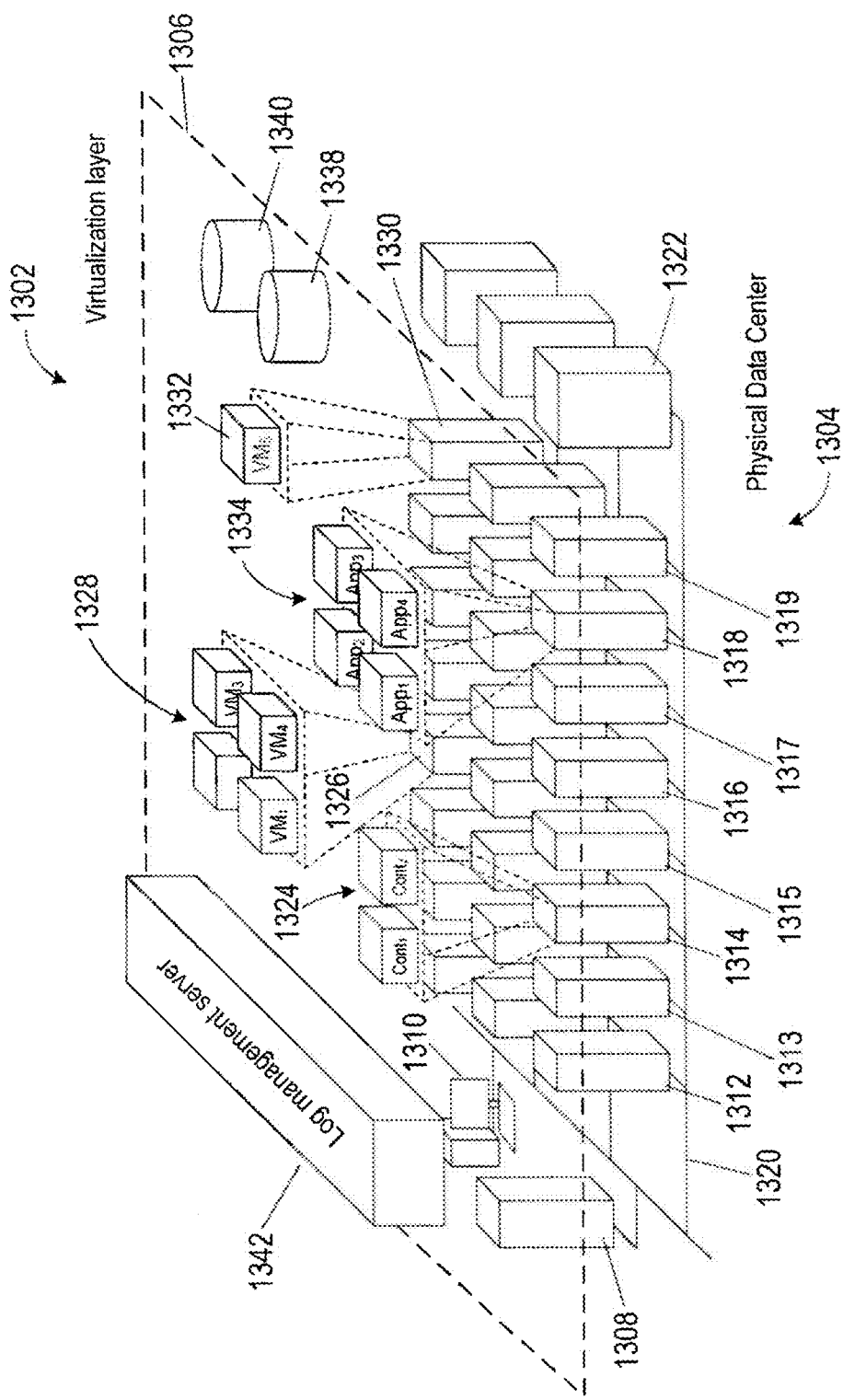
FIG. 13 shows an example of a virtualization layer located above a physical data center.

Methods and Systems that Use Log Messages to Determine a Root Cause of a Problem in a Data Center FIG. 13 shows an example of a virtualization layer 1302 located above a physical data center 1304. For the sake of illustration, the virtualization layer 1302 is separated from the physical data center 1304 by a virtual-interface plane 1306. The physical data center 1304 is an example of a distributed computing system. The physical data center 1304 comprises physical objects, including an administration computer system 1308, any of various computers, such as PC 1310, on which a virtual-data-center ("VDC") management interface may be displayed to system administrators and other users, server computers, such as server computers 1312-1319, data-storage devices, and network devices. The server computers may be networked together to form networks within the data center 1304. The example physical data center 1304 includes three networks that each directly interconnects a bank of eight server computers and a mass-storage array. For example, network 1320 interconnects server computers 1312-1319 and a mass-storage array 1322. Different physical data centers may include many different types of computers, networks, data-storage systems and devices connected according to many different types of connection topologies. The virtualization layer 1302 includes virtual objects, such as VMs, applications, and containers, hosted by the server computers in the physical data center 1304. The virtualization layer 1302 may also include a virtual network (not illustrated) of virtual switches, routers, load balancers, and network interface cards formed from the physical switches, routers, and network interface cards of the physical data center 1304. Certain server computers host VMs and containers as described above. For example, server computer 1314 hosts two containers 1324, server computer 1326 hosts four VMs 1328, and server computer 1330 hosts a VM 1332. Other server computers may host applications as described above with reference to FIG. 4. For example, server computer 1318 hosts four applications 1334. The virtual-interface plane 1306 abstracts the resources of the physical data center 1304 to one or more VDCs comprising the virtual objects and one or more virtual data stores, such as virtual data stores 1338 and 1340. For example, one VDC may comprise VMs 1328 and virtual data store 1338. Automated methods and systems described herein may be executed by a log management server 1342 implemented in one or more VMs on the administration computer system 1308. The log management server 1342 receives log messages generated by event sources and records the log messages in log files as described below.

Log Messages and Log Files

Figure 14:
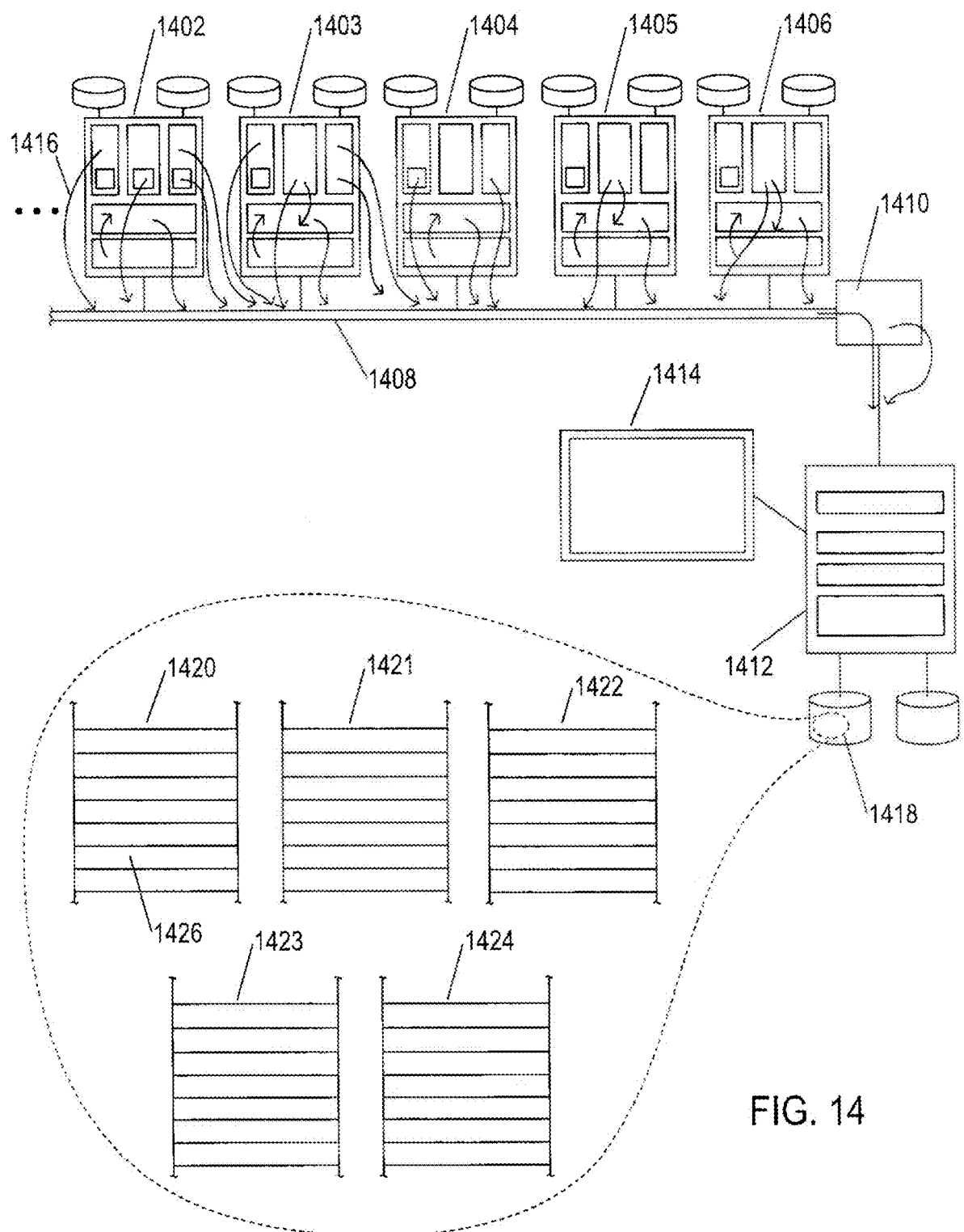
FIG. 14 shows an example of logging log messages in log files.

FIG. 14 shows an example of logging log messages in log files. In FIG. 14, computer systems 1402-1406 within a distributed computing system are linked together by an electronic communications medium 1408 and additionally linked through a communications bridge/router 1410 to an administration computer system 1412 that includes an administrative console 1414 and executes the log management server 1342. Each of the computer systems 1402-1406 may run a log monitoring agent that forwards log messages to the log management server executing on the administration computer system 1412. As indicated by curved arrows, such as curved arrow 1416, multiple components within each of the discrete computer systems 1402-1406 as well as the communications bridge/router 1410 generate log messages that are forwarded to the log management server. Log messages may be generated by any event source. Event sources may be, but are not limited to, application programs, operating systems, VMs, guest operating systems, containers, network devices, machine codes, event channels, and other computer programs or processes running on the computer systems 1402-1406, the bridge/router 1410 and any other components of a data center. Log messages may be received by log monitoring agents at various hierarchical levels within a discrete computer system and then forwarded to the log management server executing in the administration computer system 1412. The log management server records the log messages in a data-storage device or appliance 1418 as log files 1420-1424. Rectangles, such as rectangle 1426, represent individual log messages. For example, log file 1420 may contain a list of log messages generated within the computer system 1402. Each log monitoring agent has a configuration that includes a log path and a log parser. The log path specifies a unique file system path in terms of a directory tree hierarchy that identifies the storage location of a log file on the administration computer system 1412 or the data-storage device 1418. The log monitoring agent receives specific file and event channel log paths to monitor log files and the log parser includes log parsing rules to extract and format lines of the log message into log message fields described below. Each log monitoring agent sends a constructed structured log message to the log management server. The administration computer system 1412 and computer systems 1402-1406 may function without log monitoring agents and a log management server, but with less precision and certainty.

Figure 15:
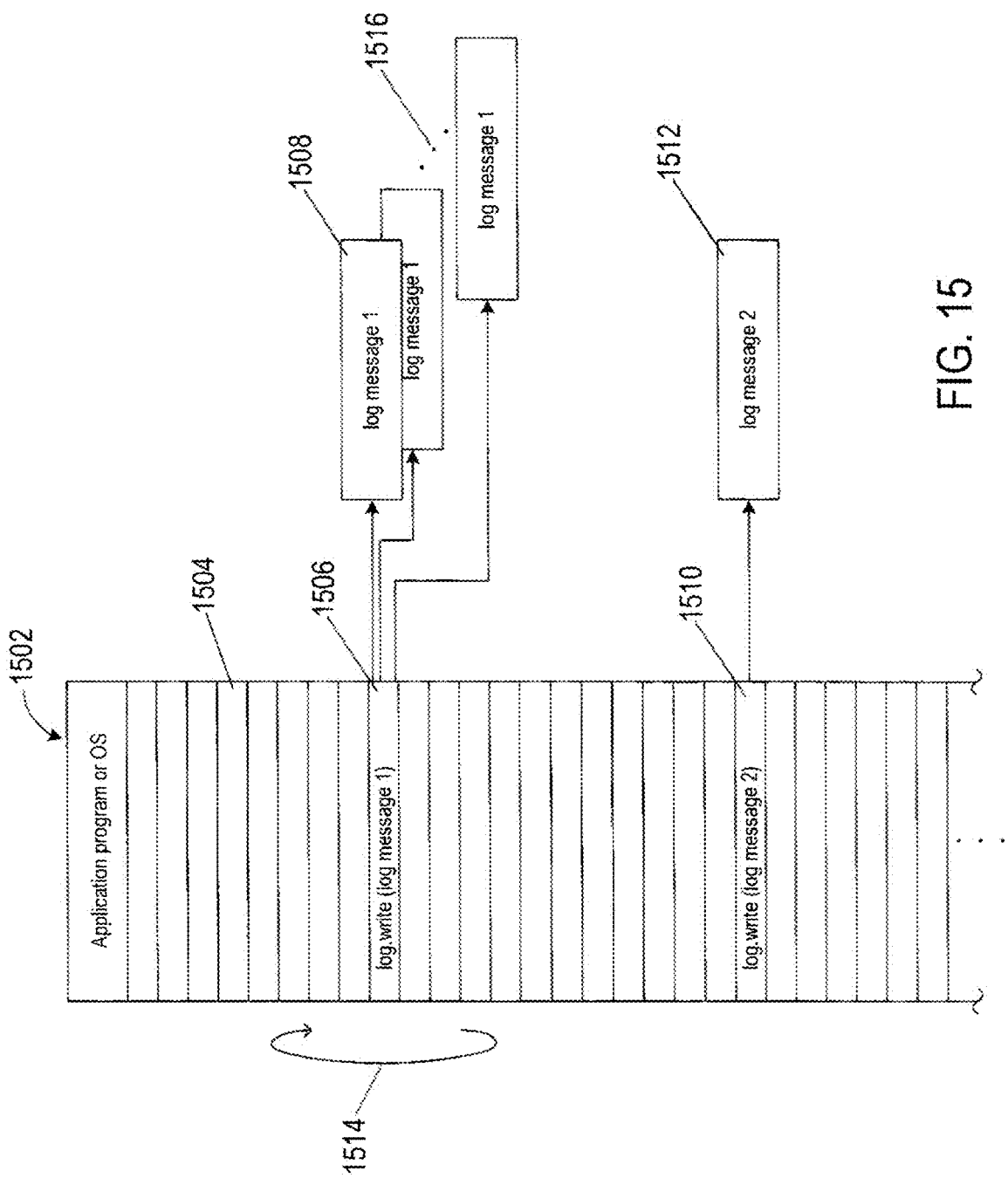
FIG. 15 shows an example source code of an event source.

FIG. 15 shows an example source code 1502 of an event source, such as an application, an operating system, a VM, a guest operating system, or any other computer program or machine code that generates log messages. The source code 1502 is just one example of an event source that generates log messages. Rectangles, such as rectangle 1504, represent a definition, a comment, a statement, or a computer instruction that expresses some action to be executed by a computer. The source code 1502 includes log write instructions that generate log messages when certain events predetermined by a developer occur during execution of the source code 1502. For example, source code 1502 includes an example log write instruction 1506 that when executed generates a "log message 1" represented by rectangle 1508, and a second example log write instruction 1510 that when executed generates "log message 2" represented by rectangle 1512. In the example of FIG. 15, the log write instruction 1508 is embedded within a set of computer instructions that are repeatedly executed in a loop 1514. As shown in FIG. 15, the same log message 1 is repeatedly generated 1516. The same type of log write instructions may also be located in different places throughout the source code, which in turns creates repeats of essentially the same type of log message in the log file.

In FIG. 15, the notation "log.write( )" is a general representation of a log write instruction. In practice, the form of the log write instruction varies for different programming languages. In general, the log write instructions are determined by the developer and unstructured, or semi-structured, and relatively cryptic. For example, log write instructions may include instructions for time stamping the log message and contain a message comprising natural-language words and/or phrases as well as various types of text strings that represent file names, path names, and, perhaps various alphanumeric parameters that may identify objects, such as VMs, containers, or virtual network interfaces. In practice, a log write instruction may also include the name of the source of the log message (e.g., name of the application program, operating system and version, server computer, and network device) and may include the name of the log file to which the log message is recorded. Log write instructions may be written in a source code by the developer of an application program or operating system in order to record the state of the application program or operating system at point in time and to record events that occur while an operating system or application program is executing. For example, a developer may include log write instructions that record informative events including, but are not limited to, identifying startups, shutdowns, I/O operations of applications or devices: errors identifying runtime deviations from normal behavior or unexpected conditions of applications or non-responsive devices; fatal events identifying severe conditions that cause premature termination; and warnings that indicate undesirable or unexpected behaviors that do not rise to the level of errors or fatal events. Problem-related log messages (i.e., log messages indicative of a problem) can be warning log messages, error log messages, and fatal log messages. Informative log messages are indicative of a normal or benign state of an event source.

Figure 16:
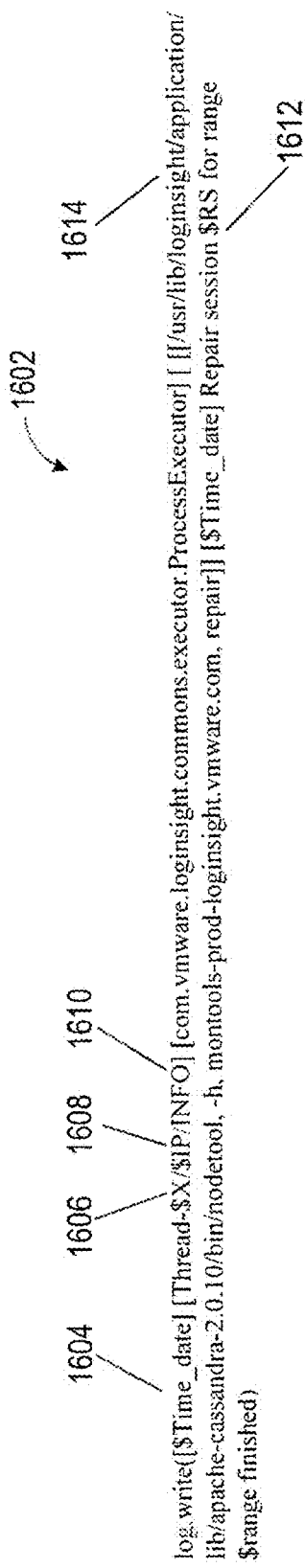
FIG. 16 shows an example of a log write instruction.

FIG. 16 shows an example of a log write instruction 1602. The log write instruction 1602 includes arguments identified with "$" that are filled at the time the log message is created. For example, the log write instruction 1602 includes a time-stamp argument 1604, a thread number argument 1606, and an internet protocol ("IP") address argument 1608. The example log write instruction 1602 also includes text strings and natural-language words and phrases that identify the level of importance of the log message 1610 and type of event that triggered the log write instruction, such as "Repair session" 1612. The text strings between brackets "[ ]" represent file-system paths, such as path 1614. When the log write instruction 1602 is executed by a log management agent, parameters are assigned to the arguments and the text strings and natural-language words and phrases are stored as a log message of a log file.

Figure 17:
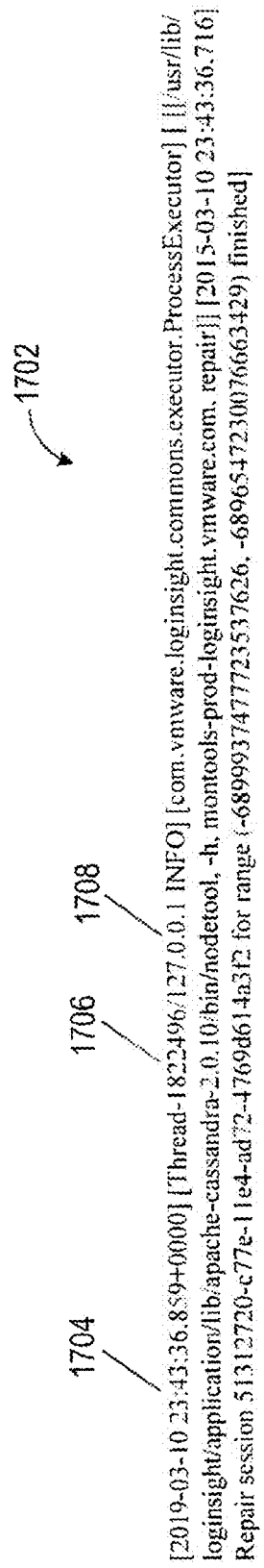
FIG. 17 shows an example of a log message generated by the log write instruction in FIG. 16.

FIG. 17 shows an example of a log message 1702 generated by the log write instruction 1602. The arguments of the log write instruction 1602 may be assigned numerical parameters that are recorded in the log message 1702 at the time the log message is executed by the log management agent. For example, the time stamp 1604, thread 1606, and IP address 1608 arguments of the log write instruction 1602 are assigned corresponding numerical parameters 1704, 1706, and 1708 in the log message 1702. The time stamp 1704 represents the date and time the log message is generated. The text strings and natural-language words and phrases of the log write instruction 1602 also appear unchanged in the log message 1702 and may be used to identify the type of event (e.g., informative, warning, error, or fatal) that occurred during execution of the event source.

As log messages are received from various event sources, the log messages are stored in corresponding log files in the order in which the log messages are received. FIG. 18 shows a small, eight-entry portion of a log file 1802. In FIG. 18, each rectangular cell, such as rectangular cell 1804, of the log file 1802 represents a single stored log message. For example, log message 1804 includes a short natural-language phrase 1806, date 1808 and time 1810 numerical parameters, and an alphanumeric parameter 1812 that identify a particular host computer.

Log Management Server

Figure 19A:
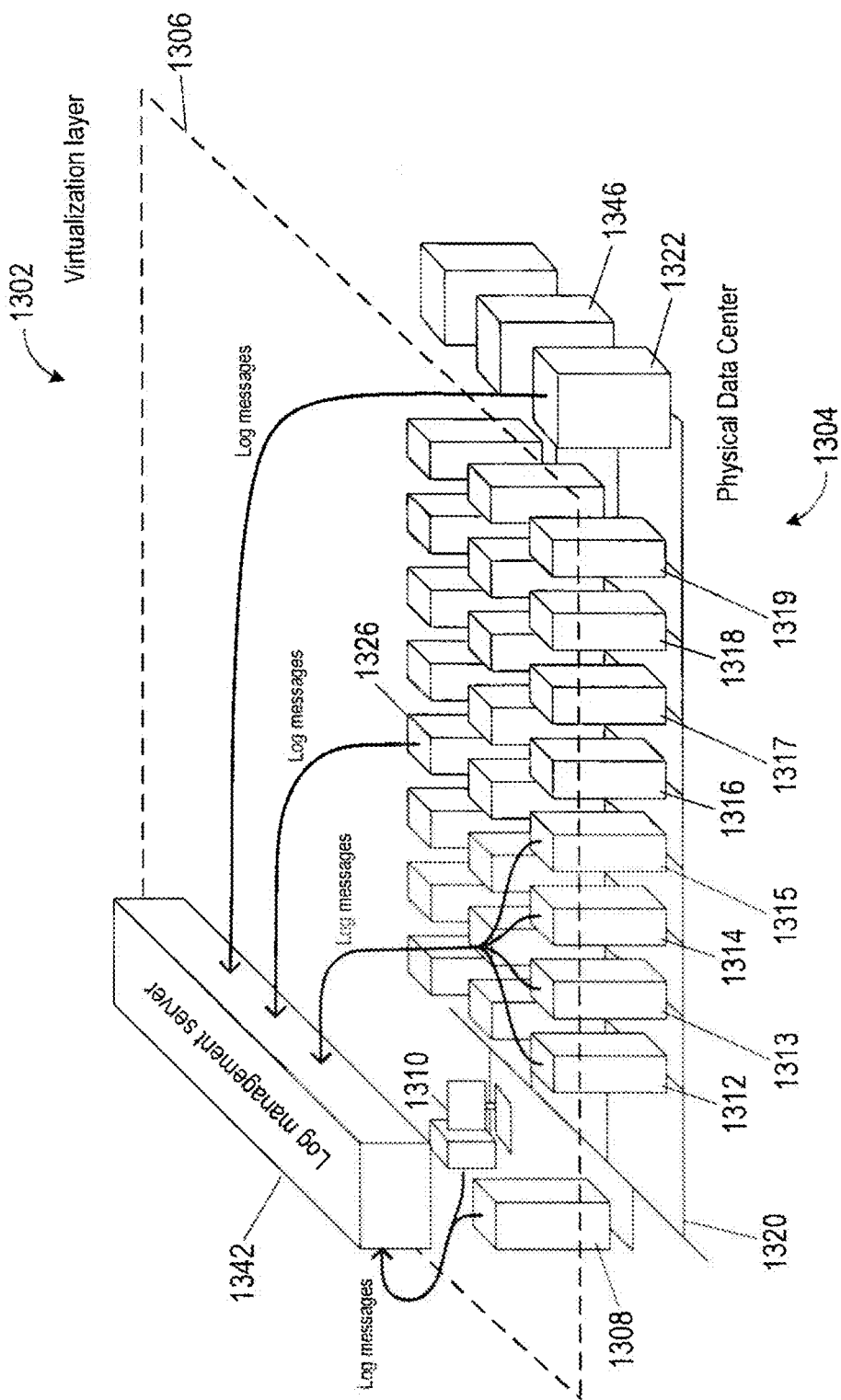
FIGS. 19A-19B show an example of the log management server receiving log messages from event sources.
Figure 19B:
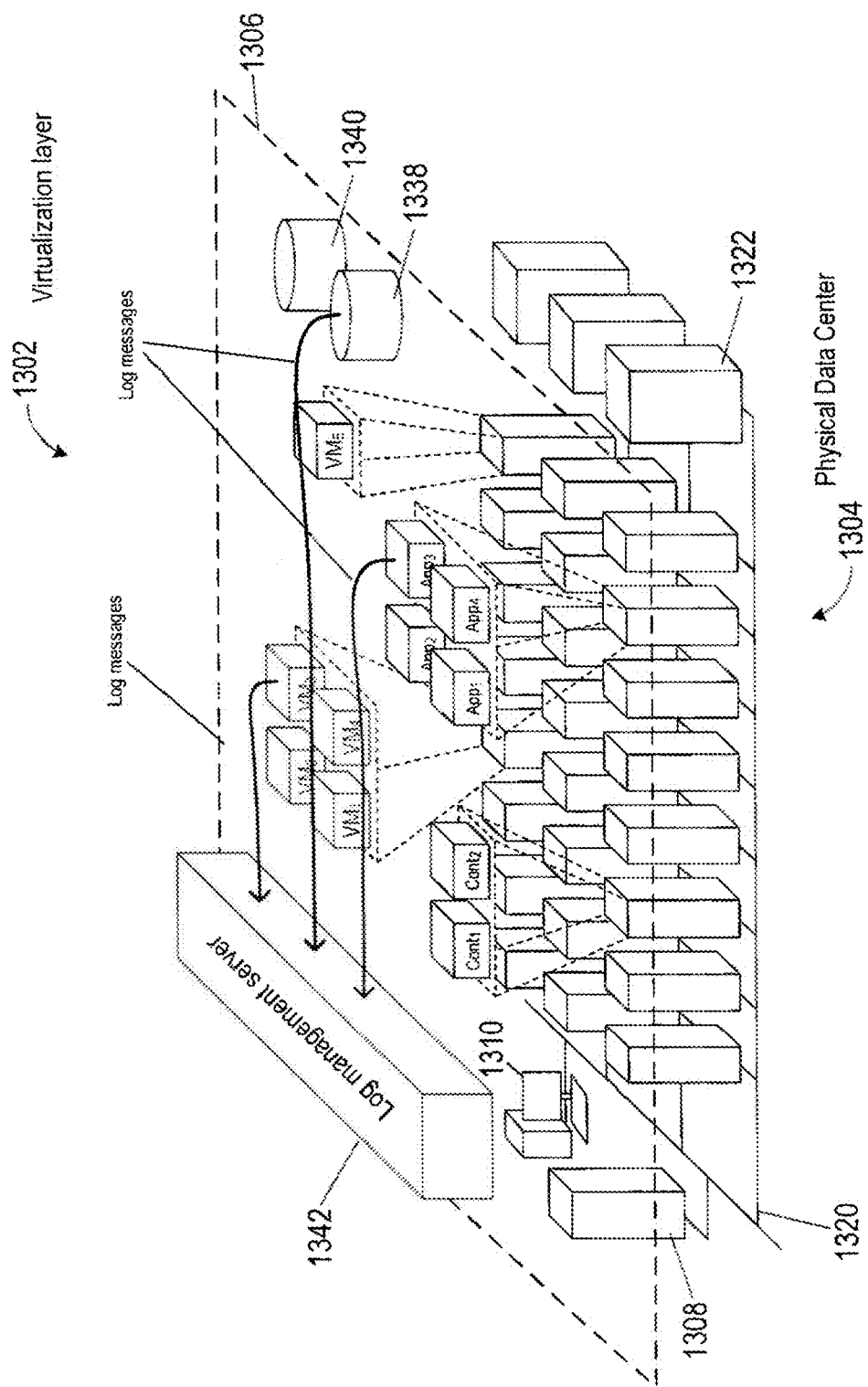

FIGS. 19A-19B show the example log management server 1342 receiving log messages from event sources. Directional arrows represent log messages sent to the log management server 1342. In FIG. 19A, operating systems and applications running on PC 1310, server computers 1308 and 1344, network devices, and mass-storage array 1346 send log messages to the log management server 1342. Operating systems and applications running on clusters of server computers may also send log messages to the log management server 1342. For example, a cluster of server computers 1312-1315 sends log messages to the log management server 1342. In FIG. 19B, guest operating systems, VMs, containers, applications, and virtual storage may independently send log messages to the log management server 1342.

A multi-tenant data center is a facility where organizations called tenants rent server computers to host their applications in VMs or containers, provide services to clients, and rent storage space to store data. The server computers and storage space rented by a tenant and the tenant's applications that are executed and data stored in the data center are called the tenant's system. Typical processes for handling a problem with a tenant's system comprise layers of troubleshooting carried out by different teams of engineers, such as a field engineering team, an escalation engineering team, and a research and development engineering team. Within each layer, the search for a root cause may be gradually narrowed by filtering through different sub-teams. The troubleshooting process may take weeks, and in some cases months, which can frustrate users, damage a brand name of a tenant, result in lost revenue for a tenant, and deny people access to vital services provided by a tenant.

Automated methods and systems described herein are directed to identifying potential root causes of a problem in a data center on demand and in real-time thereby reducing the cost and time typically devoted to root cause detection. A problem in a data center operation is an exceptional condition occurring in the operation of the data center environment. A root cause is a problem that causes other problems in the data center but may not itself have been caused by another problem. Automated methods and systems described herein receive as input a notification of a problem occurring in a data center and a time when the problem was noticed. For example, the time may be related to an alert triggered by systems that monitor performance of data center objects and hardware for problems or when a user, such as system administrator or tenant, noticed a problem with the performance of hardware or execution of services to clients. Methods and systems described below analyze patterns of logging events and words in log messages to identify potential root causes of a problem that triggered an alert or was observed by a user. The potential root cause may then be used by system administrators and/or tenants to diagnose the problem and execute remedial measure to correct the problem.

Figure 20:
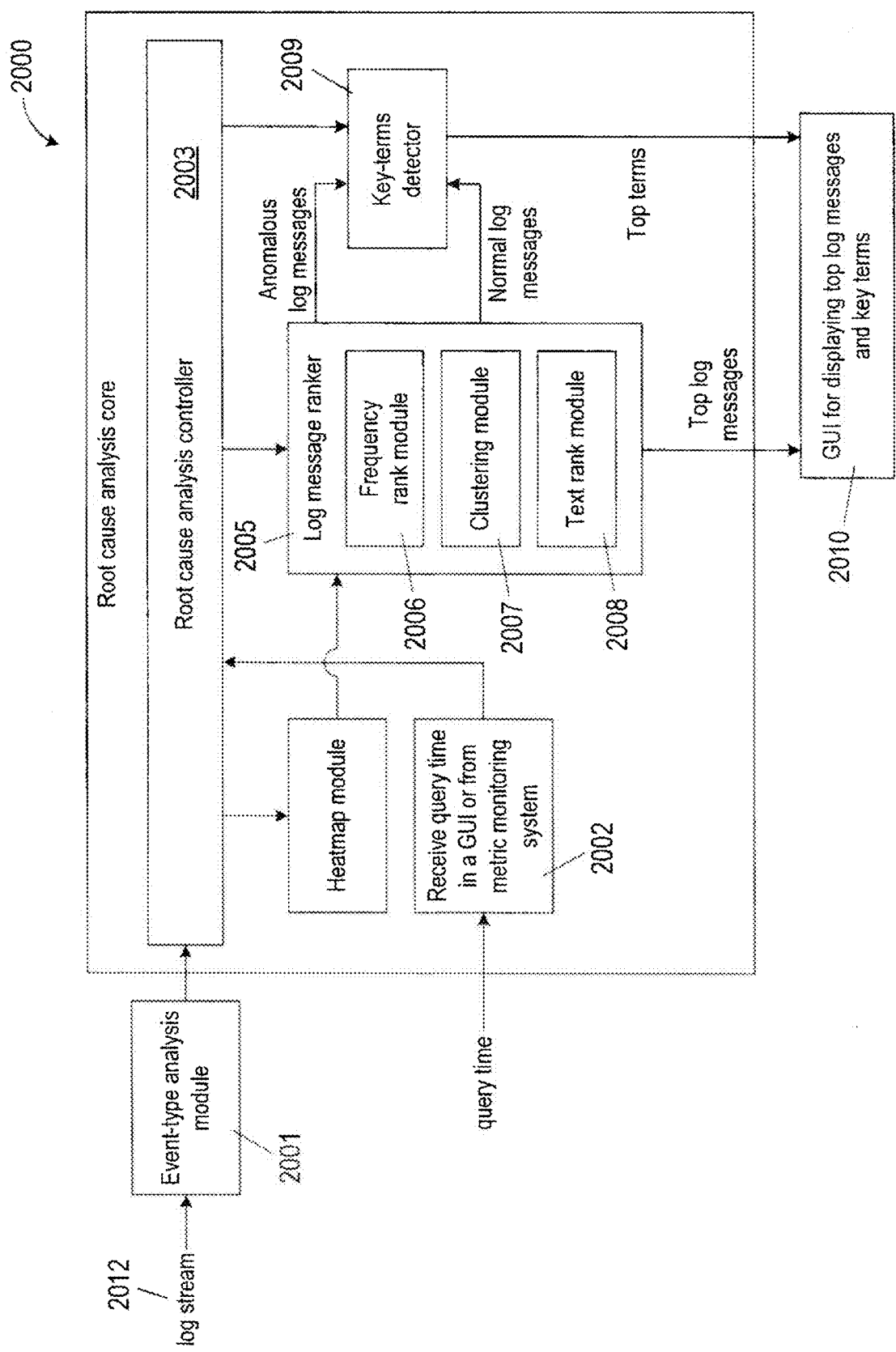
FIG. 20 shows an example architecture of a root cause analysis ("RCA") system for determining potential root causes of problems in a data center.

FIG. 20 shows an example architecture of a root cause analysis ("RCA") system 2000 for determining potential root causes of problems in a data center. The RCA system 2000 may be executed in the log management server 1342 described above. The RCA system 2000 comprises software components called modules that are represented by blocks 2001-2010. Each module executes computational operations that are described separately below. The RCA system 2000 receives as input a stream of log messages 2012 from event sources executing in the data center and receives a query time 2014 from a user, such a system administrator or an application owner. For example, the stream of log messages 2012 may be generated by event sources of a tenant's system. In block 2001, each log message in the stream of log messages 2012 is analyzed to extract the event type of the log message. Ideally, each event type corresponds to a specific log write instruction of an event source.

Figure 21:
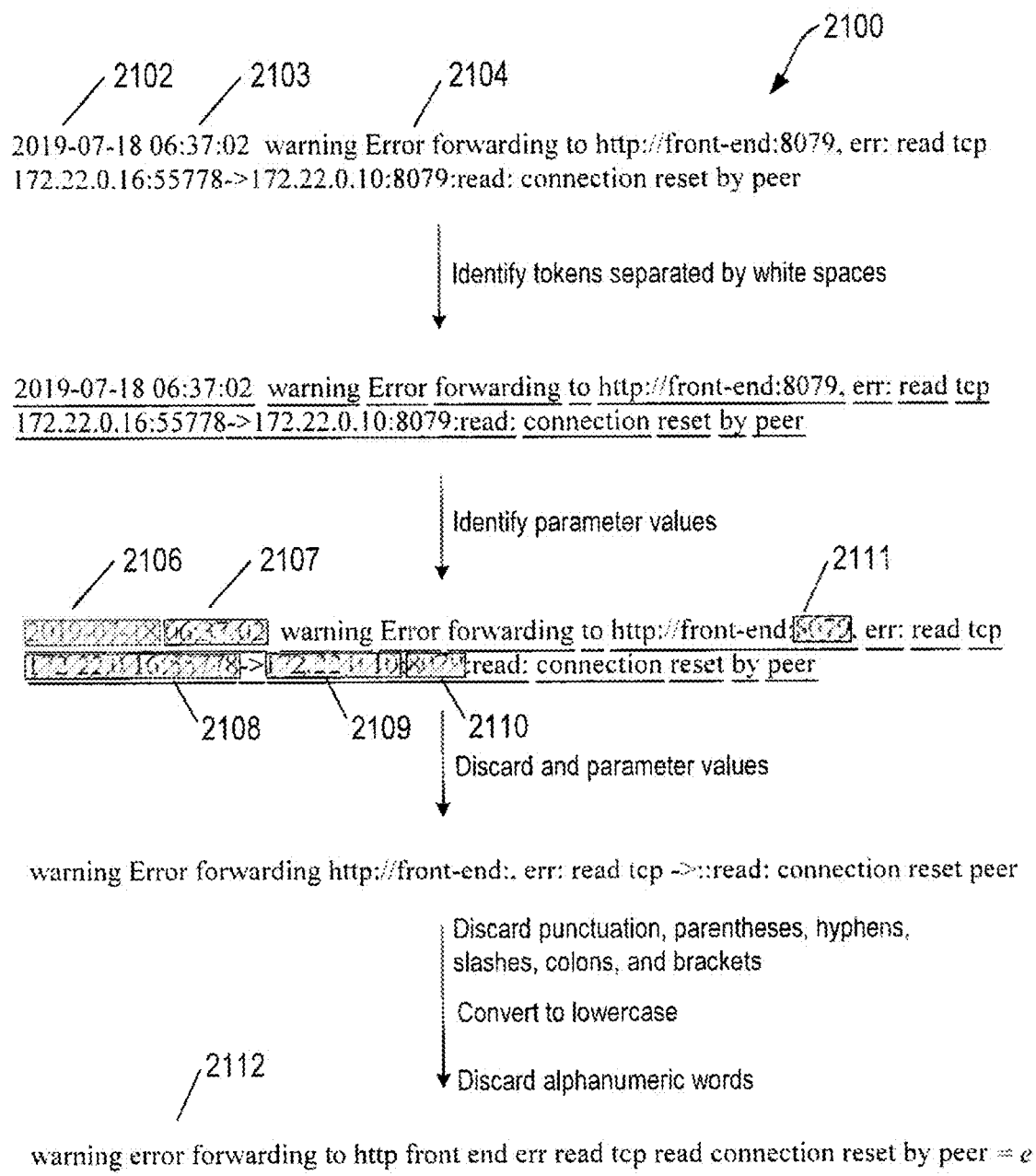
FIG. 21 shows an example of event-type analysis performed on an example log message.

FIG. 21 shows an example of event-type analysis performed on an example log message 2100. The log message 2100 is tokenized by identifying tokens separated by non-printed characters called "white spaces." Tokenization of the log message 2100 is illustrated by underlining of the printed or visible tokens comprised of characters. For example, tokens include the date 2102, time 2103, and words 2104 that are underlined. Next, a token-recognition pass is made to identify parameters. Parameters are tokens or message fields that are likely to be highly variable over a set of messages of a particular type, such as date, time, and IP addresses. Parametric tokens are identified by shading, such as shaded rectangle 2106-2111. Parametric tokens may be discarded leaving the non-parametric text strings, natural language words and phrases, punctuation, parentheses, and brackets. In other implementations, stop words may also be identified and discarded. Stop words are common words, such as "they," "are," "do." etc. that do carry useful information. Various types of symbolically encoded values, including dates, times, machine addresses, network addresses, and other such parameters can be recognized using regular expressions or programmatically. A program or a set of regular expressions can be used to recognize symbolically encoded dates and times in any of the common formats. It is possible that the token-recognition process may incorrectly determine that an arbitrary alphanumeric string represents some type of symbolically encoded parameter when, in fact, the alphanumeric string only coincidentally has a form that can be interpreted to be a parameter. The currently described methods and systems do not depend on absolute precision and reliability of the event-message-preparation process. Occasional misinterpretations may result in mischaracterizing log messages. The log message 2100 is subject to textualization in which an additional token-recognition step of the non-parametric portions of the log message is performed in order to discard punctuation and separation symbols, such as parentheses and brackets, commas, colons, and dashes that occur as separate tokens or that occur at the leading and trailing extremities of previously recognized non-parametric tokens. Uppercase letters may be converted to lowercase letters. The event-type analysis produces an event type 2112 comprising non-parametric words. The event type 2112 represents the log message 2100 and other log messages generated by the same log write instructions. Log messages generated by similar log write instructions may belong to the same event that after applying event-type analysis. In the following discussion, event types are denoted by e.

Returning to FIG. 20, the event types generated in block 2001 and the stream of log messages are sent to the RCA controller 2003. The RCA controller 2003 manages and directs the flow of log messages, event types, and data between modules of the RCA system 2000. For example, the RCA controller 2003 sends the event types generated by the event-type analysis module 2001 to the heatmap module 2004, to the log message ranker module 2005, and to the key-terms detector module 2009. The heatmap module 2004 computes a frequency for each event type in adjacent time windows and constructs a heatmap of the event type occurrences in each time window.

Figure 22:
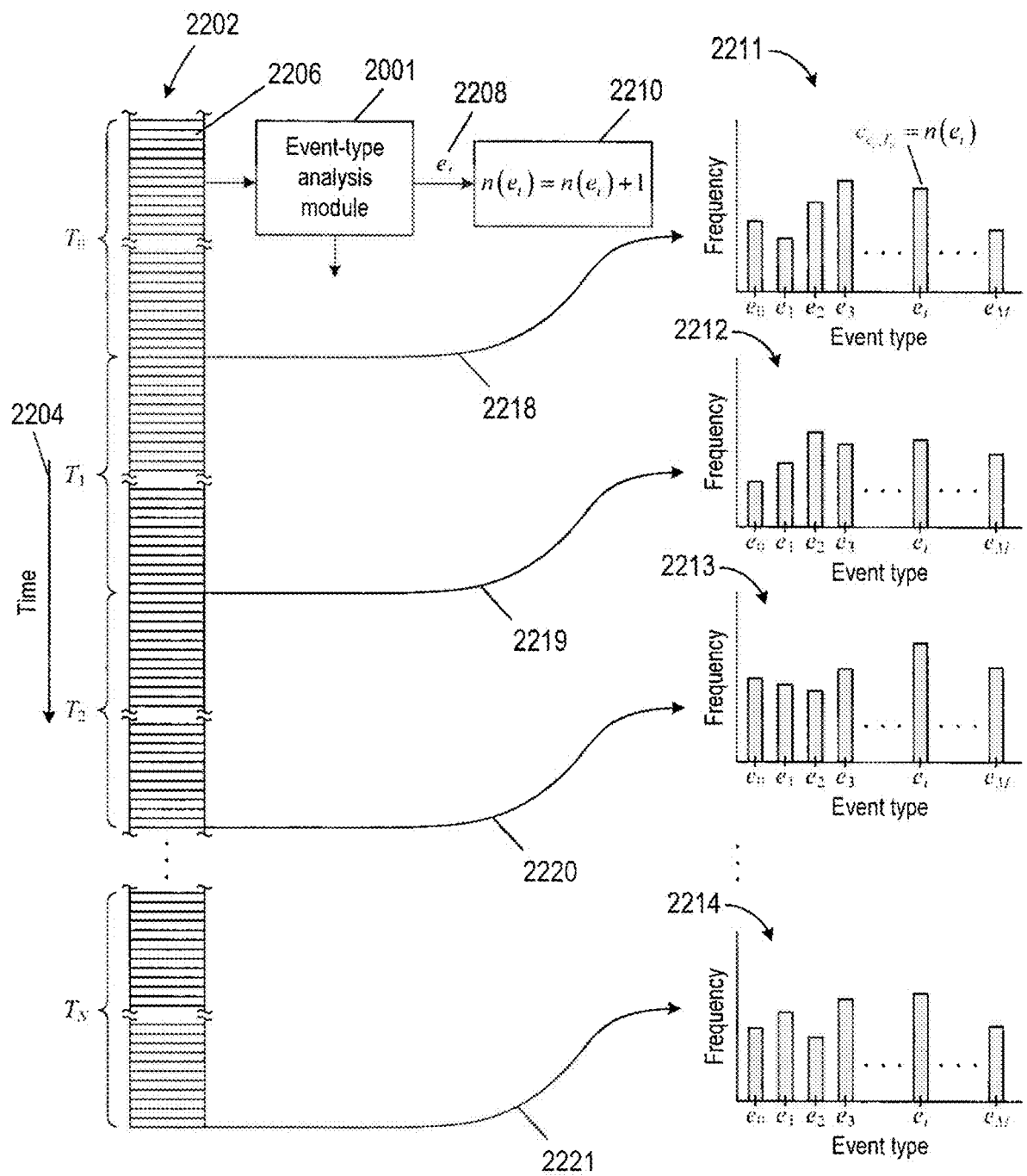
FIGS. 22-24 show generating a heatmap of event types from a stream of log messages in time windows.
Figure 23:
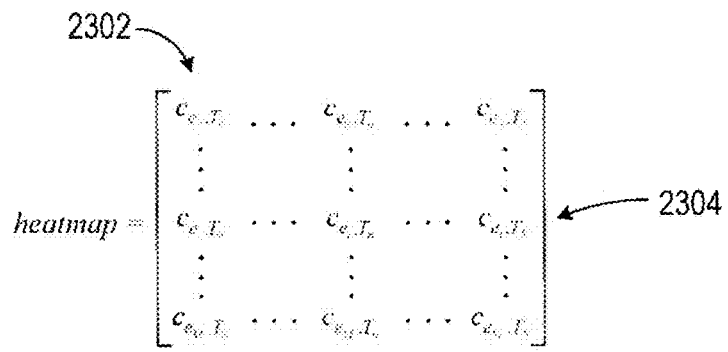
Figure 24:
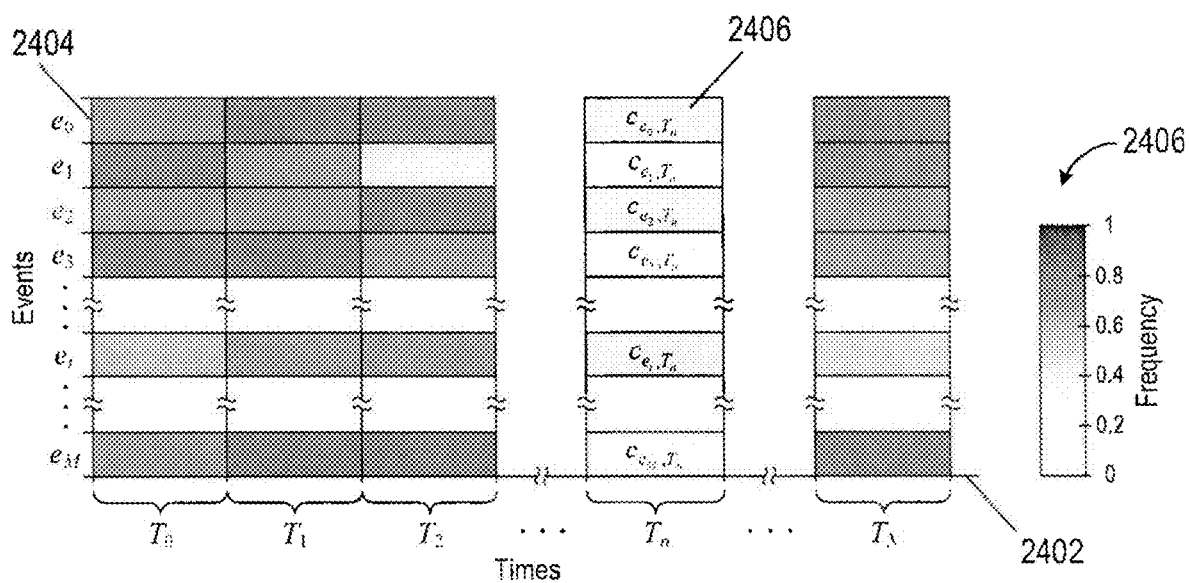

FIGS. 22-24 show generating a heatmap of event types of a stream of log messages in time windows. FIG. 22 shows an example of determining event-type frequencies of event types generated in adjacent time windows. A column of rectangles 2202 represents the stream of log messages sent to the RCA system 2000. Directional arrow 2204 represents increasing time. Each rectangle, such as rectangle 2206, represents a log message. Adjacent time windows denoted by $T_0, T_1, T_2 \ldots, T_N$ are represented by brackets. Each time window is a duration of time with a beginning time and an ending time that encompasses time stamps of log messages that lie within the time window. At the beginning of each time window, heatmap module 2004 resets counters associated with each event type to zero. Let $n(e_i)$ represent an event-type counter for the event type $e_i$. The event-type counter $n(e_i)$ is set equal to zero (i.e., $n(e_i)=0$) for each event type at the beginning of each time window. The event-type analysis module 2001 generates the event type, such as the event type 2208, of each log message in the stream of log messages 2202 as described above with reference to FIG. 21. In block 2210, the heatmap module 2004 increments an event-type counter of the event type generated by the event-type analysis module 2001. At the end of each time window, an event-type frequency is calculated for each of the event types generated in each time window. The event-type frequency is a count of the number of times an event type is generated in a time window is given by $c_{e_i,T_n}=n(e_i)$, where the subscript $T_n$ represents the n-th time window. Example histograms 2211-2214 represent the frequencies of the event types generated in the corresponding time windows $T_0, T_1, T_2$, and $T_N$. For example, bar 2216 in histogram 2213 represents the event-type frequency $c_{e_i,T_n}$ for the event type generated in the time window $T_2$. Directional arrows 2218-2221 represent computing the event-type frequencies displayed in histograms 2211-2214 for each of the event types generated in the time windows $T_0, T_1, T_2 \ldots, T_N$.

FIG. 23 shows a matrix of the event-type frequencies of the event types generated in the time windows $T_0, T_1, T_2 \ldots, T_N$. Each column, such as column 2302, represent the event-type frequencies of the event type generated in a particular time window. Each row, such as row 2304, represents the event-type frequencies of an event type generated in the adjacent time windows.

The event-type frequencies may be displayed in a heatmap in which each event-type frequency is represented by a shade of color. For example, a heatmap of event-type frequencies may be displayed in a graphical user interface ("GUI") that enables a user to spot suspicious patterns in the frequency of event types.

FIG. 24 shows a portion of an example event-type frequency heatmap that may be displayed in a GUI. Horizontal axis 2402 represents time. Vertical axis 2404 represents the event types in the stream of log messages. Shaded cells represent the frequency of an event type in a time window. The shading of each cell corresponds to an event-type frequency. In this example, a lighter shaded cell represents a relatively lower range of event-type frequencies than a darker shaded cell as indicated by a frequency key 2406. For example, the shade of cell 2408 represents an event-type frequency $c_{e_0,T_n}$ of the event type $e_0$ and corresponds to a frequency 2410 in the frequency key 2406.

Figure 25A:
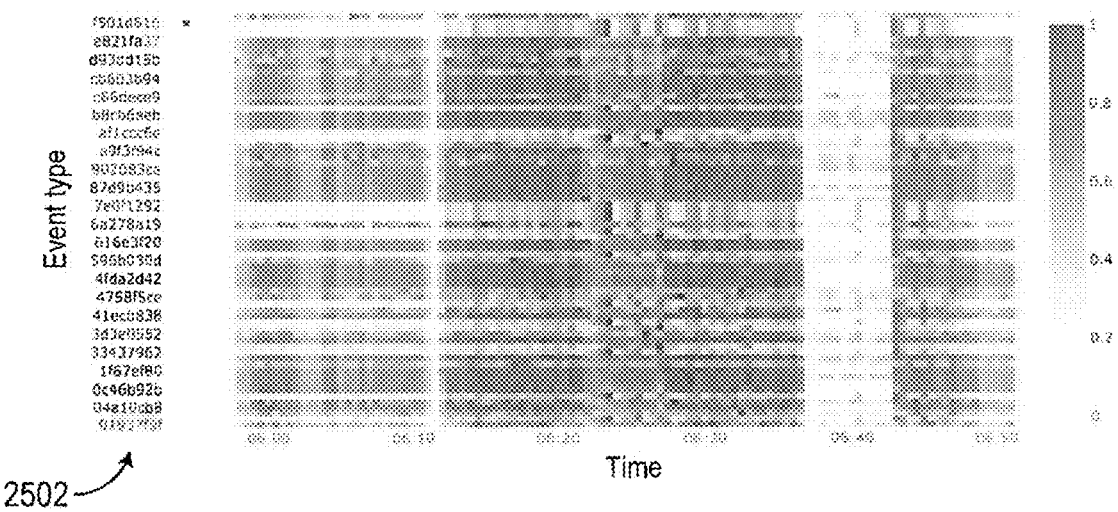
FIGS. 25A-25C show an example of an event-type frequency heatmap for a database failure incident.
Figure 25B:
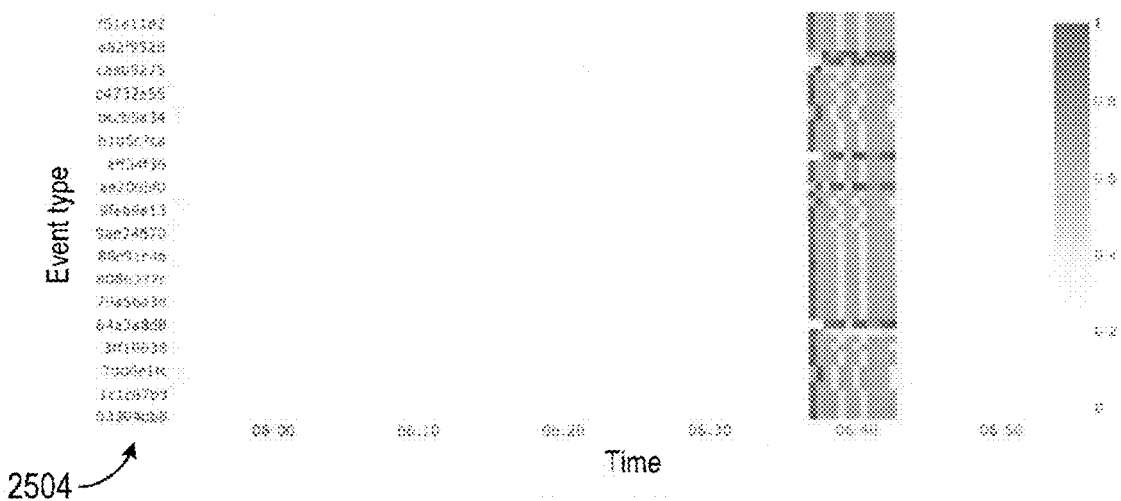
Figure 25C:
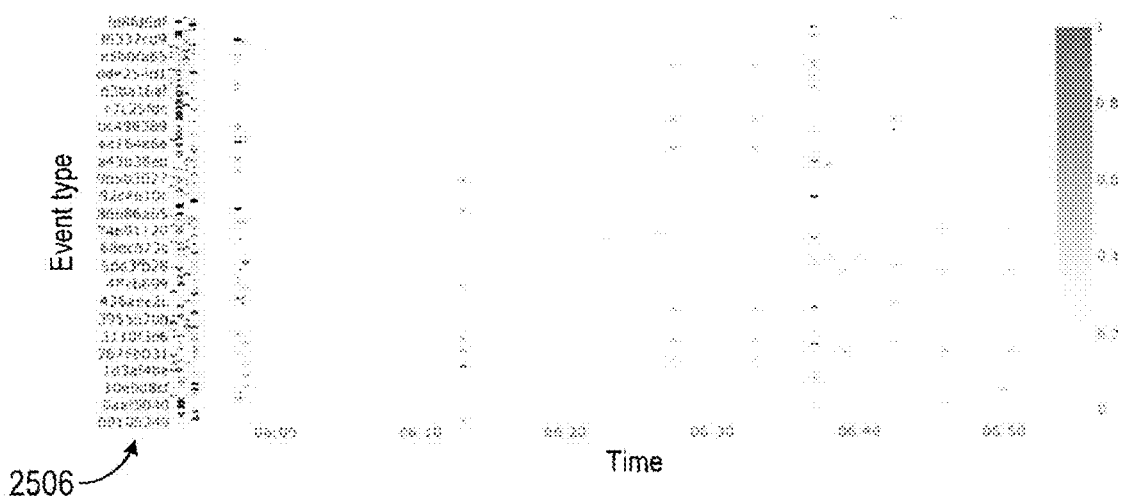

FIGS. 25A-25C show an example of an event-type frequency heatmap for a database failure incident. Each shaded cell represents an event-type frequency of an event type in a 30 second time window. The event types of the stream of log message generated by the database are listed in columns 2502, 2504, and 2506. Each row of cells represents the event-type frequencies of an event type generated in the 30 second time windows. Each column represents the event-type frequencies of the event types generated in the same 30 second time window. The event types are grouped into three groups based on similarity patterns. FIG. 25A displays event types with event-type frequencies occurring according to a first similarity pattern. FIG. 25B displays event types with event-type frequencies according to a second similarity pattern. The database failure corresponds to a high frequency of event types in a time interval around 06:40 (i.e., dark shaded cells) in FIG. 25B and lower frequency event types in the same time interval around 06:40 (i.e., light shaded cells) in FIG. 25B. FIG. 25C displays event types with event-type frequencies occurring according to a third similarity pattern.

Returning to FIG. 20, in block 2002, the RCA system 2000 may generate a GUI that enables a user, such a system administrator or a tenant, to input a query time denoted by T. The user may input the query time T in response to observing a problem with the execution of objects or a problem with hardware in the data center. In another implementation, the query time T may the time when an alert is generated by monitoring systems that detect anomalous behavior in streams of metric data generated by data center hardware and data center objects. For example, VMware vRealize Operations and VMware Wavefront monitor streams of metric data for anomalous behavior and detect the time when anomalous behavior is observed. The query time input to the RCA system 2000 may be the time when an alert is triggered or the time when the anomalous behavior is detected by the monitoring system. The RCA controller 2003 passes the query time and the stream of log messages to a log message ranker 2005 that identifies log message candidates that may be used to determine a potential root cause of the problem identified by the user or identified by the monitoring system. The log message ranker 2005 executes a frequency ranker module 2006, a clustering module 2007, and a text ranker module 2008.

After receiving the query time T, the RCA controller 2003 creates a search window denoted by $[T-\Delta,T]$, where $\Delta$ is the size of the search window. The size of the search window is selected so that the search window encompasses log messages generated with time stamps prior to the query time. The size $\Delta$ of the search window may be set to any duration, such as about 1 minute, about 5 minutes, about 10 minutes, about 15 minutes or longer. The search window also encompasses earlier time windows. If, for example, the size of the search window is set to 10 minutes and the time windows have a duration of 30 seconds, then the search window encompasses anywhere from 19-20 time windows with log messages generated prior to the query time.

Figure 26:
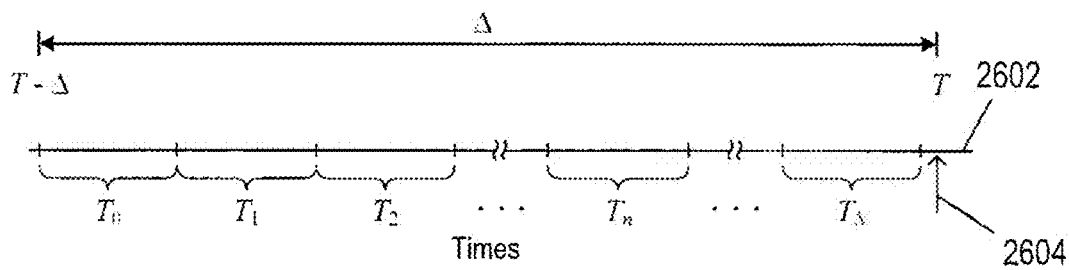
FIG. 26 shows an example of a search window that encompasses numerous adjacent time windows.

FIG. 26 shows an example of a search window that encompasses numerous adjacent time windows. Horizontal line 2602 represents a time axis. Arrow 2604 identifies the query time T on the time axis 2602. Double headed arrow 2606 represents the size $\Delta$ of the search window that encompasses the time windows $T_0, T_1, T_2 \ldots, T_N$. In other words, the search window encompasses the log messages with time stamps in the time windows $T_0, T_1, T_2 \ldots, T_N$.

Log messages often record metrics that may be converted into streams of metrics by the log message ranker 2005. For example, web service applications typically record various statistics of each client request processed by the service application in log messages. The statistics include response times to client requests and HTTP ("hypertext transfer protocol") response codes. The log message ranker 2005 uses regular expressions to extract stream of metric data from log messages. A regular expression ("regex") is specially encoded string that is used to match patterns in log messages. A regex may be used by the log message ranker 2005 to extract a type of metric from log messages that match the format of the regex. A regex is constructed to match a pattern of tokens and parameters of a particular log message format and includes a capture group that allows the log message ranker 2005 to extract values of a particular type of metric from log messages that match the format of the regex. In other words, a regex may be used to extract a value from a log message based on the location of the value in the pattern of tokens and parameters in the log message that match the format of the regex. A throughput metric may be determined from a frequency count of log messages that match certain parameters of a regex. For example, a regex may be constructed to match the pattern of a particular log message format. When a pattern match is detected an associated throughput counter is incremented in time intervals of the search, such as the time windows. The values of the throughput counters in each time interval of the search window form a throughput metric.

Figure 27:
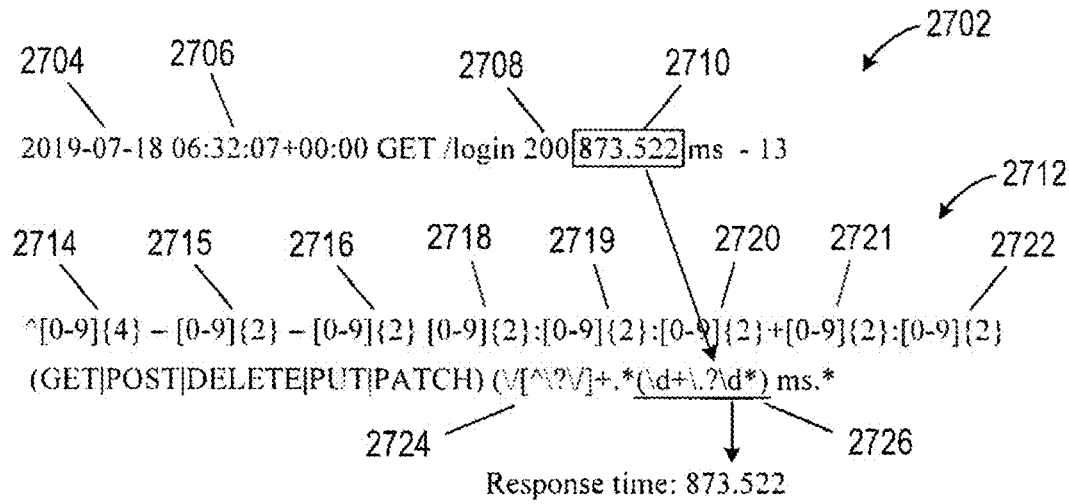
FIG. 27 show an example of a regular expression that may be used to extract response times from log messages.

FIG. 27 show an example of a regular expression that may be used to extract response times from log messages with a particular log message format. Log message 2702 records a date 2704 and a time 2706 when the log message 2702 was generated, an HTTP response code 2708 and a response time 2710 outlined by a rectangle. Regex 2712 is configured to extract the numerical values from log messages with a particular log message format that corresponds to the log message 2702. Capture groups 2714-2716 extract the year, month, and day of the date 2704, capture groups 2718-2722 extract the time 2706, capture group 2724 extracts the HTTP response code 2708, and underlined capture group 2726 extracts the response time 2710. The extracted date, time, and response time are recorded to obtain a metric value of a response time metric.

Figure 28:
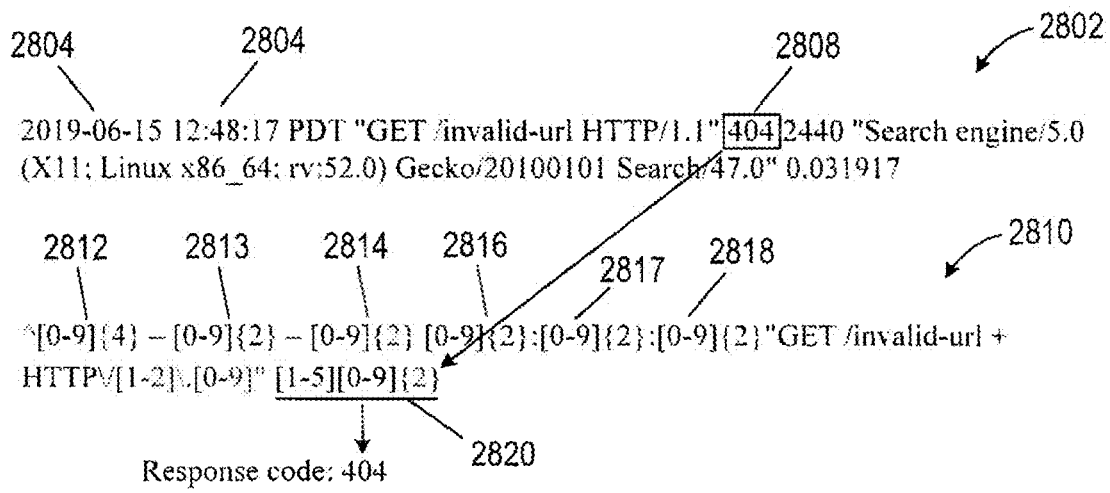
FIG. 28 show an example of a regular expression that may be used to extract response codes from log messages.

FIG. 28 show an example of a regular expression that may be used to extract response codes from log messages with a particular log message format. Log message 2802 records a date 2804 and a time 2806 when the log message 2802 was generated and an HTTP response code 2808 outlined by a rectangle. Regex 2810 is configured to extract the numerical values from log messages with a particular log message format that corresponds to the log message 2802. Capture groups 2812-2814 extract the year, month, and day of the date 2804, capture groups 2816-2818 extract the time 2806, and underlined capture group 2820 extracts the response code 2808. The extracted date, time, and response code are recorded to obtain a metric value of a response code metric.

Figure 29:
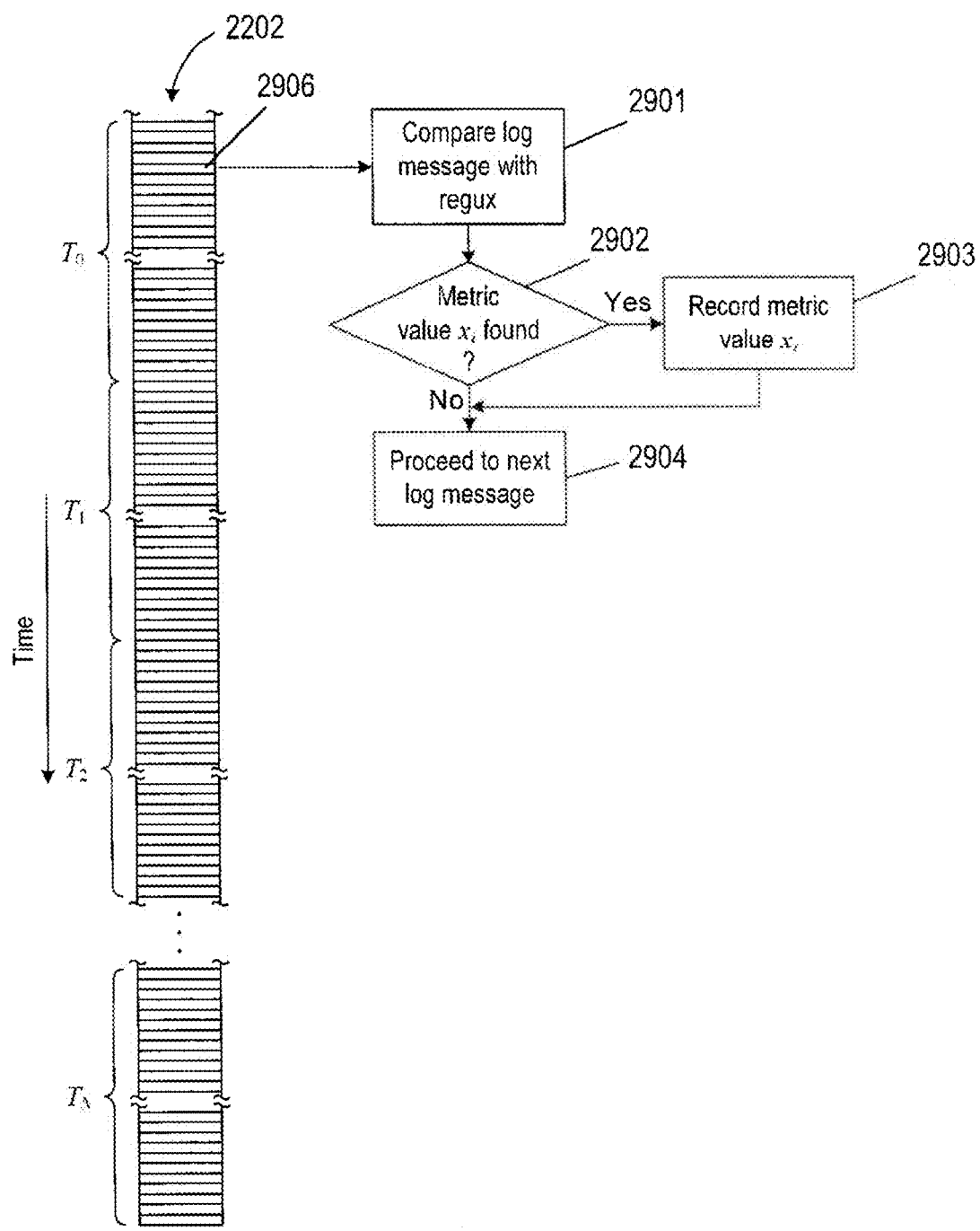
FIG. 29 shows a process for extracting metric values from log messages in a search window that encompasses the time windows of the stream of log messages in FIG. 22.

FIG. 29 shows a process for extracting metric values from log messages in a search window that encompasses the time windows of the stream of log messages 2202 in FIG. 22. The operations represented by blocks 2901-2904 are repeated for each of the log messages. In block 2901, a log message, such as the log message 2906, is compared with the encoded format of a regex. In decision block 2902, if the encoded format of the regex matches the token and parameter format of the log message 2906, as described above with reference to FIGS. 27 and 28, the metric value and corresponding time stamp denoted by $x(t_i)$ are extracted and control flows to block 2903. In block 2903, the metric value and time stamp are recorded to form a sequence of metric values. In block 2904, the process proceeds to the next log message.

Each stream of metric data extracted from the log messages in the search window is a sequence of time-ordered metric values with a corresponding time component that corresponds to the time stamps of the log messages. A stream of metric data is simply called a "metric" and is denoted by $$v = (x_i)_{i=1}^{N_v} = (x(t_i))_{i=1}^{N_v} \qquad (1)$$

where $N_v$ is the number of metric values in the sequence;

$x_i = x(t_i)$ is a metric value;

$t_i$ is a time stamp of the corresponding log message; and subscript i is a time stamp index $i=1, \ldots, N_v$.

Figure 30:
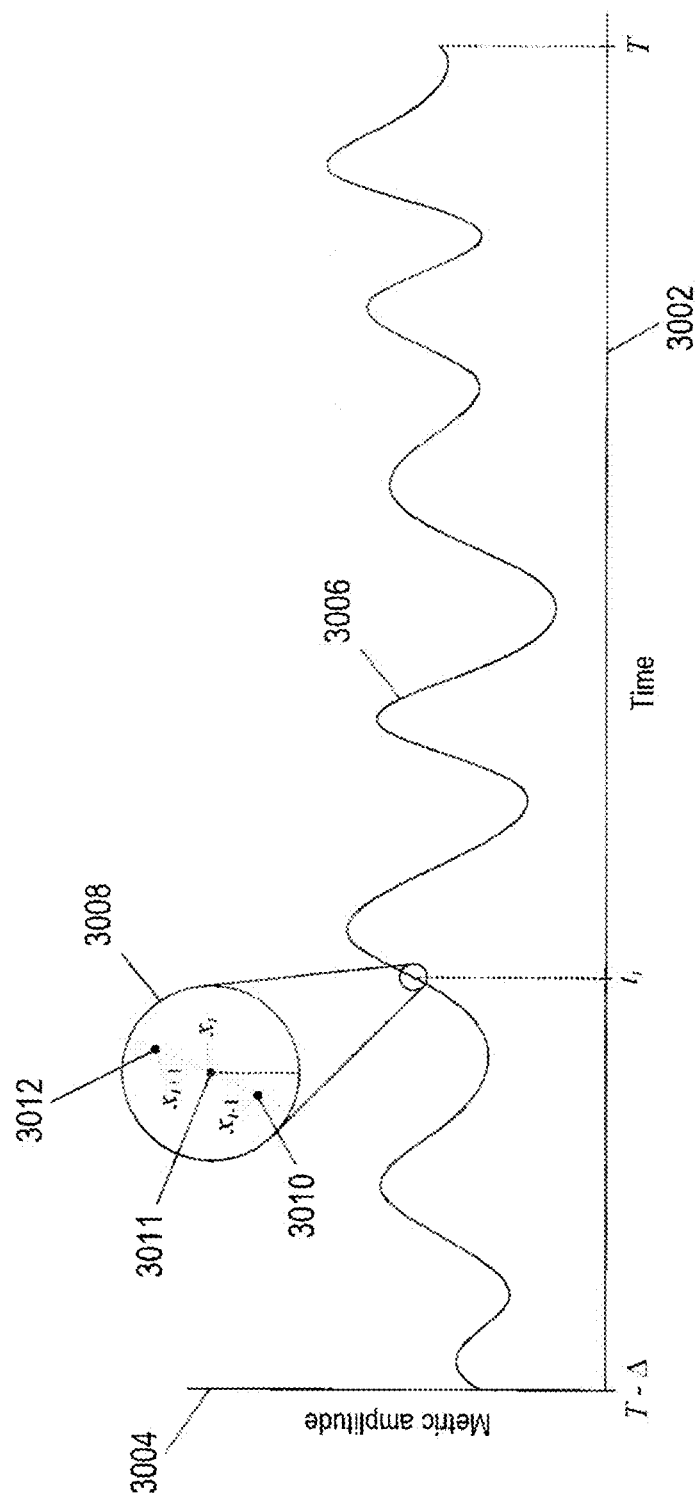
FIG. 30 shows a plot of an example metric extracted from log messages in a search window.

FIG. 30 shows a plot of an example metric extracted from log messages in a search window. Horizontal axis 3002 represents the duration of the search window. Vertical axis 3004 represents a range of metric value amplitudes. Curve 3006 represents the form of metric values extracted from the log messages as time series data. The metric actually comprises a sequence of discrete metric values in which each metric value is recorded in a data-storage device. FIG. 30 includes a magnified view 3008 of three consecutive metric values represented by points. Each point represents an amplitude of the metric at a corresponding time stamp. For example, points 3010-3012 represent three consecutive extracted metric values (i.e., amplitudes) $x_{i-1}$, $x_i$, and $x_{i+1}$ with corresponding time stamps $t_{i-1}$, $t_i$, and $t_{i+1}$. For example, the metric values may represent response times for a server application or HTTP response codes.

After converting streams of log messages to metrics, anomaly detection is used to check for anomalous behavior in the metrics. In one implementation, a standard score may be used to measure the number of standard deviations each metric value deviates from other metric values of a metric. For each metric, the standard score of a metric value $x_i$ is computed over the K metric values in the metric as follows:

$$z_i = \frac{|x_i - \mu|}{s} \qquad (2a)$$

where $\mu$ is the mean of the K metric values in the search window:

$$\mu = \frac{1}{K} \sum_{i=1}^{K} x_{n-k+i}$$

and $s$ is the sample standard deviation of the K metric values in the search window:

$$s = \sqrt{\frac{1}{K-1} \sum_{i=1}^{K} (x_{n-K+1} - \mu)^2}$$

Anomalous metric values may be detected using a standard-score threshold given by $$Th_G = \frac{(K-1)}{K} \sqrt{\frac{(t_{\alpha/2K,K-2})^2}{K-2+(t_{\alpha/2K,K-2})^2}} \quad (2b)$$

The parameter $t_{\alpha/2K,K-2}$ is a critical value of a t-distribution of the metric values of the stream of metric data at the time stamp $t_i$ with K-2 degrees of freedom and a significance level of α/2K. The critical value of a t-distribution with K-2 degrees of freedom can be computed with a percent point function (i.e., inverse of cumulative distribution function) of the t-distribution. The t-distribution does not exist in closed form and is numerically approximated. When the standard-score of a metric value $x_i$ satisfies the condition, $Z_i > Th_G$, the metric value $x_i$ indicates anomalous behavior at the time stamp $t_i$. The time stamp $t_i$ is identified as a start time when anomalous behavior began at the event source. When the standard score satisfies the $Z_i \leq Th_G$, the metric value $x_i$ indicates normal behavior at the event source.

In another implementation, the start time for an anomaly recorded in a metric may be determined from a gamma distribution of the metric. A gamma cumulative distribution function ("CDF") is computed from the metric over the search window. The gamma CDF is given by $$P(x_i) = \frac{\gamma(k, x_i/\theta)}{\Gamma(k)}$$

where $$k = \frac{\mu^2}{\text{Var}}$$

$$\theta = \frac{\text{Var}}{\mu}$$

$$\mu = \frac{1}{N}\sum_{i=1}^{N} x_i$$

$$\text{Var} = \frac{1}{N}\sum_{i=1}^{N}(x_i - \mu)^2$$

The numerator $\gamma(k, x_i/\theta)$ is the incomplete gamma function and the denominator $\Gamma(k)$ is the gamma function. A cumulative probability, $P(x_i)$, is computed for each metric value $x_i$ based on the gamma CDF. If the cumulative probability satisfies the condition $P(x_i) \geq Th_u$ or satisfies the condition $P(x_i) \leq Th_l$, the corresponding time stamp $t_i$ of the metric value $x_i$ is the start time of anomalous behavior. Other methods for detection of anomalies in streams of metric data may be used as described in U.S. patent application Ser. No. 16/682,255 filed Nov. 13, 2019, which is hereby incorporated by references.

Figures 31A, 31B:
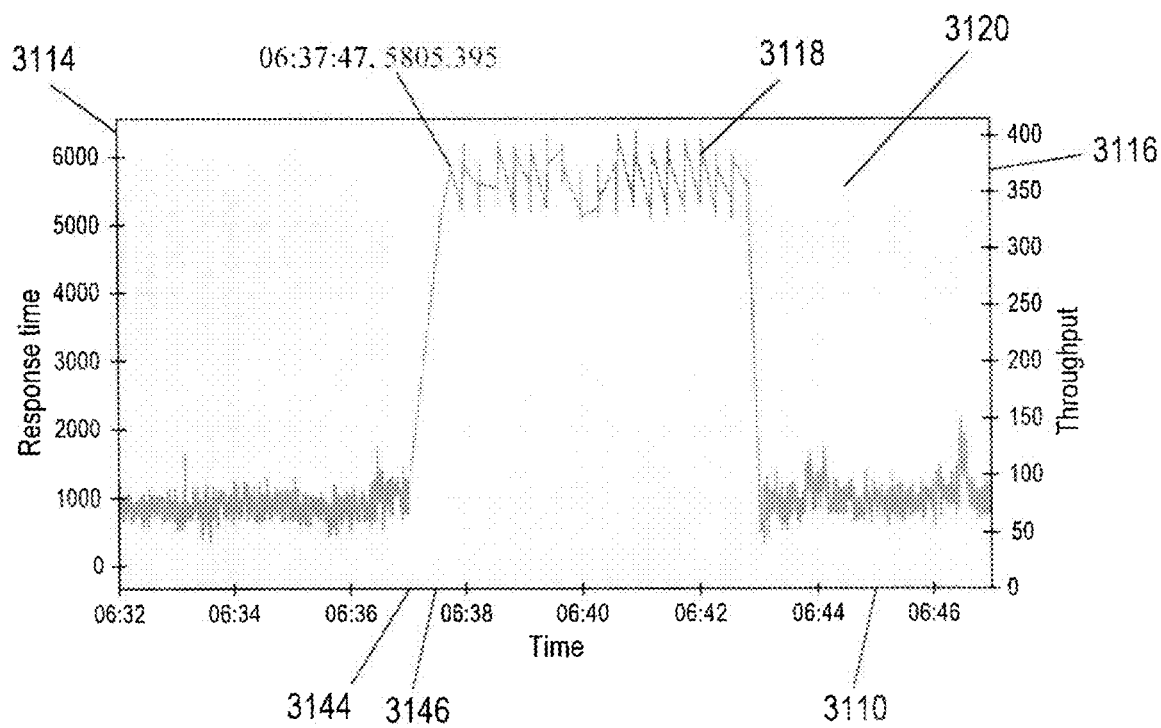
FIGS. 31A-31D show an example of detecting a start time of anomalous behavior from two metrics collected from a stream of log messages.
Figure 31C:
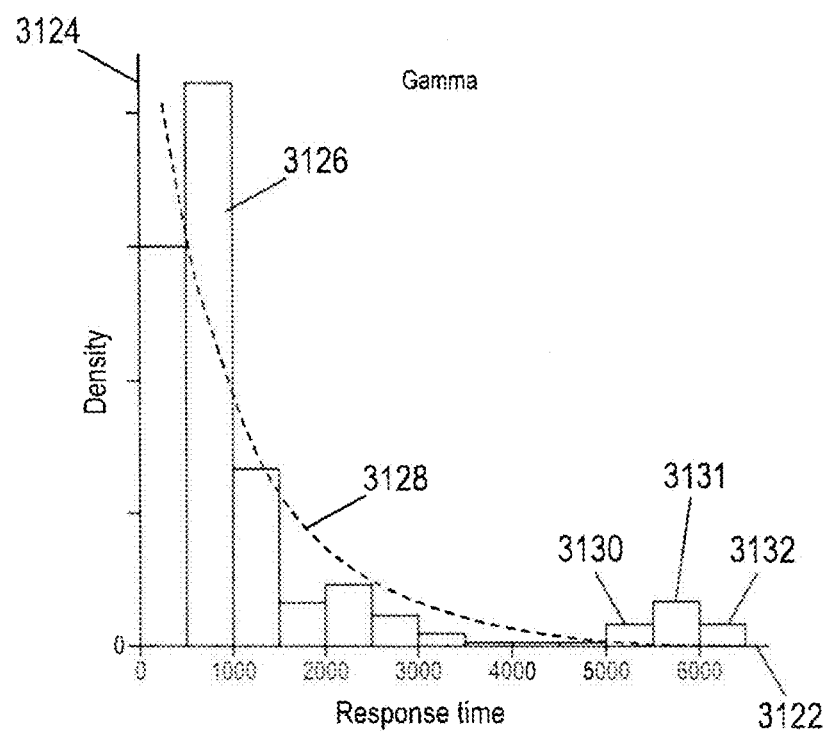
Figure 31D:
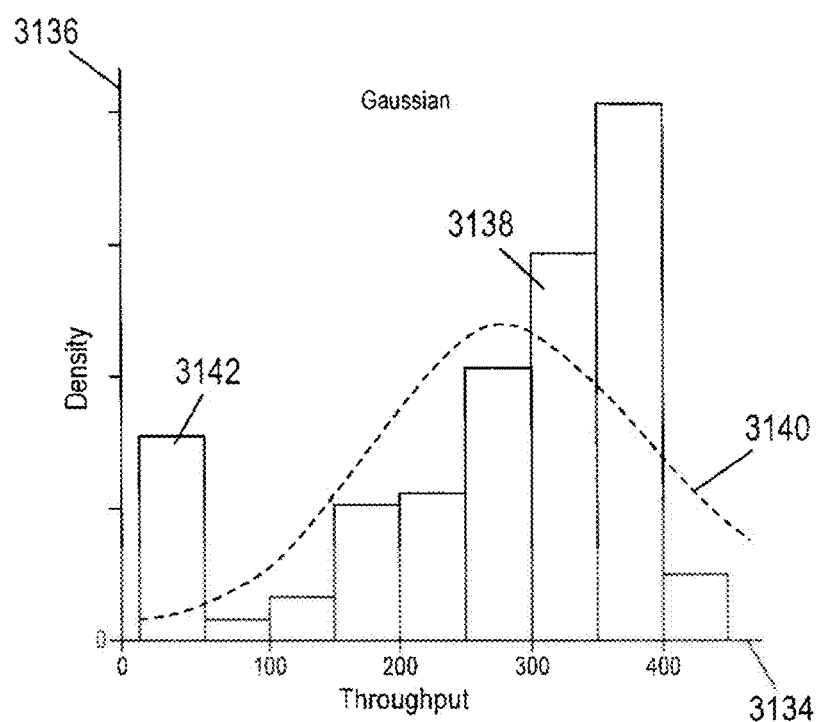

FIGS. 31A-31D show an example of detecting a start time of anomalous behavior from two metrics collected from a stream of log messages. FIG. 31A shows examples of log messages with responses times in milliseconds that may be extracted using the regex shown in FIG. 27. For example, log message 3102 has a response time 1026.471 ms 3104 and log message 3106 has a response time 6231.474 ms 3108. FIG. 31B shows a plot of response times and throughput metrics. Horizontal axis 3110 represents a portion of a search window. Vertical axis 3112 represents response time. Vertical axis 3114 represents a throughput count. Response-time curve 3118 represents extracted response times from log messages with time stamps in the search window. A throughput metric is represented by bars, such as bar 3120. Each bar represents a throughput count in a short interval of the search window. The response-time curve 3118 displays a sharp increase to a response time 5805.395 ms at time 06:37:47 and the throughput drops at about the same time. The time 06:37:47 may be used to mark a start time for anomalous behavior or the time when the through dropped may be used to mark a stat time for anomalous behavior. FIG. 31C shows a histogram of response times. Horizontal axis 3122 represents a range of response times and corresponds to the response-time axis 3114 in FIG. 31B. Vertical axis 3124 represents density or count of response time values in response time intervals. Bars, such as bar 3126, represent counts of the number of response time values that lie within corresponding response time intervals. The response times extracted from the log messages follow a Gamma distribution represented by dashed curve 3128. Bars 3130-3132 correspond to response times in the time interval 06:37:47 to 06:42:50 in FIG. 31B. FIG. 31D shows a histogram of throughput. Horizontal axis 3134 represents a range of response times and corresponds to the throughput axis 3116 in FIG. 31B. Vertical axis 3136 represents density or count of throughputs. Bars, such as bar 3138, represent a throughput count in intervals of the range of throughput counts. The throughput counts extracted from the log messages follow a t-distribution represented by dashed curve 3140. Bar 3142 is a sum of the throughput counts 3144 and 3146 in FIG. 31B and corresponds to the drop in throughput counts shown in FIG. 31B.

A time of a change in the number of occurrences of log messages with the same event type may be used as a start time for anomalous behavior. The number of occurrences of log messages with the same event type in time intervals of the search window form a metric with metric vales denoted by $x_i$. The standard score described above with reference to Equation (2a) and standard-score threshold of Equation (2b) may be used to determine when the change in the number of occurrences of the log messages associated with an event type indicates anomalous behavior and the start time of the anomalous behavior.

Figure 32:
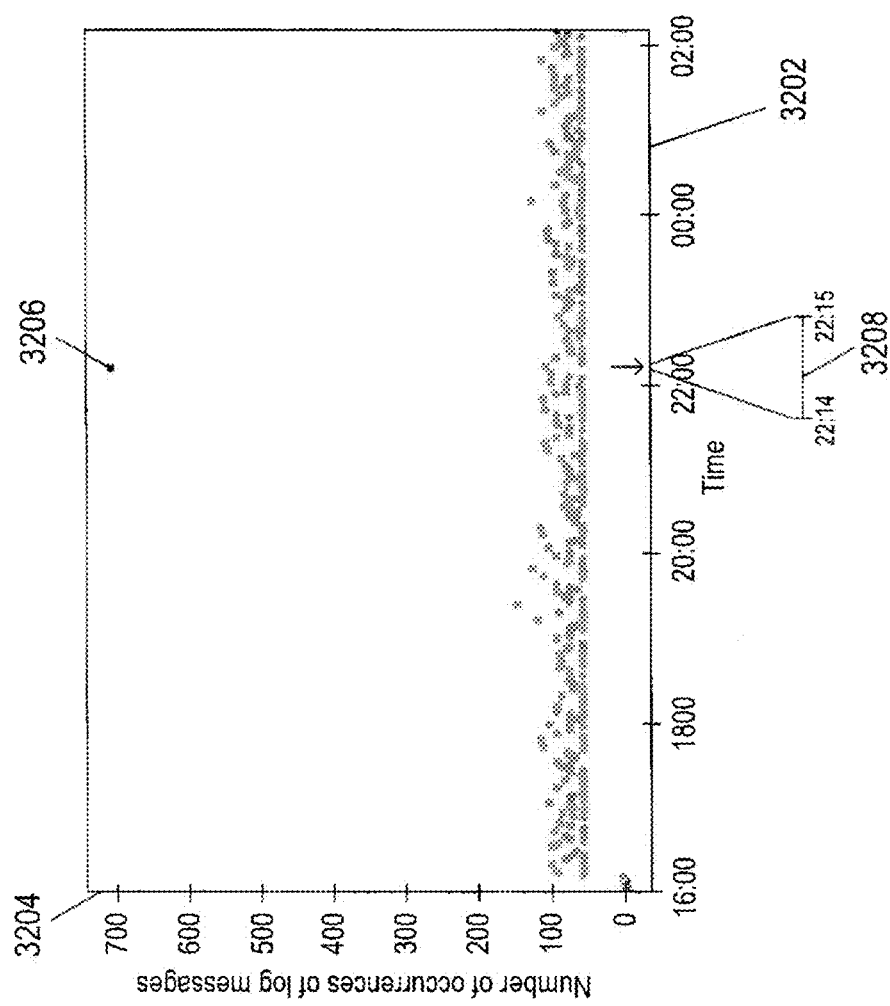
FIG. 32 shows a plot of the number of occurrences of log messages with the same event type.

FIG. 32 shows a plot of the number of occurrences of log messages with the same event type. Horizontal axis 3202 represents the duration of a search window. Vertical axis 3204 represents the number of occurrences of log messages with the same event type. Dots represents the number of occurrences of log messages with the event type in time intervals of the search window 3202. For example, dot 3206 represents the number of occurrences of log messages with the same event type in the time interval 3208. In this case, the standard score of the log messages generated in the time interval 3208 is greater than the corresponding standard-score threshold computed according to Equation (2b). The midpoint of the interval 22:14:30 may be used as the start time of the anomalous behavior.

When a start time for anomalous behavior is detected from the one or more of metrics extracted from the stream of log messages, the start time is mapped to a time window in the heatmap of event-type frequencies. Returning to FIG. 20, a frequency ranker module 2006 computes an anomaly score for each event type. The anomaly scores are used to rank the event types. The anomaly score for each event type in the heatmap of event-type frequencies is given by:

$$score(e_i, T_n) = \frac{|c_{e_i,T_n} - \mu_{e_i,T_n}|}{\sigma_{e_i,T_n}} \quad (3)$$

where $T_n$ is a time window that contains the start time of anomalous behavior and is encompassed by the search window;

$$\mu_{e_i,T_n} = \frac{1}{n}\sum_{j=1}^{n} c_{e_i,T_j}$$

$$\sigma_{e_i,T_n} = \sqrt{\frac{1}{n}\sum_{j=1}^{n}(c_{e_i,T_j} - \mu_{e_i,T_n})^2}$$

The anomaly scores computed for each of the event types are used to rank order the event types from largest anomaly score to smallest anomaly score. Log messages that correspond to event types with the K largest anomaly scores are considered the log messages most are likely to provide information that may be used to determine the potential root causes of the problem in the data center.

Figure 33:
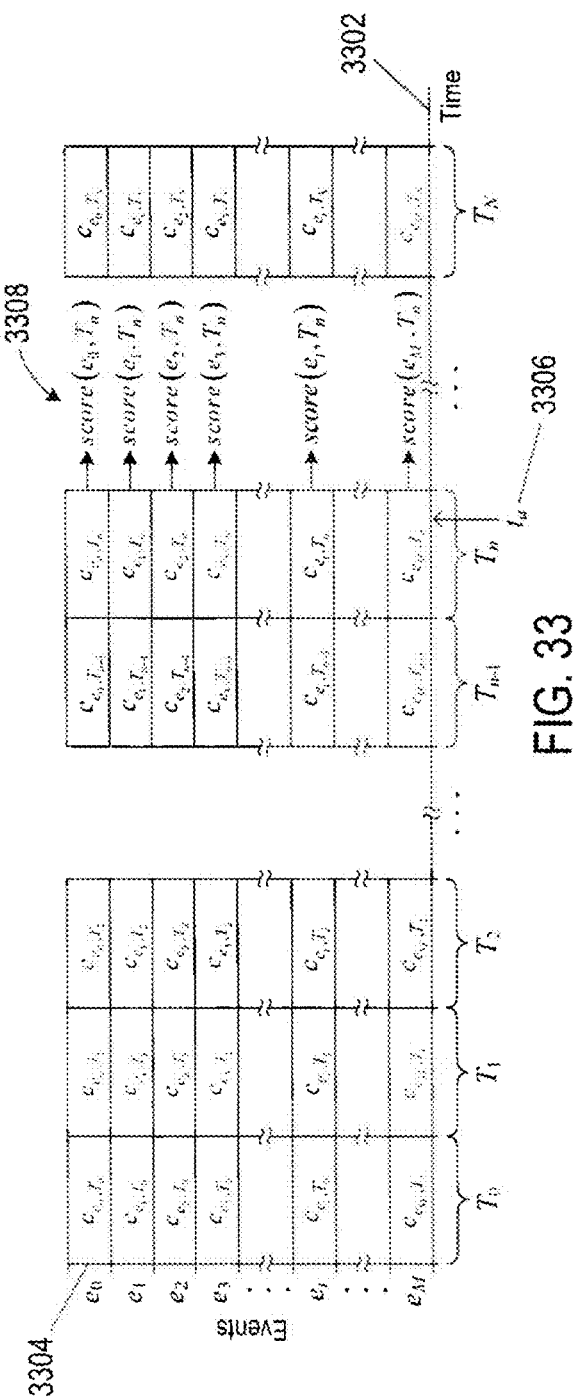
FIG. 33 shows a plot of example anomaly scores computed for event types of a heatmap of event-type frequencies.

FIG. 33 shows a plot of example anomaly scores computed for event types of a heatmap of event-type frequencies. Horizontal axis 3302 represents time. Vertical axis 3304 represents the event types in the stream of log messages. Each cell has a corresponding event-type frequency computed as described above with reference to FIG. 22. A search window encompasses the time windows $T_0$, $T_1$, $T_2$ . . . , $T_N$ in which the event-type frequencies have been calculated. The start time of anomalous behavior occurs in the time window $T_n$ and is denoted by $t_a$ 3306. The start time $t_a$ corresponds to the start time of anomalous behavior detected in one or more metrics extracted from log messages as described above with reference to FIGS. 28-31B. Anomaly scores 3308 are computed according to Equation (3) for each event type up to and including the time window $T_n$ that contains the start time $t_a$ 3306.

Figure 34:
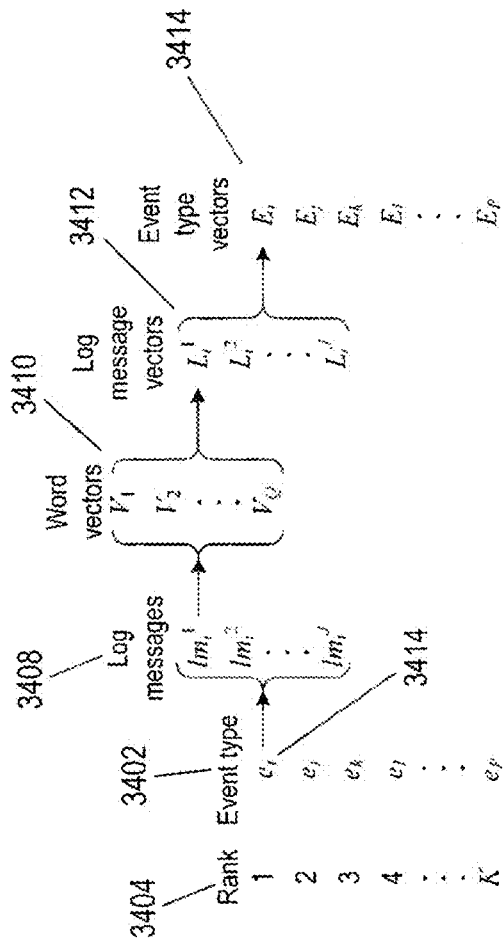
FIG. 34 shows an overview of a process for vectorizing event types.

In order to identify the log messages that may be used to determine the potential root cause of a problem in a data center, the K highest ranked event types are vectorized based on words in the log messages associated with the K highest ranked event types. FIG. 34 shows an overview of a process for vectorizing the K highest ranked event types. Column 3402 contains an example list of the K highest ranked event types and associated ranks in column 3404. For example, event type $e_i$ 3406 is the highest ranked event type with rank 1 and has the largest anomaly score. Column 3408 list the log messages of the event type $e_i$ 3406. The log messages are denoted by $lm_i^1$, $lm_i^2$, . . . , $lm_i^J$, where the subscript i corresponds to the event type $e_i$ 3406 and the superscripts are log message indices that distinguish the log messages associated with the event type $e_i$ 3406. Each log message contains Q words, where Q is a positive integer. The Q words of the log messages are assigned vectors in a multi-dimensional space. Column 3410 list Q word vectors associated with the log message $lm_i^1$, where the Q word vectors are denoted by $V_1$, . . . , $V_Q$. In the following discussion, uppercase letters are used to represent vectors. The q-th word vector is denoted by $$V_q = \begin{bmatrix} v_{q,1} \\ \vdots \\ v_{q,N_e} \end{bmatrix} \quad (4a)$$

where $N_e$ is the number elements in each word vector (i.e., $N_e$-dimensional space);

$v_{q,1}$, . . . , $v_{q,N_e}$ are numerical values; and q=1, 2, . . . , Q.

The word vectors in column 3410 are used to compute log message vectors denoted by $L_i^1$, $L_i^2$, . . . , $L_i^J$, where the subscript i corresponds to the event type $e_i$ 3406 and the superscripts correspond to the log message superscripts. A log message vector is computed as an average of the word vectors of the log message as follows:

$$L_i^j = \begin{bmatrix} l_{i,1}^j \\ \vdots \\ l_{i,N_e}^j \end{bmatrix} \quad (4b)$$

where $$l_{i,n}^j = \frac{1}{Q}\sum_{n=1}^{Q} v_{q,n}$$

Column 3412 comprises the log messages vectors associate with the log messages 3408. Event type vectors are computed for each of the K highest ranked event types by computing an average of the log message vectors associated with each event type vector as follows:

$$E_i = \begin{bmatrix} e_{i,1} \\ \vdots \\ e_{i,N_e} \end{bmatrix} \quad (4c)$$

where $$e_{i,n} = \frac{1}{J}\sum_{j=1}^{J} l_{i,n}^j$$

Column 3414 comprises event type vectors that correspond to the K highest ranked event types listed in column 3404 with the event type $e_i$ represented by the event type vector $E_i$.

FIG. 35 shows a numerical example of computing an event type vector for a simple example event type. The event type $e_i$ corresponds to cpu utilization and has four corresponding example log messages $lm_i^1$, $lm_i^2$, $lm_i^3$, and $lm_i^4$. The words of the log messages are represented by three-dimensional words vectors 3501-3505. In this example, the word vectors correspond to points in a three-dimensional space. Implementations are not limited to a three-dimensional space. In other implementations, higher dimensional spaces may be used to represent the words vectors. Log messages vectors $L_i^1$, $L_i^2$, $L_i^3$, and $L_i^4$ are computed by an average of corresponding components of the word vectors. For example, log message vector $L_i^3$ is the average of corresponding components of the word vectors cpu 3501, utilization 3502, and warning 3503. The event type vector $E_i$ corresponds to the event type $e_i$ and is determined by computing the average of corresponding components of the log message vectors $L_i^1$, $L_i^2$, $L_i^3$, and $L_i^4$.

Figures 36A, 36B:
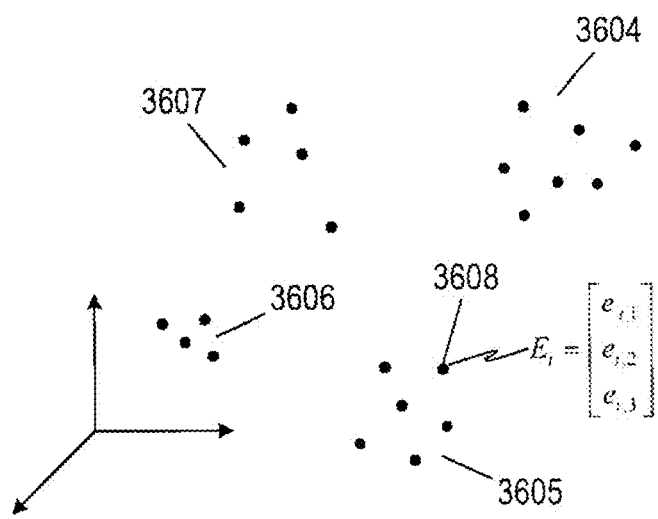
FIG. 36A shows three examples of semantically similar event types.
FIG. 36B shows a representation of four example clusters of event types in three-dimensions.

Returning to FIG. 20, clustering module 2007 determines clusters of semantically similar event types. FIG. 36A shows three examples of semantically similar event types 3601-3603. Each of the event types have in common the phrase "warning error forwarding to http front end err" and differ with respect to other words. Other semantically similar event types include event types comprising a set of tokens with and without parsed regular expressions removed. For example, an event types with "warning host x.x.x.x. shut down," where x.x.x.x represents a host IP address are semantically similar event types because the event types all include the common set of non-parametric tokens "warning host shut down." The clustering module 2007 may use K-means clustering to determine clusters of similar event types (i.e., determine clusters of semantically similar event types). Let $\{E_i\}_{i=1}^N$ denote a set of event type vectors associated with a set of N event types. K-means clustering is an iterative process of partitioning the event type vectors into K clusters such that each event type vector belongs to a cluster with the closest cluster center. K-means clustering begins with the full N event type vectors and k cluster centers denoted by $\{A_r\}_{r=1}^k$, where $A_r$ is an n-dimensional cluster center. Each event type vector is assigned to one of the k clusters defined by:

$$C_k^{(m)} = \{E_i : |E_i - A_k^{(m)}| \leq |E_i - A_r^{(m)}| \forall j, 1 \leq r \leq K\} \quad (5a)$$

where
$C_k^{(m)}$ is the k-th cluster k=1, 2, ..., K; and
superscript m is an iteration index m=1, 2, 3, ....
The cluster center $\bar{q}_k^{(m)}$ is the mean location of the event type vectors in the k-th cluster. A next cluster center is computed at each iteration as follows:

$$A_k^{(m+1)} = \frac{1}{|C_k^{(m)}|} \sum_{E_i \in C_k^{(m)}} E_i \quad (5b)$$

where $|C_k^{(m)}|$ is the number of data points in the k-th cluster.
For each iteration m. Equation (5a) is used to determine which cluster $C_k^{(m)}$ each event type vector belongs to followed by recomputing the coordinate location of each cluster center according to Equation (5b). The computational operations represented by Equations (5a) and (5b) are repeated for each iteration, m, until the event type vector in each of the K clusters do not change. The resulting clusters are represented by:

$$C_k = \{E_p\}_{p=1}^{N_k} \quad (5c)$$

where
$N_k$ is the number of event type vectors in the cluster $C_k$; and
p is a time-stamp index of principal-component points in the cluster $C_k$.
The number of event type vectors in each cluster sums to $$N \left( \text{i.e., } N = \sum_{k=1}^{K} N_k \right).$$

Each cluster of semantically event types has corresponding log messages that share a similar event type template and are semantically similar. FIG. 36B shows a representation of four example clusters of event types 3604-3607 with event types represented by three-dimensional event type vectors. Solid dots represent coordinates of event-type vectors in a 3-dimensional vector space. Each dot corresponds to an event type. For example, dot 3608 represents the coordinates of an event-type vector $E_i$ that corresponds to an event type $e_i$.

A similarity graph of log messages associated with a cluster of semantically similar event types is constructed where each node of the similarity graph corresponds to the coordinates of a log message vector that represents a log message associated with the cluster of semantically similar event types. Edges of the similarity graph are similarity scores that are computed as follows:

$$sim(L^x, L^y) = \frac{\sum_{n=1}^{N_e} l_n^x l_n^y}{\sqrt{\sum_{n=1}^{N_e} (l_n^x)^2 \sum_{n=1}^{N_e} (l_n^y)^2}} \quad (6)$$

The parameters $L^x$ and $L^y$ are log message vectors that correspond to log messages associated with any two event types of the clusters of event types and are denoted by $$L^x = \begin{bmatrix} l_1^x \\ \vdots \\ l_{N_e}^x \end{bmatrix} \text{ and } L^y = \begin{bmatrix} l_1^y \\ \vdots \\ l_{N_e}^y \end{bmatrix}$$

Figure 37A:
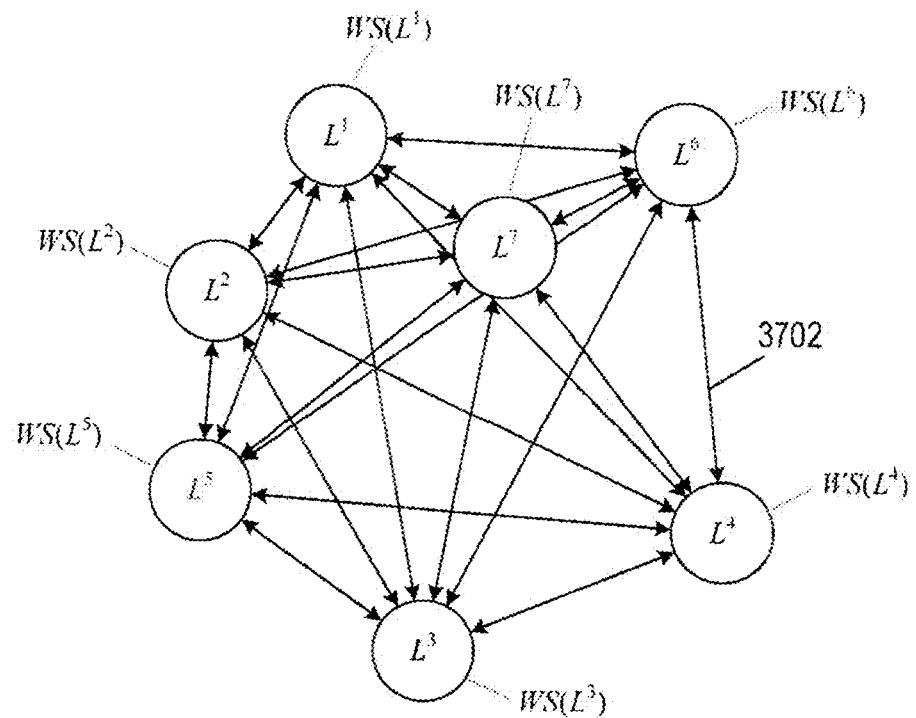
FIG. 37A shows an example of a similarity graph for log messages associated with event types of a cluster of event types.

FIG. 37A shows a similarity graph for log messages associated with event types in the cluster of event types 3605 shown in FIG. 36B. Larger open circles labeled $L^1$-$L^7$ represent the coordinates of log message vectors that serve as nodes in the similarity graph. Each log message vector corresponds to a log message associated with an event type represented by an event type vector in the cluster of event types 3605. Edges of the similarity graph are represented by directional arrows, such as directional arrow 3702, that connect pairs of nodes. Each edge has a corresponding similarity score calculated according to Equation (6).

Returning to FIG. 20, text ranking module 2008 computes a text rank for each node (i.e., text rank for each log message associated with the cluster of event types) of the similarity graph as follows:

$$WS(L^x) = (1-d) + d \sum_{L^y \in In(L^x)} \frac{sim(L^x, L^y)}{S} WS(L^y) \quad (7)$$

where $$S = \sum_{L^y \in In(L^y)} sim(L^y, L^y)$$

d is a selected damping factor (i.e., 0≤d≤1);

ln($L^x$) is the set of nodes with edges that connect to $L^x$; and ln($L^y$) is the set of nodes with edges that connect to $L^y$.

Equation (7) forms a system of linear equations. Each linear equation corresponds to a node in the similarity graph and comprises a linear. The text rank WS($L^x$) is numerically computed for each node of the similarity graph based on the system of linear equations with number of unknown text ranks WS($L^x$) equal to the number of knowns sim($L^x$, $L^y$)/S. The numerical computation may begin with arbitrary values assigned to the text ranks. An error rate of a node $L_x$ is approximated with a difference between text ranks computed at two successive iterations: $WS^{k+1}(L^x) - WS^k(L^x)$. The system of linear equations converges when the error rate for any node in the similarity graph is less than a given threshold (i.e., $WS^{k+1}(L^x) - WS^k(L^x) <$ Th, where Th is a threshold). One or more log messages with the highest text ranks for a given cluster of event types represent the cluster. Text ranks are computed for the log messages associated with each cluster of event types. One or more log messages associated with each cluster of event types may be displayed in the GUI in block 2010 of FIG. 20.

In FIG. 37A, text ranks WS($L^1$), . . . , WS($L^7$) are displayed next to the corresponding nodes $L^1$-$L^7$. Suppose the text ranks are ordered as follows: WS($L^5$)>WS($L^1$)>WS($L^4$)>WS($L^2$)>WS($L^6$)>WS($L^3$)>WS($L^7$). Because the node $L^5$ has the largest associated text rank WS($L^5$), the representative log message for the cluster of event types 3702 is the log message with the log message vector or node $L^5$. In other implementations, two or more representative log messages may be selected to represent a cluster of event types. For example, the three log messages that corresponds to the three highest text rank nodes $L^5$, $L^1$, and $L^4$ may be used to represent the cluster of event types 3605.

Figure 37B:
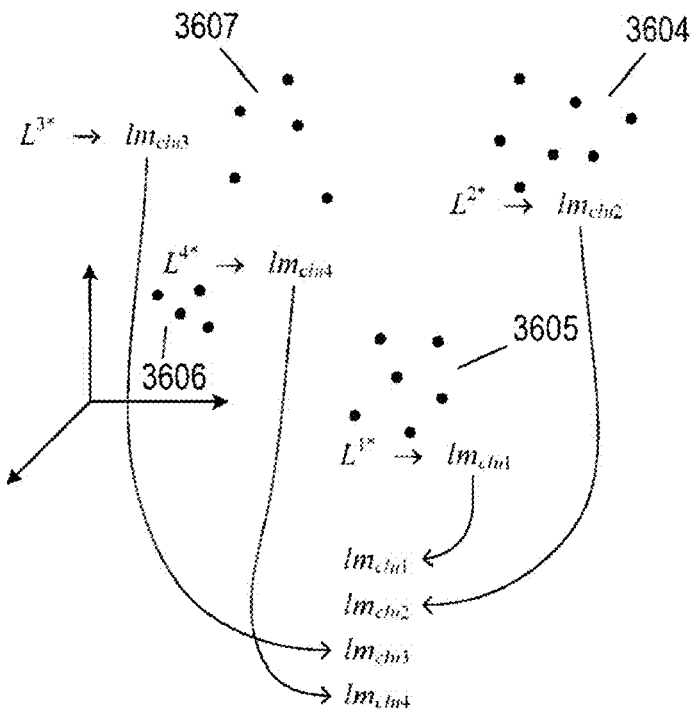
FIG. 37B shows an example of representative log messages for the clusters of event types shown in FIG. 36B.

FIG. 37B shows an example of representative log messages for the clusters of event types 3604-3607 in FIG. 36B. The clusters of event-types 3604-3607 have corresponding highest text rank nodes (i.e., log message vectors) $L^{1*}$, $L^{2*}$, $L^{3*}$, and $L^{4*}$ of similarity graphs associated with clusters 3604-3607. The asterisk is used to represent the node of each cluster with the largest text rank. The highest text rank nodes $L^{1*}$, $L^{2*}$, $L^{3*}$, and $L^{4*}$ have corresponding to log messages $lm_{clu1}$, $lm_{clu2}$, $lm_{clu3}$, and $lm_{clu4}$ that are in turn representative log messages of the corresponding clusters 3604-3607. For example, cluster 3605 has a highest text rank node $L^{1*}$ obtained from solving a linear system of equations constructed from the similarity graph of the cluster of event types 3605 shown in FIG. 37A. In other words, $L^{1*}$=max{$L^1,L^2,L^3,L^4,L^5,L^6,L^7$} of the similarity graph shown in FIG. 37A is the highest text rank node and the corresponding log message $lm_{clu1}$ is a representative log message for the cluster 3605. The representative log messages $lm_{clu1}$, $lm_{clu2}$, $lm_{clu3}$, and $lm_{clu4}$ of the four clusters of even types 3604-3607 are collected and displayed in the GUI in block 2010 of FIG. 20.

Returning to FIG. 20, the key-term detector 2009 identifies key terms of key phrases in the representative log messages output from the log message ranker 2005 based the log messages in the search window. The key-term detector 2009 uses Latent Dirichlet Allocation ("LDA") to determine key phrases of log messages generated in the search window with the highest probability of being associated with the problem. The key phrases output from the key-term detector module 2009 are highlighted in the representative log messages displayed in the GUI. For example, the key terms of key phrases may be bolded, distinguished by a different color, underlined, or any combination of bolding, coloring, and underlining in order to direct a system administrator and tenant to the potential root causes of the problem.

The basic idea behind LDA is that each document has an associated topic, and a topic can be defined as a word distribution. The general aim of LDA is to find a topic a document belongs to, based on the words in the document. The documents comprising a corpus are represented as random mixtures over topics, where each topic is characterized by a distribution of the words. There are two parts to LDA: First, the words that belong to each document are already known. Second, the words that belong a topic are unknown and are calculated using three-level hierarchical Bayesian model in which each document of a corpus is modeled as a finite mixture over an underlying set of topics. The topic probabilities provide an explicit representation of a document.

In LDA, the words of the documents are the basic units of discrete data. Each word is defined as an item from a vocabulary of the event types. Words are represented in LDA as unit-basis vectors with a single component equal to one and all other components equal to zero. Using superscripts to denote components of a unit-basis vector, the v-th word in the vocabulary used for a document is represented by a unit-basis vector w such that $w^v$=1 and $w^u$=0 for u≠v. A document is a collection of G words denoted by w=($w_1$, $w_2$, . . . , $w_G$), where $w_g$ is the g-th word in the sequence of words that form the document. A corpus is a collection of M even types denoted by D={$w_1$, $w_2$ . . . , $w_M$}.

The Dirichlet distribution for LDA with k topics is given by $$p(\theta | \alpha) = \frac{\Gamma\left(\sum_{i=1}^{k} \alpha_i\right)}{\prod_{i=1}^{k} \Gamma(\alpha_i)} \theta_1^{\alpha_1-1} \ldots \theta_k^{\alpha_k-1} \quad (8)$$

where

θ is a k-dimensional Dirichlet random variable with $\theta_i \geq 0$ and $\Sigma_{i=1}^k \theta_i = 1$;

α is a k vector with $\alpha_i > 1$; and

Γ(•) is the Gamma function.

The joint distribution for a topic matrix θ, a set of topics, and a set of words is given by $$p(\theta, z, w | \alpha, \beta) = p(\theta | \alpha) \prod_{n=1}^{N} p(z_n | \theta) p(w_n | z_n, \beta) \quad (9)$$

where $p(z_n|\theta)$ is the topic distribution; and $p(w_n|z_n,\beta)$ is the N-gram distribution.

Integrating the joint distribution over θ and summing over z give the marginal distribution for a log message:

$$p(w | \alpha, \beta) = \int p(\theta | \alpha) \left( \prod_{n=1}^{N} p(z_n | \theta) p(w_n | z_n, \beta) \right) d\theta \quad (10)$$

Taking the marginal probabilities of a single log message gives the probability of a corpus:

$$p(D \mid \alpha, \beta) = \prod_{m=1}^{M} \int p(\theta_m \mid \alpha) \left( \prod_{n=1}^{N} p(z_{m,n} \mid \theta_m) p(w_{m,n} \mid z_{m,n}, \beta) \right) d\theta_m \quad (11)$$

Figure 38:
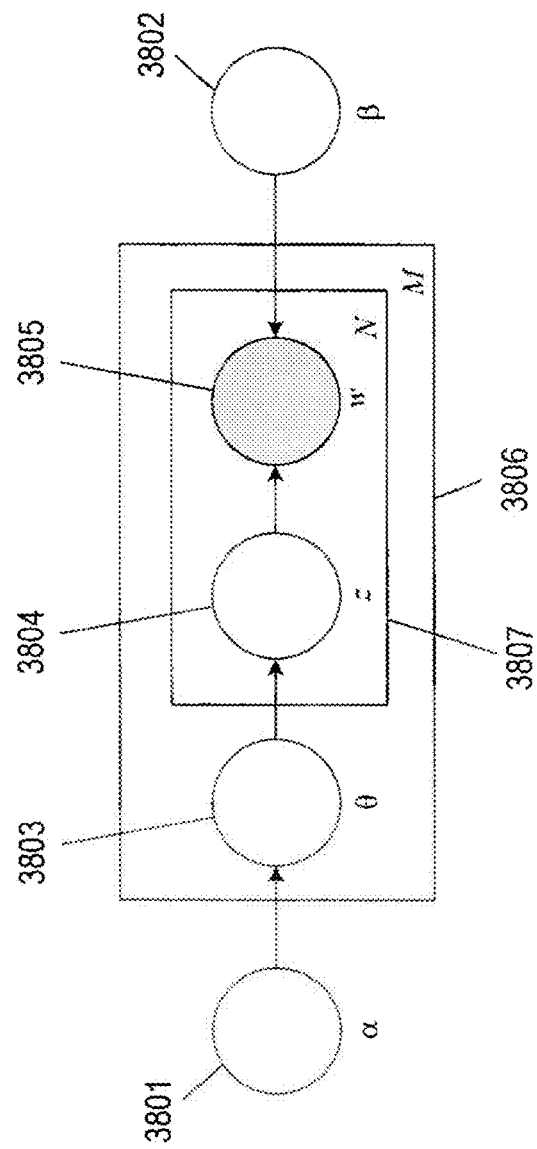
FIG. 38 shows a three-level graphical model of Latent Dirichlet Allocation ("LDA").

FIG. 38 shows a three-level graphical model of LDA. Corpus parameters level $\alpha$ and $\beta$ are represented by circles 3801 and 3802, which are sampled once in the process of generating a corpus. The variables $\theta$ are represented by circle 3803, which are document level parameters that are sampled once per document. Finally, the variables z and w are represented by circles 3804 and 3805, which are word-level variables that are sampled once for each word in a document. Outer rectangle 3806 represents M documents. Inner rectangle 3807 represents N repeated choice of topics and words within a document.

In the following description, a document is a log message, a corpus of documents is the set of log messages generated in the search window, and words correspond to N-grams of the event types. In this implementation, only two topics are considered: abnormal and normal. In other words, methods and systems use LDA to determine whether a log message generated in the search window describes a normal event or an abnormal event based on the N-grams of the event type of the log message. Each N-gram is a sequence of N consecutive tokens of the event type. The N-grams of the abnormal event types are the key terms of key phrases and are output from the key-term detector 2009.

Figure 39:
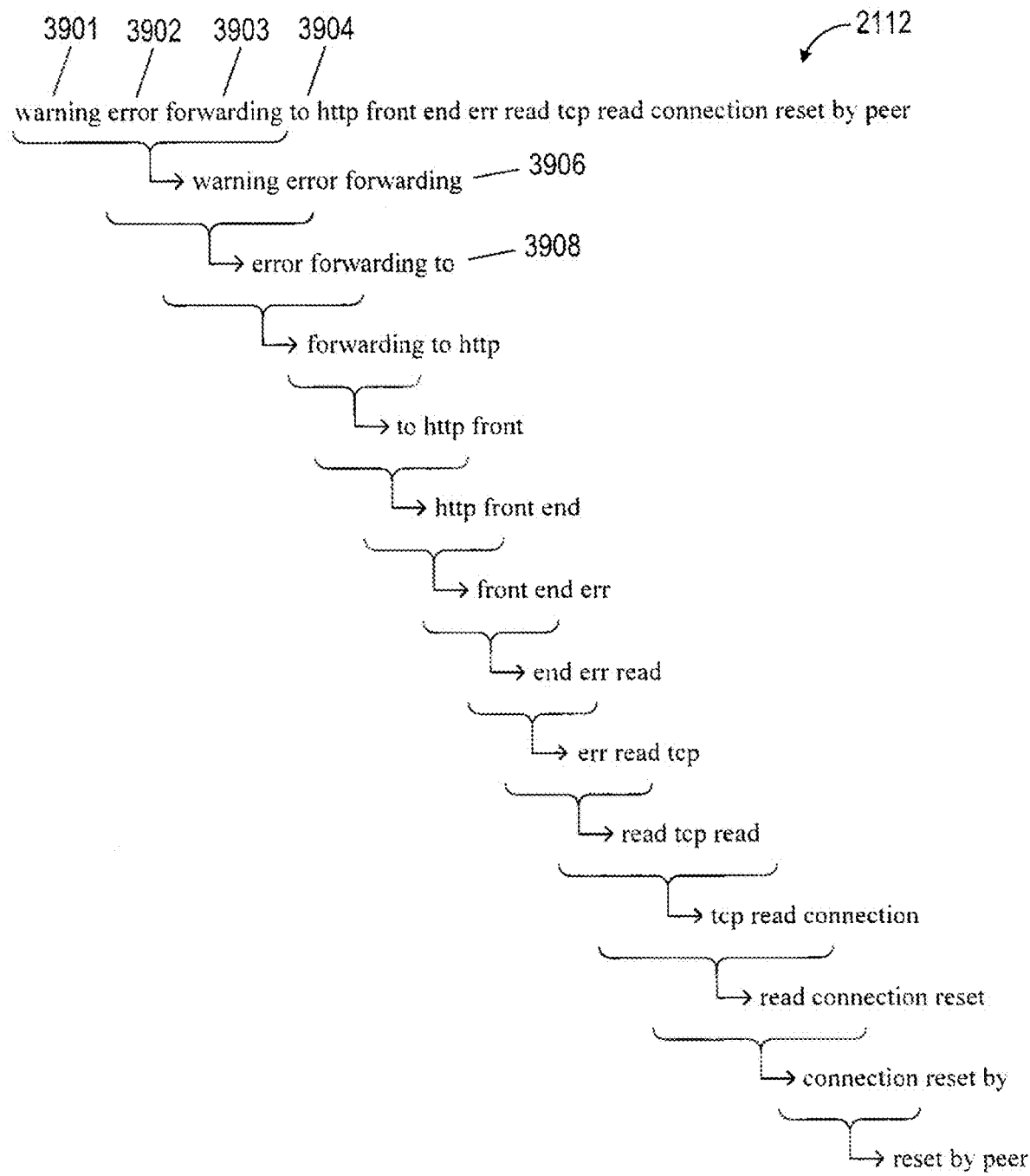
FIG. 39 shows an example of tokenizing an event type into N-grams.

FIG. 39 shows an example of tokenizing the event type 2112 obtained in FIG. 21 into N-grams where N is equal to three (i.e., N=3). The event type 2112 is tokenized into 13 N-grams. Each N-gram comprises three consecutive tokens of the event type 2112. For example, the tokens 3901-3903 are used to form N-gram 3906 and the tokens 3902-3904 are used to form N-gram 3908. LDA is used to determine the difference between normal and abnormal topics and find the key N-grams that contribute to each topic. In LDA, each topic is either normal or abnormal.

The topic distributions $p(z|\theta)$ obtained using LDA is used to compute a topic that is most likely associated with an event type as follows:

$$z_{ab} = \underset{z \in Z}{\operatorname{argmax}} \sum_{i=1}^{D} p(z \mid \theta) \operatorname{score}(e_i, T_n) \quad (12)$$

where
Z={abnormal topic, normal topic};
$z_{ab}$ is the most likely topic for the event type $e_i$;
$p(z|\theta)$ is a topic distribution for the topic z of even type $e_i$ obtained from LDA; and
D is the number of event types collected in the search window.

The word (i.e., N-gram) distributions may be used to rank order the N-grams. The N-grams may then be highlighted in the representative log messages displayed in the GUI in block 2010 of FIG. 20.

FIG. 40 shows an example list of the top 10 N-grams (i.e., key phrases) and associated N-gram distribution values calculated using LDA. For example, the first entry "error forwarding to" is the N-gram with the largest N-gram distribution value equal to 0.0394 and the second entry "forwarding to http" is the N-gram with the second largest N-gram distribution value 0.0392.

FIG. 41 shows an example of representative log messages displayed with a number of the N-grams listed in FIG. 40 highlighted with bolding. For example, the N-gram "error forwarding to" is highlighted with bolding in four of the log messages. The N-gram "no such host" is highlighted with bolding a log message. The N-gram "Invalid Id Hex" is highlighted in the last log message.

The methods described below with reference to FIGS. 42-50 are stored in one or more data-storage devices as machine-readable instructions that when executed by one or more processors of the computer system shown in FIG. 1 detect anomalous behavior in a distributed computing system.

Figure 42:
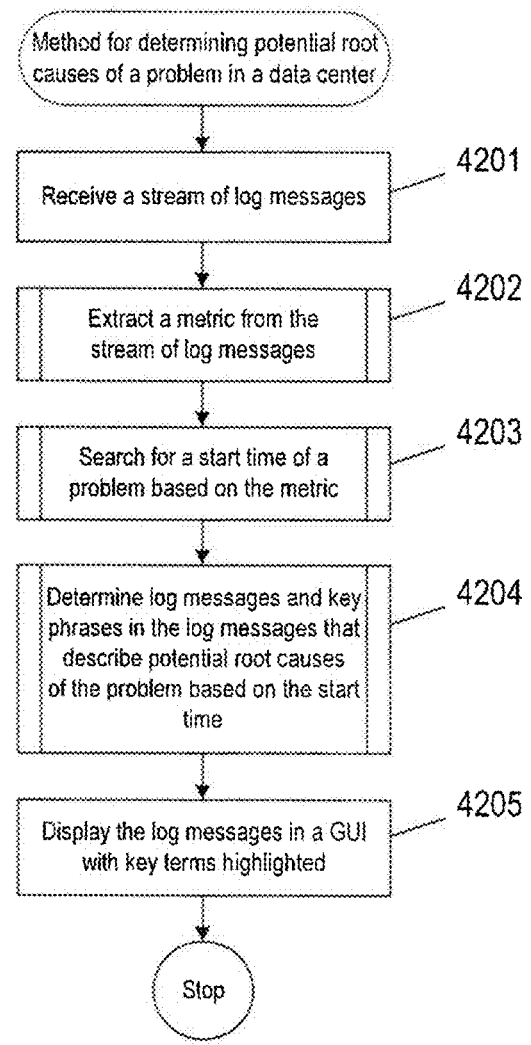
FIG. 42 shows a flow diagram illustrating an example implementation of a "method for determining potential root causes of a problem in a data center."

FIG. 42 shows a flow diagram illustrating an example implementation of a "method for determining potential root causes of a problem in a data center." In block 4201, receive a stream of log messages from one or more event sources of the data center. In block 4202, an "extract a metric from the stream of log messages" procedure is performed. In block 4203, a "search for a start time of a problem based on the metric" procedure is performed. In block 4204, a "determine log messages and key phrases in the log messages that describe potential root causes of the problem based on the start time" procedure is performed. In block 4205, the log messages that relate to the potential root causes of the problem are displayed in a graphical user interface. Key phrases that indicate the potential root cause of the problem may be highlighted in the log messages obtained in block 4205.

Figure 43:
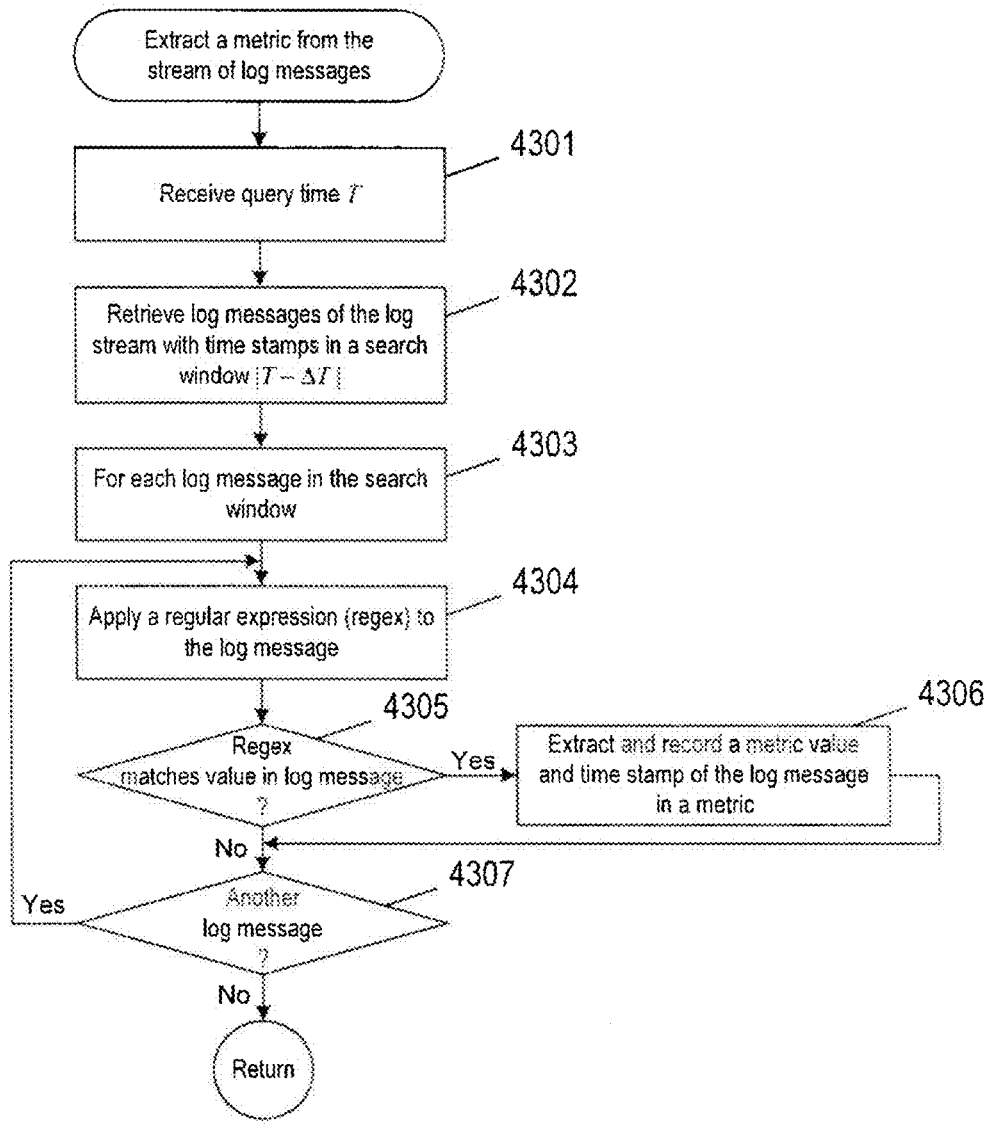
FIG. 43 shows a flow diagram illustrating an example implementation of the "extract a metric from the stream of log messages" performed in FIG. 42.

FIG. 43 shows a flow diagram illustrating an example implementation of the "extract a metric from the stream of log messages" performed in block 4202 of FIG. 42. A for loop beginning in block 4301 repeats the operations represented by blocks 4302-4304 for each log message. In block 4302, a regular expression configured to extract a metric and time stamp is applied to a log message. In decision block 4303, if the regular expression matches the format of the log message, control flows to block 4604. In block 4304, a metric value and associated time stamp are extracted from the log message and added to a stream of metric data (i.e., metric). In decision block 4304, the operations represented block 4303-4304 are repeated for another log message.

Figure 44:
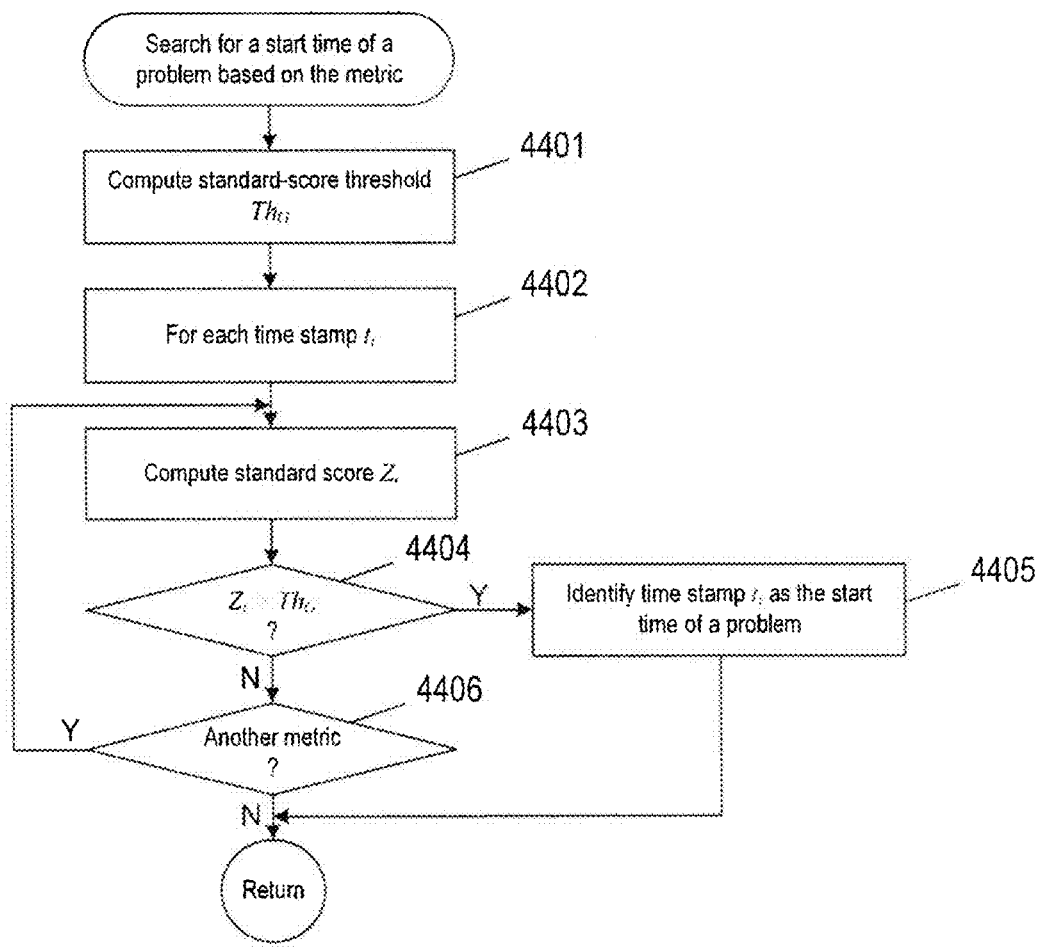
FIG. 44 shows a flow diagram illustrating an example implementation of the "search for a start time of problem based on the metric" performed in FIG. 42.

FIG. 44 shows a flow diagram illustrating an example implementation of the "search for a start time of problem based on the metric" performed in block 4203 of FIG. 42. In block 4401, a standard-score threshold is computed as described above with reference to Equation (2b). A loop beginning with block 4402 repeats the computational operations represented by blocks 4403-4406 for each metric value and time stamp in the metric extracted in block 4204. In block 4403, a standard score is computed at the time stamp as described above with reference to Equation (2a). In decision block 4404, when the standard score is greater than the standard-score threshold, control flows to block 4405. In block 4405, the time stamp of standard score is identified as the start time of a problem in the data center. In decision block 4406, control returns to block 4403 for a subsequent metric value and time stamp of the metric.

Figure 45:
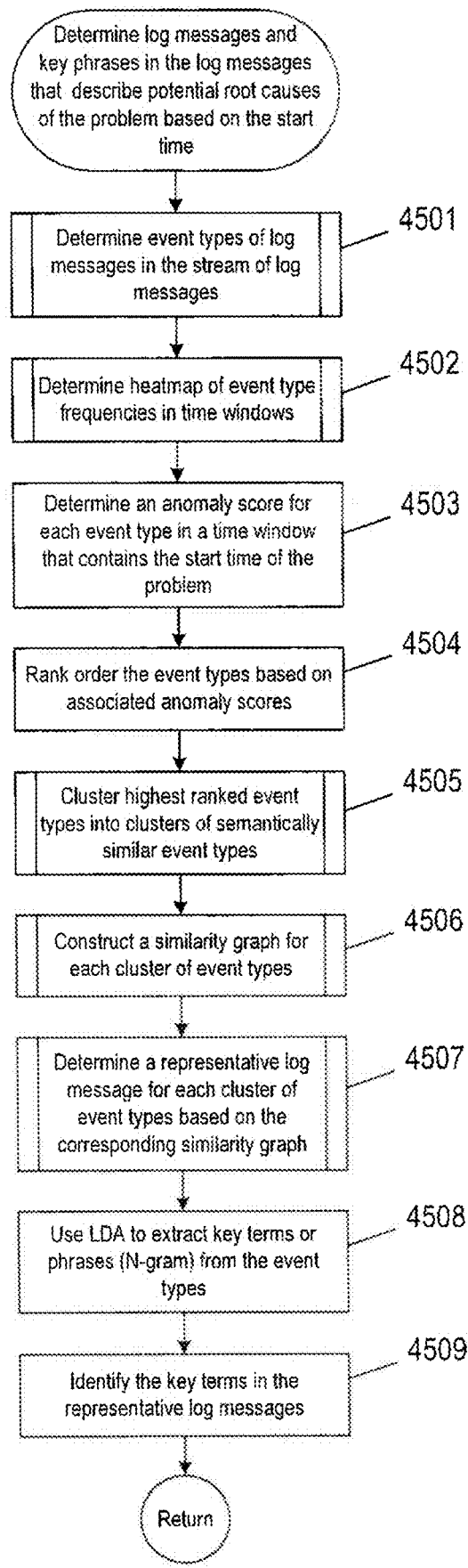
FIG. 45 shows a flow diagram illustrating an example implementation of the "determine log messages and key phrases in the log messages that describe potential root causes of the problem based on the start time" performed in FIG. 42.

FIG. 45 shows a flow diagram illustrating an example implementation of the "determine log messages and key phrases in the log messages that describe potential root causes of the problem based on the start time" performed in block 4204 of FIG. 42. In block 4501, a "determine event types of log messages in the stream of log messages" procedure is performed. In block 4502, a "determine a heatmap of event type frequencies in time windows" procedure is performed. In block 4503, determine anomaly score for each event type in a time window that contains the start time of the problem as described above with reference to Equation (3). In block 4504, the event types are rank ordered based on the corresponding anomaly scores. In block 4505, a "cluster highest ranked event types into cluster of semantically similar even types" procedure is performed. In block 4506, a "construct a similarity graph for each cluster of event types based on the corresponding similarity graph" procedure is performed. In block 4507, a "determine a representative log message for each cluster" procedure is performed. In block 4508, LDA is used to extract key terms, or key phrases, (i.e., N-grams) from the event types. In block 4509, the key phrases are identified in representative log messages obtained in block 4507. The representative log messages are the log messages displayed in the GUI in block 4205 of FIG. 42.

Figure 46:
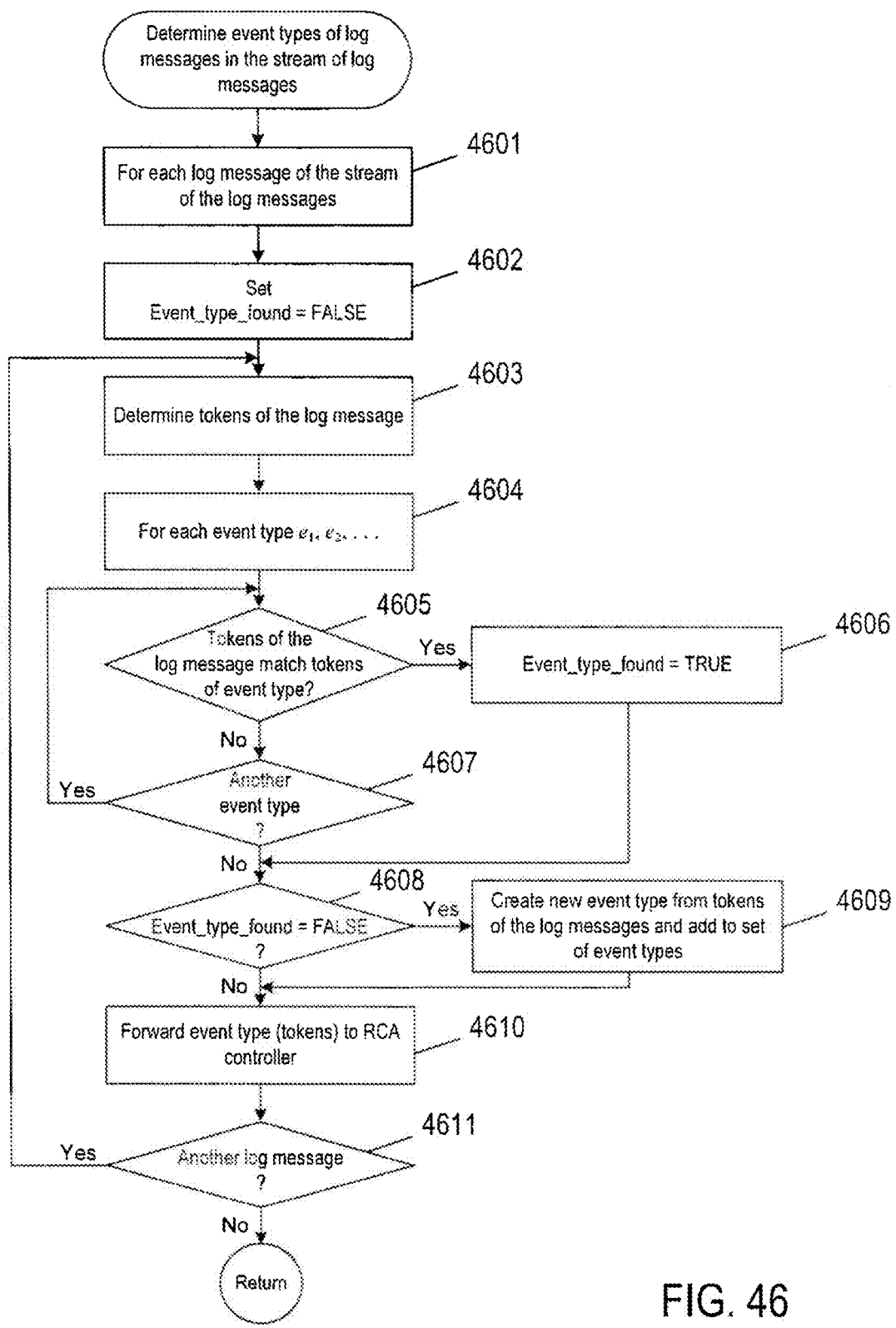
FIG. 46 shows a flow diagram illustrating an example implementation of the "determine event types of log messages in the stream of log messages" performed in FIG. 45.

FIG. 46 shows a flow diagram illustrating an example implementation of the "determine event types of log messages in the stream of log messages" performed in block 4501 of FIG. 45. A for loop beginning in block 4601 repeats the computational operations represented by blocks 4602-4610 for each log message in the stream of log messages. In block 4602, a logical variable "event_type_found" is set to a logical value FALSE. In block 4603, tokens of the log message are determined. A for loop beginning in block 4604 repeats the operations of blocks 4605 and 4606. In decision block 4605 when the tokens of the log message match tokens of event type control flows to block 4606. In block 4606, the logical variable "event_type_found" is set to TRUE. In decision block 4607, blocks 4605 and 4606 are repeated for another event type. In decision block 4608, if the logical variable "event_type_found" is set to FALSE, control flow to block 4609. In block 4609, event type tokens are forwarded to the RCA controller. In decision block 4611, blocks 4602-4610 are repeated for another log message.

Figure 47:
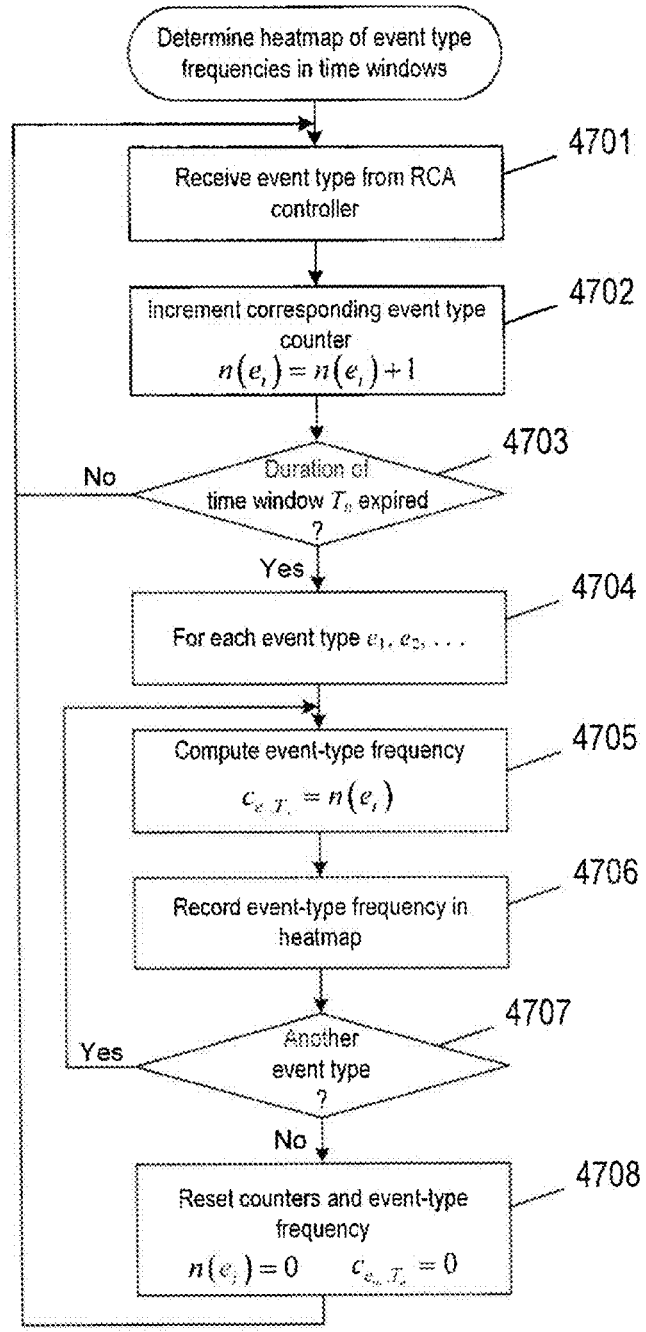
FIG. 47 shows a flow diagram illustrating an example implementation of the "determine heatmap of event type frequencies in time windows" performed in FIG. 45.

FIG. 47 shows a flow diagram illustrating an example implementation of the "determine heatmap of event type frequencies in time windows" performed in block 4502 of FIG. 45. In block 4701, an event type is received from the RCA controller as described above with reference to FIG. 20. In block 4702, an event-type counter corresponding to the event type is incremented as described above with reference to FIG. 22. In decision block 4703, when the duration of the time window is expired, control flows to block 4704. A for loop beginning in block 4704 repeats the computational operations represented by blocks 4706-4707. In block 4705, event-type frequency is set to event-type counter as described above with reference to FIG. 22. In block 4706, event-type frequency is recorded in a heatmap. In decision block 4707, blocks 4705-4706 are repeated for another event type. In block 4708, the event-type counter and the event-type frequency are reset to zero.

Figure 48:
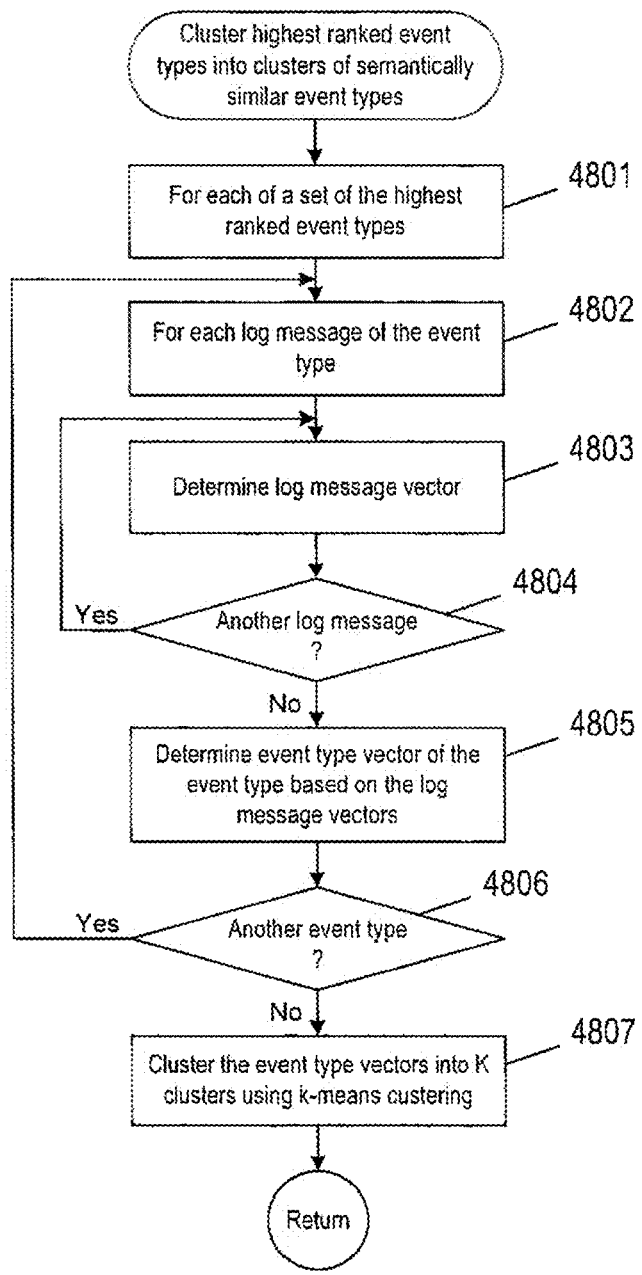
FIG. 48 shows a flow diagram illustrating an example implementation of the "cluster highest ranked event types with similar event type templates" performed in FIG. 45.

FIG. 48 shows a flow diagram illustrating an example implementation of the "cluster highest ranked event types into cluster of semantically similar even types" performed in block 4505 of FIG. 45. A loop beginning with block 4801 repeats the operations represented by blocks 4802-4806. A loop beginning with block 4802 repeats the operation represented by block 4803 for each log message of the cluster of event type messages. In block 4803, a log message vector is computed for the log message Equations (4a)-(4b). In decision block 4804, the operation of block 4803 is computed until a log message vector has been computed for the log messages of the cluster of even types. In block 4805, an even type vector is computed for each even type based on the log message vectors as described above with reference to Equation (4c) and FIG. 34. In decision block 4806, the operations of block 4802-4805 are repeated each of the highest ranked even types. In block 4807, clusters of event type vectors are determined using K-means clustering as described above with reference to Equations (5a)-(5b) and FIG. 36B.

Figure 49:
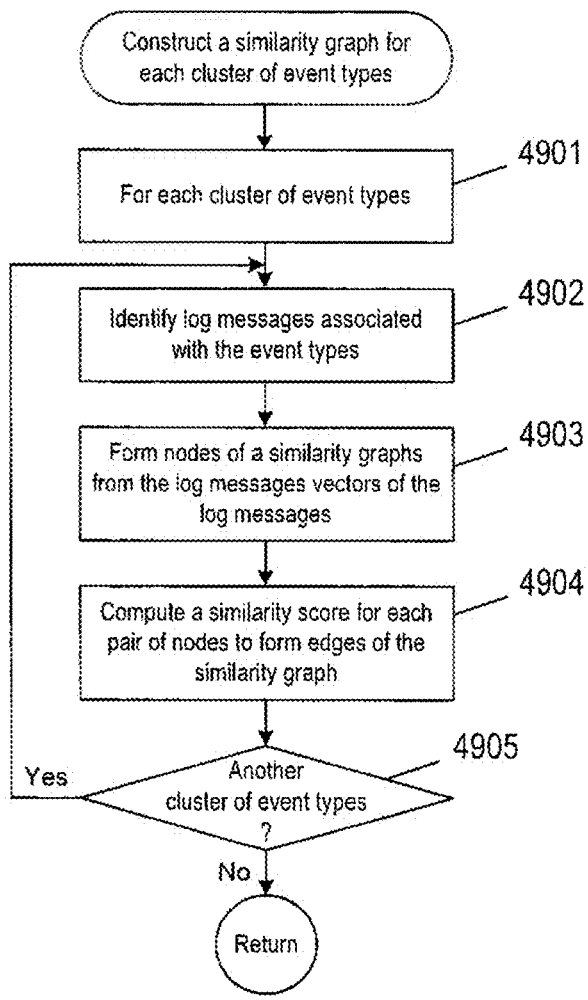
FIG. 49 shows a flow diagram illustrating an example implementation of the "construct a similarity graph for each cluster of event types" performed in FIG. 45.

FIG. 49 shows a flow diagram illustrating an example implementation of the "construct a similarity graph for each cluster of event types" performed in block 4506 of FIG. 45. A loop beginning with block 4901 repeats the operations represented by blocks 4902-4904 for each cluster of even types determined in block 4505 of FIG. 45. In block 4902, log messages associated with a cluster of event types are identified. In block 4903, nodes of a similarity graph are form from the log message vectors of the log messages using the log message vectors obtained in block 4803 of FIG. 48. In block 4904, a similarity score is computed for each pair of nodes to form edges of the similarity graph. In decision block 4905, blocks 4902-4904 are repeated for another cluster of event types.

Figure 50:
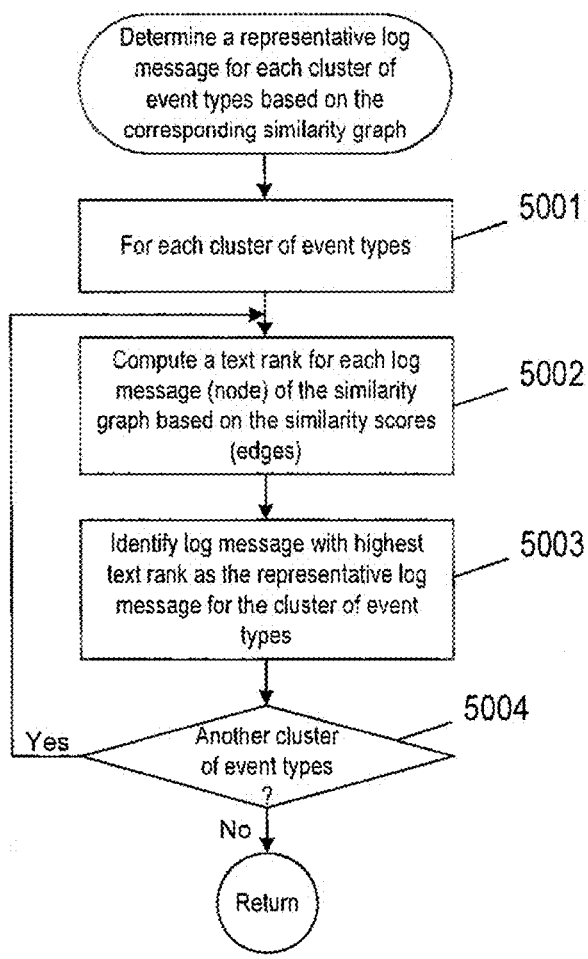
FIG. 50 shows a flow diagram illustrating an example implementation of the "determine a representative log message for each cluster of event types based on the corresponding similarity graph" performed in FIG. 45.

FIG. 50 shows a flow diagram illustrating an example implementation of the "determine a representative log message for each cluster of event types based on the corresponding similarity graph" performed in block 4507 of FIG. 45. A loop beginning with block 5001 repeats the operations represented by blocks 5002-5003 for each cluster of even types obtained in block 4505 of FIG. 45. In block 5002, a text rank is computed for each log message vector (node) of the similarity graph based on the similarity scores (edges) of the similarity graph as described above with reference to Equation (7) and FIG. 37A. In block 5003, a log message with the highest text rank is identified as the representative log message for the cluster of event types as described above with reference to FIG. 37B. In decision block 5004, the operations represented by blocks 5002-5003 are repeated for another cluster of even types.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An automated method stored in one or more data-storage devices and executed using one or more processors of a computer system for determining potential root causes of a problem in a data center, the method comprising:
using a regular expression to extract a metric from a stream of log messages generated by at least one event source of the data center;
searching for a start time of a problem based on the metric;
in response to detecting a start time of a problem in the metric, determining log messages and key phrases in the log messages that describe at least one potential root cause of the problem; and
displaying the log messages that describe the at least one potential root cause of the problem in a graphical user interface with the key phrases that indicate the at least one potential root cause of the problem highlighted in the log messages.

2. The method of claim 1 wherein using a regular expression to extract the metric from the stream of log messages comprises:
applying the regular expression configured to extract a metric and time stamp from a log message to each log message of the stream of log messages; and
when the regular expression matches the format of the log message, extracting a metric value and associated time stamp from the log message and adding the metric value and associated time stamp to the metric.

3. The method of claim 1 wherein searching for a start time of a problem based on the metric comprises:
computing a standard-score threshold for the metric;
computing a standard score for each metric value and time stamp in the metric; and
when the standard score is greater than the standard-score threshold, identifying the time stamp of the standard score as the start time of the problem in the data center.

4. The method of claim 1 wherein determining log messages and key phrases in the log messages that describe at least one potential root cause of the problem comprises:
determining event types of log messages in the stream of log messages;
determining event type frequencies of the event types in separate time windows;
determining an anomaly score for each event type in a time window that contains the start time of the problem;
rank ordering the event types from largest to smallest based on corresponding anomaly scores;
clustering a subset of highest ranked event types into clusters of even types, each cluster of event types comprising semantically similar event types;
constructing a similarity graph for each cluster of event types;
determining a representative log message for each cluster of even types;
extracting key phrases from the event types using latent Dirichlet allocation; and
highlighting the key phrases in the representative log messages displayed in the GUI.

5. The method of claim 4 wherein clustering a subset of highest ranked event types into clusters of even types comprises:
computing a log message vector for each the log message in the search window;
computing an even type vector for each of even type in the subset of highest ranked event types in the search window based on the log message vectors; and
applying K-means clustering to the event type vectors to obtain the clusters of event types.

6. The method of claim 4 wherein constructing a similarity graph for each cluster of event types comprises:
for each cluster of event types
determining log messages associated with the cluster of even types,
forming nodes of a similarity graph form from the log message vectors of the log messages, and
computing a similarity score for each pair of nodes to form edges of the similarity graph.

7. The method of claim 4 wherein determining a representative log message for each cluster of even types comprises:
for each cluster of event types
computing a text rank for each node of the similarity graph based on the similarity scores of edges connected to each node,
identifying a log message with a largest text rank, and
identifying the log message with the largest text rank as the representative log message for the cluster of event type.

8. A computer system for determining potential root causes of a problem in a data center, the system comprising:
one or more processors;
one or more data-storage devices; and
machine-readable instructions stored in the one or more data-storage devices that when executed using the one or more processors controls the system to perform operations comprising:
using a regular expression to extract a metric from a stream of log messages generated by at least one event source of the data center;
searching for a start time of a problem based on the metric;
in response to detecting a start time of a problem in the metric, determining log messages and key phrases in the log messages that describe at least one potential root cause of the problem; and
displaying the log messages that describe the at least one potential root cause of the problem in a graphical user interface with the key phrases that indicate the at least one potential root cause of the problem highlighted in the log messages.

9. The system of claim 8 wherein using a regular expression to extract the metric from the stream of log messages comprises:
applying the regular expression configured to extract a metric and time stamp from a log message to each log message of the stream of log messages; and
when the regular expression matches the format of the log message, extracting a metric value and associated time stamp from the log message and adding the metric value and associated time stamp to the metric.

10. The system of claim 8 wherein searching for a start time of a problem based on the metric comprises:
computing a standard-score threshold for the metric;
computing a standard score for each metric value and time stamp in the metric; and
when the standard score is greater than the standard-score threshold, identifying the time stamp of the standard score as the start time of the problem in the data center.

11. The system of claim 8 wherein determining log messages and key phrases in the log messages that describe at least one potential root cause of the problem comprises:
determining event types of log messages in the stream of log messages;
determining event type frequencies of the event types in separate time windows;
determining an anomaly score for each event type in a time window that contains the start time of the problem;
rank ordering the event types from largest to smallest based on corresponding anomaly scores;
clustering a subset of highest ranked event types into clusters of even types, each cluster of event types comprising semantically similar event types;
constructing a similarity graph for each cluster of event types;
determining a representative log message for each cluster of even types;
extracting key phrases from the event types using latent Dirichlet allocation; and
highlighting the key phrases in the representative log messages displayed in the GUI.

12. The system of claim 11 wherein clustering a subset of highest ranked event types into clusters of even types comprises:
- computing a log message vector for each the log message in the search window;
- computing an even type vector for each of even type in the subset of highest ranked event types in the search window based on the log message vectors; and
- applying K-means clustering to the event type vectors to obtain the clusters of event types.

13. The system of claim 11 wherein constructing a similarity graph for each cluster of event types comprises:
- for each cluster of event types
  - determining log messages associated with the cluster of even types,
    - forming nodes of a similarity graph form from the log message vectors of the log messages, and
    - computing a similarity score for each pair of nodes to form edges of the similarity graph.

14. The system of claim 11 wherein determining a representative log message for each cluster of even types comprises:
- for each cluster of event types
  - computing a text rank for each node of the similarity graph based on the similarity scores of edges connected to each node,
  - identifying a log message with a largest text rank, and
  - identifying the log message with the largest text rank as the representative log message for the cluster of event type.

15. Apparatus for determining potential root causes of a problem in a data center comprising:
- means for using a regular expression to extract a metric from a stream of log messages generated by at least one event source of the data center;
- means for searching for a start time of a problem based on the metric;
- means for determining log messages and key phrases in the log messages that describe at least one potential root cause of the problem in response to detecting a start time of a problem in the metric; and
- means for displaying the log messages that describe the at least one potential root cause of the problem in a graphical user interface with the key phrases that indicate the at least one potential root cause of the problem highlighted in the log messages.

16. The apparatus of claim 15 wherein the means for using a regular expression to extract the metric from the stream of log messages comprises:
- applies the regular expression configured to extract a metric and time stamp from a log message to each log message of the stream of log messages; and
- when the regular expression matches the format of the log message, extracts a metric value and associated time stamp from the log message and adds the metric value and associated time stamp to the metric.

17. The apparatus of claim 15 wherein the means for searching for a start time of a problem based on the metric comprises:
- computes a standard-score threshold for the metric;
- computes a standard score for each metric value and time stamp in the metric; and
- when the standard score is greater than the standard-score threshold, identifies the time stamp of the standard score as the start time of the problem in the data center.

18. The apparatus of claim 15 wherein means for determining log messages and key phrases in the log messages that describe at last one potential root cause of the problem comprises:
- means for determining event types of log messages in the stream of log messages;
- means for determining event type frequencies of the event types in separate time windows;
- means for determining an anomaly score for each event type in a time window that contains the start time of the problem;
- means for rank ordering the event types from largest to smallest based on corresponding anomaly scores;
- means for clustering a subset of highest ranked event types into clusters of even types, each cluster of event types comprising semantically similar event types;
- means for constructing a similarity graph for each cluster of event types;
- means for determining a representative log message for each cluster of even types;
- means for extracting key phrases from the event types using latent Dirichlet allocation; and
- means for highlighting the key phrases in the representative log messages displayed in the GUI.

19. The apparatus of claim 18 wherein means for clustering a subset of highest ranked event types into clusters of even types comprises:
- computes a log message vector for each the log message in the search window;
- computes an even type vector for each of even type in the subset of highest ranked event types in the search window based on the log message vectors; and
- applies K-means clustering to the event type vectors to obtain the clusters of event types.

20. The apparatus of claim 18 wherein the means for constructing a similarity graph for each cluster of event types comprises:
- for each cluster of event types
  - determines log messages associated with the cluster of even types,
    - forms nodes of a similarity graph form from the log message vectors of the log messages, and
    - computes a similarity score for each pair of nodes to form edges of the similarity graph.

21. The apparatus of claim 18 wherein the means for determining a representative log message for each cluster of even types comprises:
- for each cluster of event types
  - computes a text rank for each node of the similarity graph based on the similarity scores of edges connected to each node,
  - identifies a log message with a largest text rank, and
  - identifies the log message with the largest text rank as the representative log message for the cluster of event type.

* * * * *